(12) United States Patent
Kim

(10) Patent No.: US 7,626,574 B2
(45) Date of Patent: Dec. 1, 2009

(54) APPARATUS AND METHOD FOR INPUTTING ALPHABET CHARACTERS

(76) Inventor: Min-kyum Kim, 1191-2, Shinjung-3dong, Yangchun-gu, Seoul 158-864 (KR)

( * ) Notice: Subject to any disclaimer, the term of this patent is extended or adjusted under 35 U.S.C. 154(b) by 340 days.

(21) Appl. No.: 10/542,920

(22) PCT Filed: Jan. 24, 2004

(86) PCT No.: PCT/KR2004/000122

§ 371 (c)(1),
(2), (4) Date: Jul. 20, 2005

(87) PCT Pub. No.: WO2004/066600

PCT Pub. Date: Aug. 5, 2004

(65) Prior Publication Data

US 2007/0110222 A1    May 17, 2007

(30) Foreign Application Priority Data

| Jan. 22, 2003 | (KR) | ...................... 10-2003-0004412 |
| Feb. 17, 2003 | (KR) | ...................... 10-2003-0009930 |
| Mar. 10, 2003 | (KR) | ...................... 10-2003-0014946 |
| Mar. 11, 2003 | (KR) | ...................... 10-2003-0015240 |
| Aug. 18, 2003 | (KR) | ...................... 10-2003-0057036 |
| Aug. 27, 2003 | (KR) | ...................... 10-2003-0059700 |

(51) Int. Cl.
    *G06F 3/02* (2006.01)
(52) U.S. Cl. ...................... 345/168; 345/156; 345/169; 379/355.05; 400/472
(58) Field of Classification Search ......... 345/156–184; 379/355.05; 400/472
    See application file for complete search history.

(56) References Cited

U.S. PATENT DOCUMENTS

| 5,392,338 | A | 2/1995 | Danish et al. | |
| 6,792,146 | B2 * | 9/2004 | Kenagy | ...................... 345/179 |
| 2002/0196163 | A1 * | 12/2002 | Bradford et al. | .............. 341/22 |
| 2003/0023420 | A1 * | 1/2003 | Goodman | ...................... 704/1 |

FOREIGN PATENT DOCUMENTS

WO    WO 02/052816 A1    7/2002

* cited by examiner

*Primary Examiner*—David L Lewis
(74) *Attorney, Agent, or Firm*—Joseph Hyosuk Kim; JHK Law

(57) ABSTRACT

The invention shows the effective input of a target word or phrase by applying a Full Input Method and by using an index storing full code. In addition, this invention proposes an input system for inputting various objects (alphabet characters, special characters, functions, etc) by combination of a long stroke of a button and a short stroke of the button, and by combination of a long stroke of a button and a short stroke of a control button.

5 Claims, 27 Drawing Sheets

FIG. 1-1
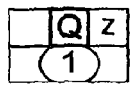 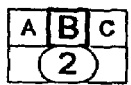 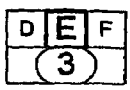
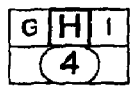 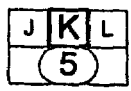 
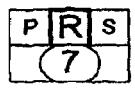 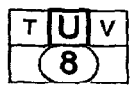 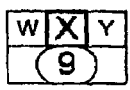
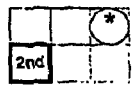  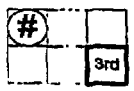
FIG. 1-2
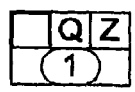 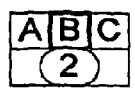 
  
  
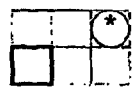  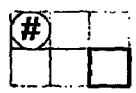
FIG. 2-1
 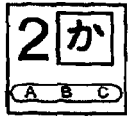 
  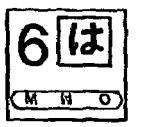
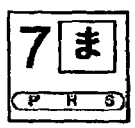 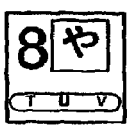 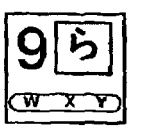
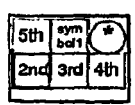  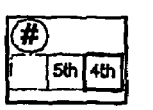
FIG. 2-2
 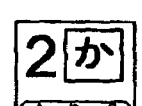 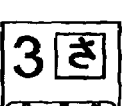
 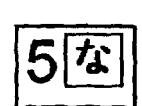 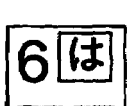
  
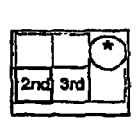 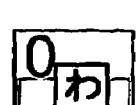 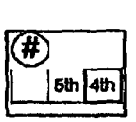

FIG. 3-1
(None)
FIG. 4-1
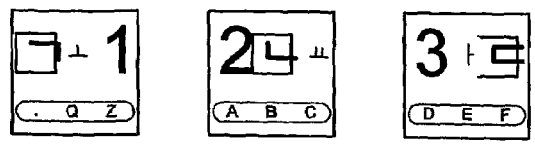
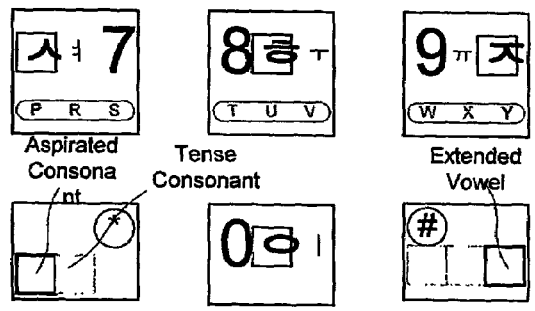
FIG. 4-2
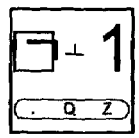 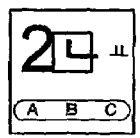 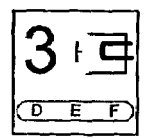
FIG. 4-3
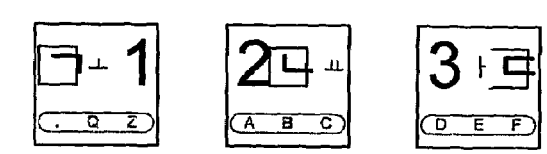
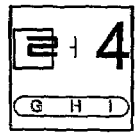 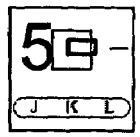 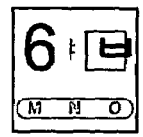
 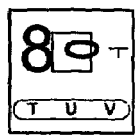 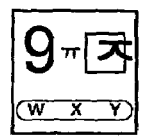
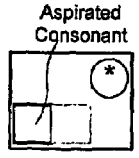 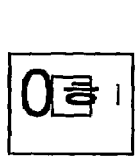 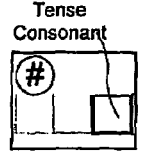
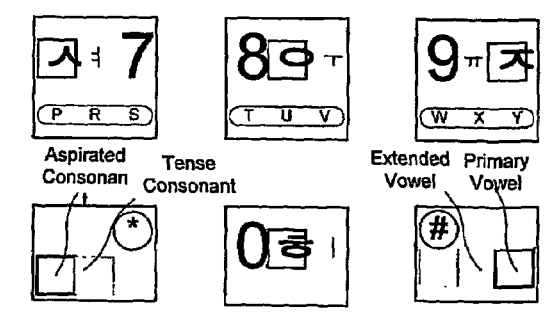

FIG. 4-5
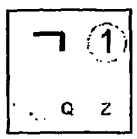 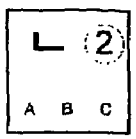 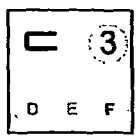
 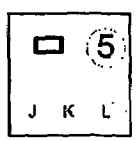 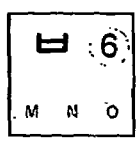
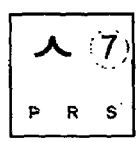 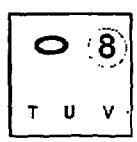 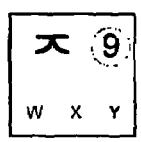
Aspirated Consonant    Tense Consonant
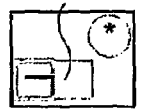 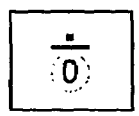 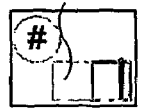
FIG. 4-6
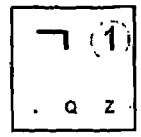 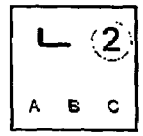 
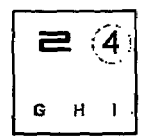 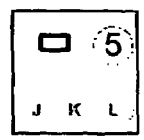 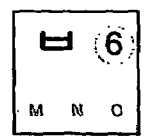
 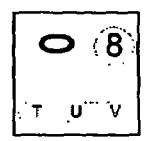 
Aspirated Consonant    Tense Consonant
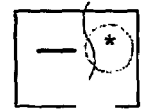 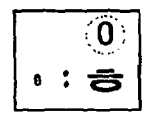 
FIG. 4-7
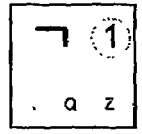 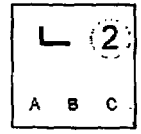 
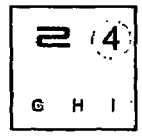 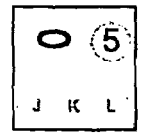 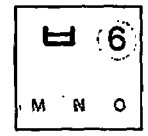
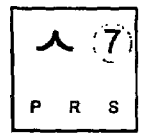 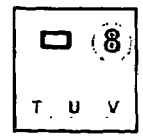 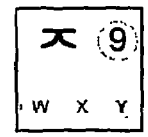
Aspirated Consonant    Tense Consonant
  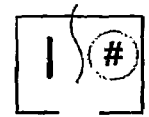
FIG. 4-8
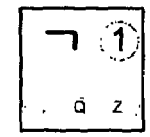 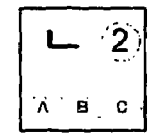 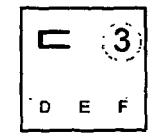
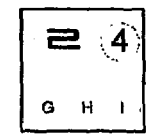  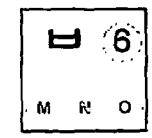
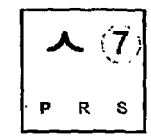  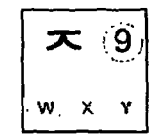
Aspirated Consonant    Tense Consonant
 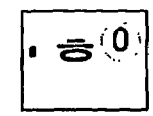 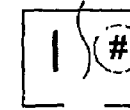

(None)

(None)

(None)

(None)

FIG. 10-1

| B P ① | D T ② | G K ③ |
|---|---|---|
| Z J ④ | C Q ⑤ | S X ⑥ |
| M N ⑦ | R L ⑧ | H F ⑨ |
| A E (*) | I O (0) | U Ü (#) |

FIG. 10-2

| B P ① | D T ② | G K ③ |
|---|---|---|
| Z J ④ | C Q ⑤ | S X ⑥ |
| M N ⑦ | R L ⑧ | H F ⑨ |
| I (*) | A E O (0) | U (#) |

FIG. 10-3

| B P ① | D T ② | G K ③ |
|---|---|---|
| Z J ④ | C Q ⑤ | S X ⑥ |
| M N w ⑦ | R L y ⑧ | H F v ⑨ |
| A E (*) | I O (0) | U Ü (#) |

FIG. 10-4

| B P ① | D T ② | G K ③ |
|---|---|---|
| Z J ④ | C Q ⑤ | S X ⑥ |
| M N w ⑦ | R L y ⑧ | H F v ⑨ |
| I (*) | A E O (0) | U (#) |

FIG. 11-9

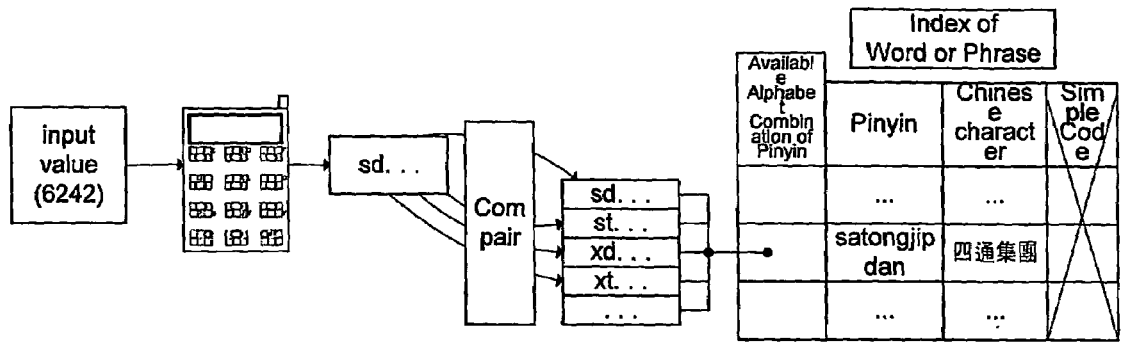

FIG. 11-10

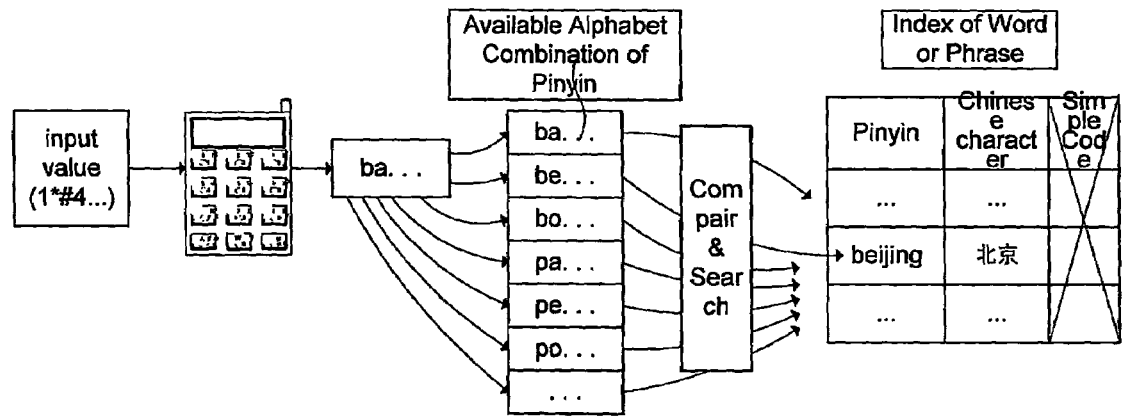

FIG. 11-11

| (A) short-cut input value (namely, simple code or short-cut code) | | | |
|---|---|---|---|
| (B) Partially Associated Simple Code | (C) Syllable-based Initial Code | (H) Partial Alphabet-based Input Value (Simple Code) | (I) Syllable-based Initial Value (simple code) |
| | (D) First vowel+Syllable-based Initial Code | | (J) First vowel+Syllable-based Initial Value (Simple Code) |
| | (E) consonant Associated Simple Code | | (K) Consonant-based Input Value (Simple Code) |
| | (F) Word-based Initial Code | | (L) Word-based Initial Value (Simple Code) |
| (G) fully associated simple code | | (Z) | |

FIG. 12-1
(None)
FIG. 13-1
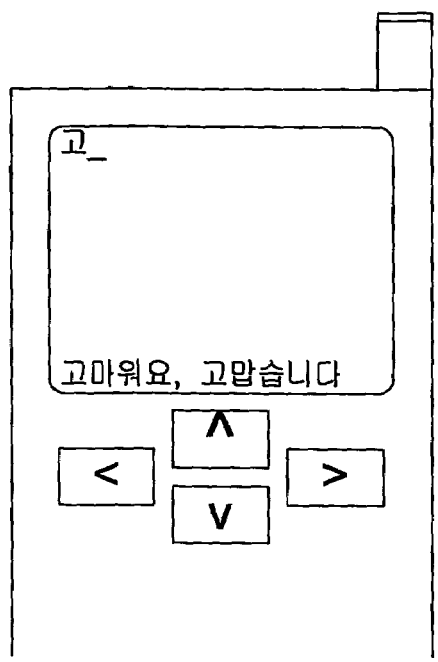
FIG. 13-2
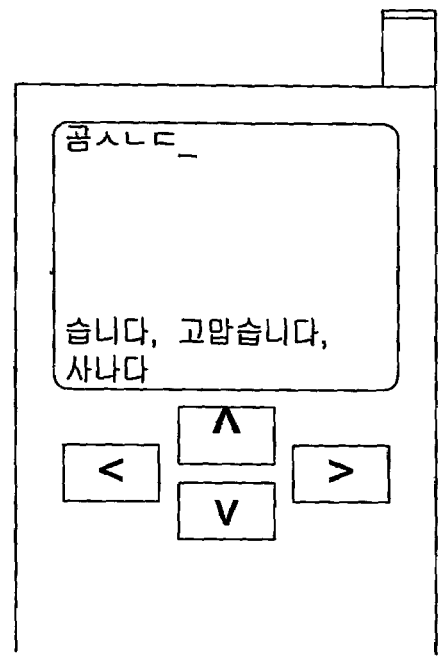
FIG. 13-3
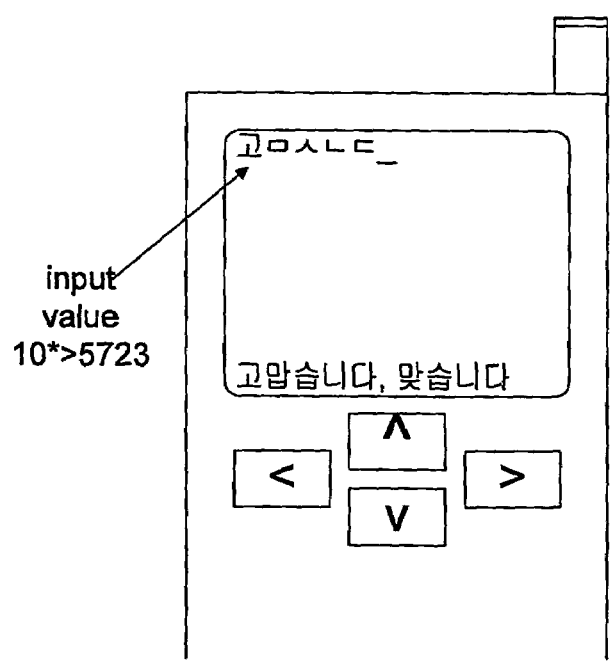

APPARATUS AND METHOD FOR INPUTTING ALPHABET CHARACTERS

BACKGROUND OF THE INVENTION (a) Field of the Invention

The present invention relates to an apparatus and method for inputting characters from a keypad. More specifically, the present invention relates to an apparatus and method for inputting characters from a keypad having a small number of buttons such as a telephone keypad.

(b) Description of the Related Art

With the progress of mobile communications, a function of receiving and sending digital information such as text messages is added to a mobile station chiefly used for voice calls. Hence, the keypad provided on the mobile station for the entry of a telephone number additionally has a function of entering characters, thus reducing the size of the keypad used as an input means in the mobile station and hence limiting the number of buttons included on the keypad. Alphabets of every language are usually much more than 12 keys on the keypad. Therefore a need exists to represent every character with buttons on a telephone keypad alone or in combination of two or more different types.

SUMMARY OF THE INVENTION

The present invention suggests the improvement of the prior documents of the applicant (Application No. PCT/KR00/00601, PCT/KR01/00076, PCT/KR01/02267, PCT/KR02/01355, and PCT/KR03/01433). The contents of the prior documents will be written in this description in part, but refer to the prior documents in connection with necessary parts, which are not written in this description of the present invention.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1-1. An example of Base Keypad in English

FIG. 1-2. An example of Succession Keypad that the character located in the center is designated as a representative character and the rest characters are designated as succession characters (example of English)

FIG. 2-1. An example of Succession Keypad in Japanese (1)

FIG. 2-2. An example of Succession Keypad in Japanese (2)

FIG. 2-3. Graph of 2-dimensional Multi-use (or Reuse) Cross Control Processing Method FIG. 2-4. Graph of 2-dimensional Cross Control Processing Method FIG. 3-1. (NONE)

FIG. 4-1. An example that a basic consonant and a basic vowel are grouped into a group (1)

FIG. 4-2. An example that a basic consonant and a basic vowel are grouped into a group (2)

FIG. 4-3. An example that a basic consonant and a basic vowel are grouped into a group (3)

FIG. 4-4. An example of a flow chart that represents processes of Repeat Selection Method when a pair of a consonant and a vowel is classified into a group FIG. 4-5. An example of Keypad using vowel elements in Korean (1)

FIG. 4-6. An example of Keypad using vowel elements in Korean (2)

FIG. 4-7. An example of Keypad using vowel elements in Korean (3)

FIG. 4-8. An example of Keypad using vowel elements in Korean (4)

FIG. 5-1. An example of inputting Chinese character using Pinyin index

FIG. 5-2. An example of inputting English word or phrase using Fully-Associated Simple Code FIG. 5-3. An example of recognizing and processing input values as Simple Code in Concurrent Input Method (1)

FIG. 5-4. An example of recognizing and processing input values as Simple Code in Concurrent Input Method (2)

FIG. 5-5. An example of Concurrent Input Method through clinet and server

FIG. 5-6. An example of Grouping word or phrase in index

FIG. 6-1. An example that a first server (i.e., switching server) interprets Simple Code transmitted from the client, and transmits the information obtained by the interpretation of Simple Code to a third server which uses the information

FIG. 8-1. (NONE)

FIG. 9-1. (NONE)

FIG. 10-1. An example of CVSK (Consonant-Vowel Separated Keypad) in a language using Roman alphabet (1)

FIG. 10-2. An example of CVSK in a language using Roman alphabet (2)

FIG. 10-3. An example of CVSK in a language using Roman alphabet (3)

FIG. 10-4. An example of CVSK in a language using Roman alphabet (4)

FIG. 10-5. An example of Short-cut Input Method in CVSK, and an example of recognizing and processing input values as Simple Code in Concurrent Input Method (Chinese)

FIG. 10-6. An example of CVSK in a language using Roman alphabet (5)

FIG. 10-7. Flow chart of Language Restricted Input Method in CVSK (1)

FIG. 10-8. Flow chart of Language Restricted Input Method in CVSK (2)

FIG. 10-9. Flow chart of Language Restricted Input Method in incomplete CVSK FIG. 10-10. An example of concurrent input method (1)

FIG. 10-11. An example of concurrent input method (2)

FIG. 10-12. An example of flowchart of concurrent input method

FIG. 10-13. An example of flowchart of language restricted concurrent input method FIG. 10-14. An example of full input method storing full code (i.e., button values according to FIM) in index FIG. 10-15. An example of concurrent input method using word or phrase which consists of only representitive character (1)

FIG. 10-16. An example of concurrent input method using word or phrase which consists of only representitive character (2)

FIG. 10-17. An example of processing retroflexes (i.e., "ch", "sh", "zh") as input value of short-cut input method FIG. 11-1. An example of system conFIG. uration when (an) input value(s) is/are interpreted at clinet side FIG. 11-2. An example of system conFIG. uration when (an) input value(s) Gis/are interpreted at server side FIG. 11-3~FIG. 11-10. Examples of processing Simple Code (in Concurrent Input Method)

FIG. 11-11. An example of the type of Simple Code (i.e., short-cut code or short-cut input value)

FIG. 12-1. (NONE)

FIG. 13-1~FIG. 13-4. Examples of Concurrent Input Method for Inputting Word or Phrase by Full input Method in Part and by Short-cut Input Method in Part FIG. 14-1~FIG. 14-2. Examples of Control Processing Method using Long Pressing (graph)

FIG. 14-3. An example using short pressing after long pressing (graph)

FIG. 14-4. An example using long pressing after short pressing (graph)

DETAILED DESCRIPTION OF THE PREFERRED EMBODIMENTS

First, the content of the prior documents will be explained by language as follows. It is apparent that although not specifically described, the content of the prior documents related to a certain language is also applicable to other languages.

1. Common Supplementary Explanation 1.1. Applications of Keypad in Prior Documents and Present Invention It is apparent that the keypad proposed in the prior documents and the present invention can be used in all applications that have the form of a telephone keypad, including a numeral keypad of mobile terminals or standard keyboards, a keypad implemented on a screen in software, or a door lock. Although the numeral keypad of the standard keyboards differs in the arrangement of numeral buttons from the keypad of the prior documents and the present invention, the arrangement of the buttons on the keypad of the prior documents and the present invention may be applicable to the keypad of the keyboards. For example, the character assigned to a button [1] in the prior documents and the present invention is set to the button [1] on the numeral keypad of a keyboard, et cetera, which method is applicable to the entry of a character, the use of simple codes and memorization of various codes.

1.2. Determination of Successive Stroke Delay Time (SSDT) and Discrete Stroke Delay Time (DSDT)

For some languages such as Korean and Hindi in which consonants and vowels alternately appear, a pair of a representative consonant and a vowel is assigned to each button such that the consonant is input with one stroke and the vowel is input with two strokes. An algorithm may be implemented to first recognize two strokes of a button given at a predetermined delay time (for example, 0.1 second) interval as a vowel and enable the user to efficiently enter the vowel easily. The delay time has to be determined in consideration of the time interval commonly spent for a stroke in successively pressing the same button. Expediently, such a delay time is called "Successive Stroke Delay Time (SSDT)". Also, an algorithm may be implemented to first recognize two strokes of a button given at a predetermined delay time (for example, 1 second) interval as two consonants. Expediently, such a delay time is called "Discrete Stroke Delay Time (DSDT)". This may also be applicable to three or more strokes of the same button.

Figures 2, 3:
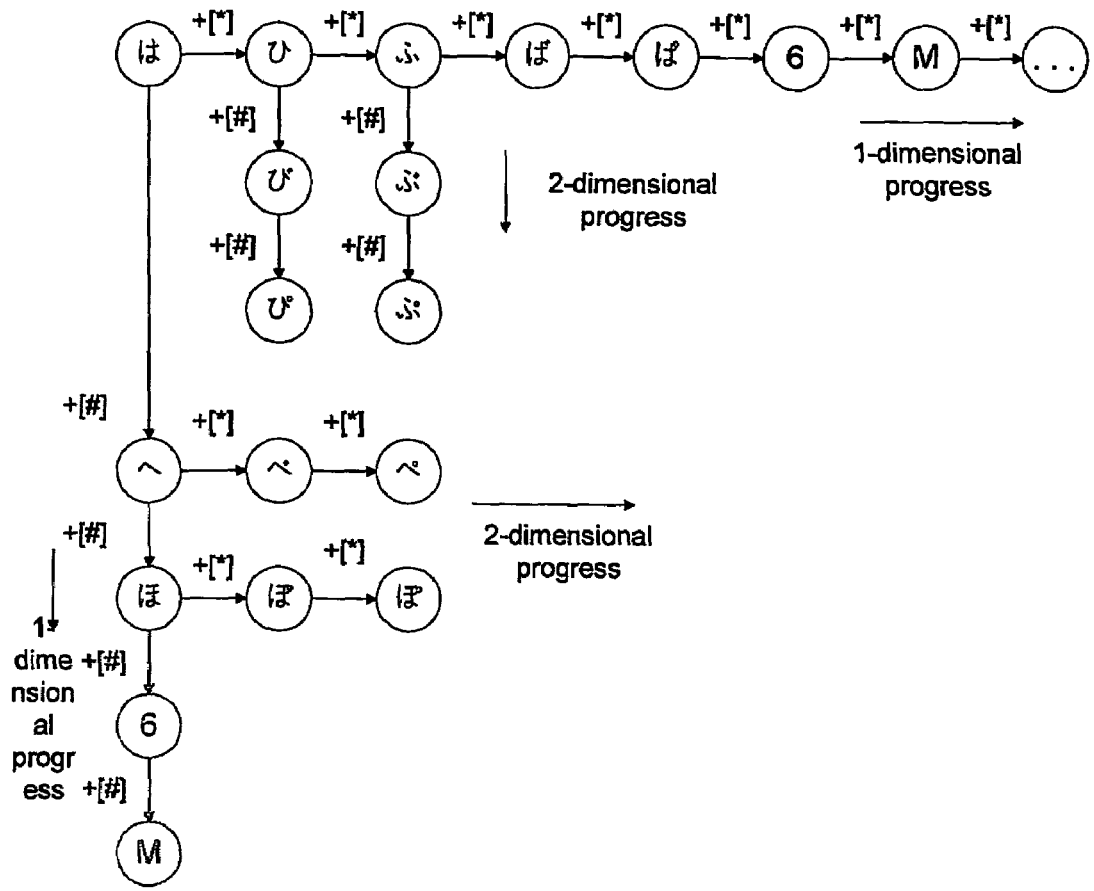
Figures 2, 3, 4:
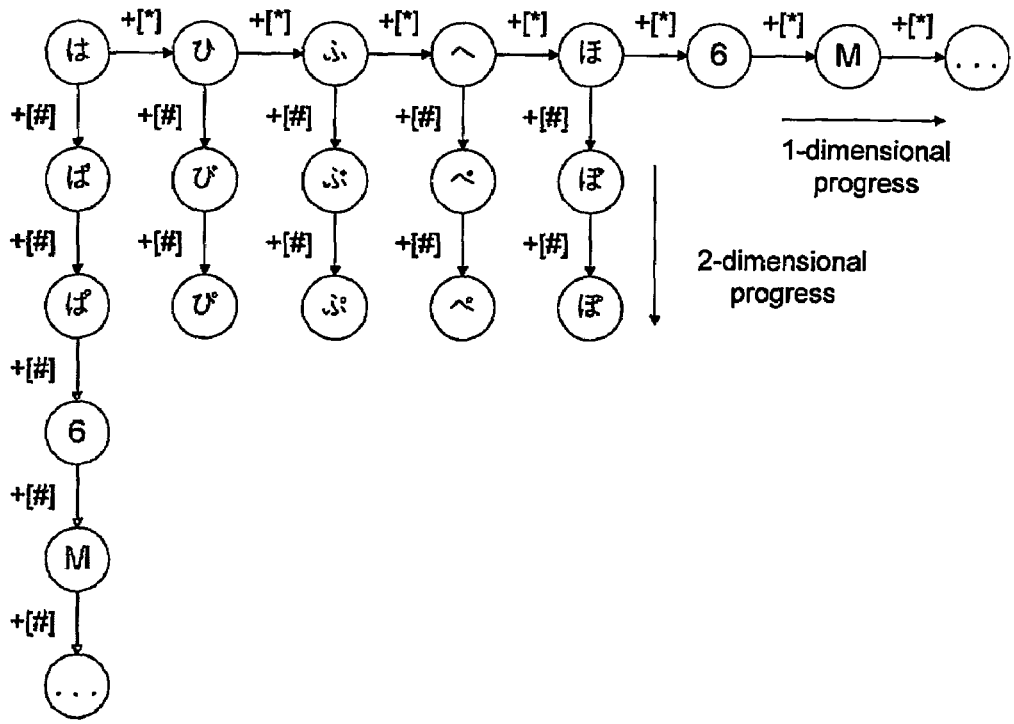
Figure 4:
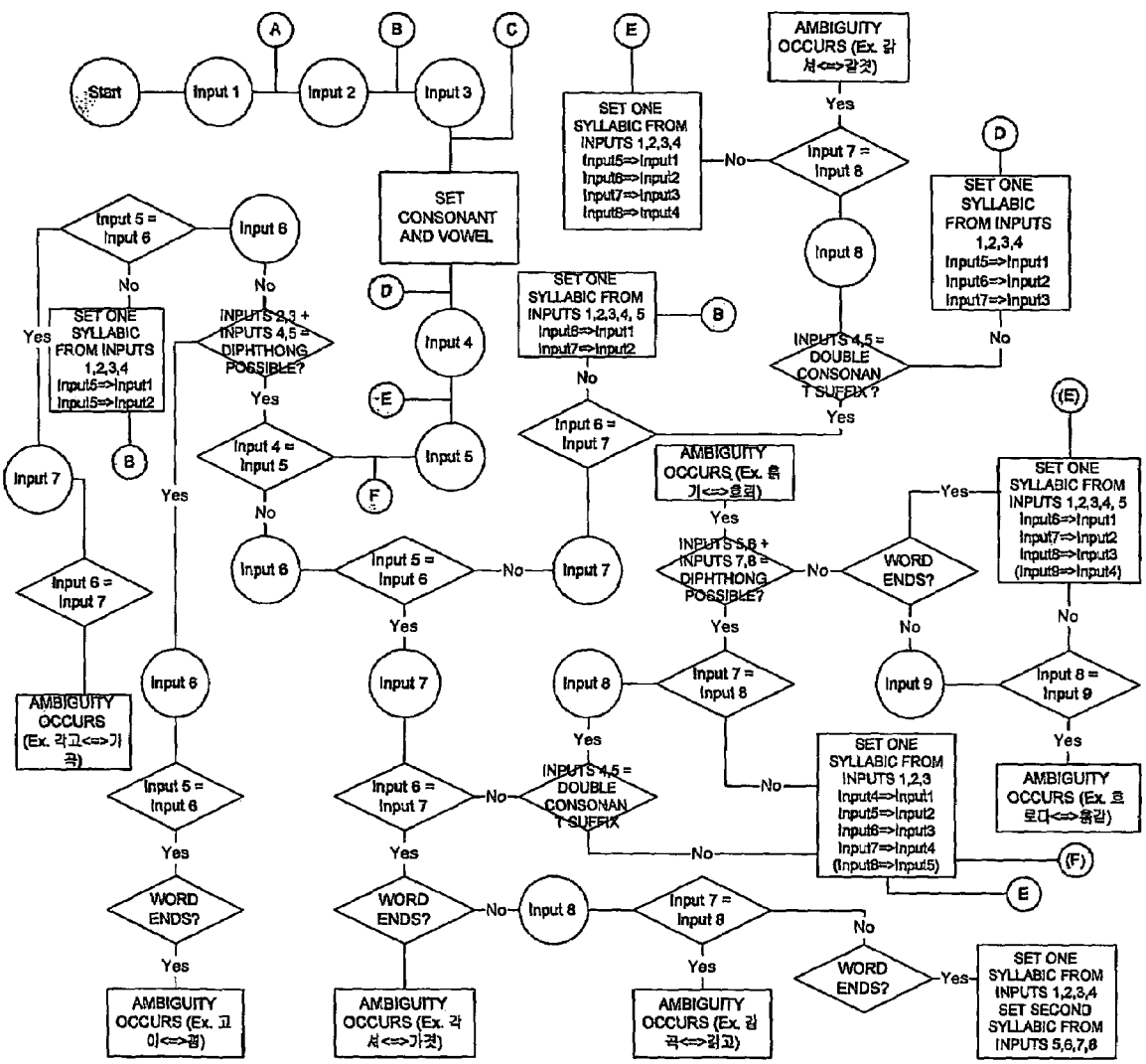
Figures 1, 5:
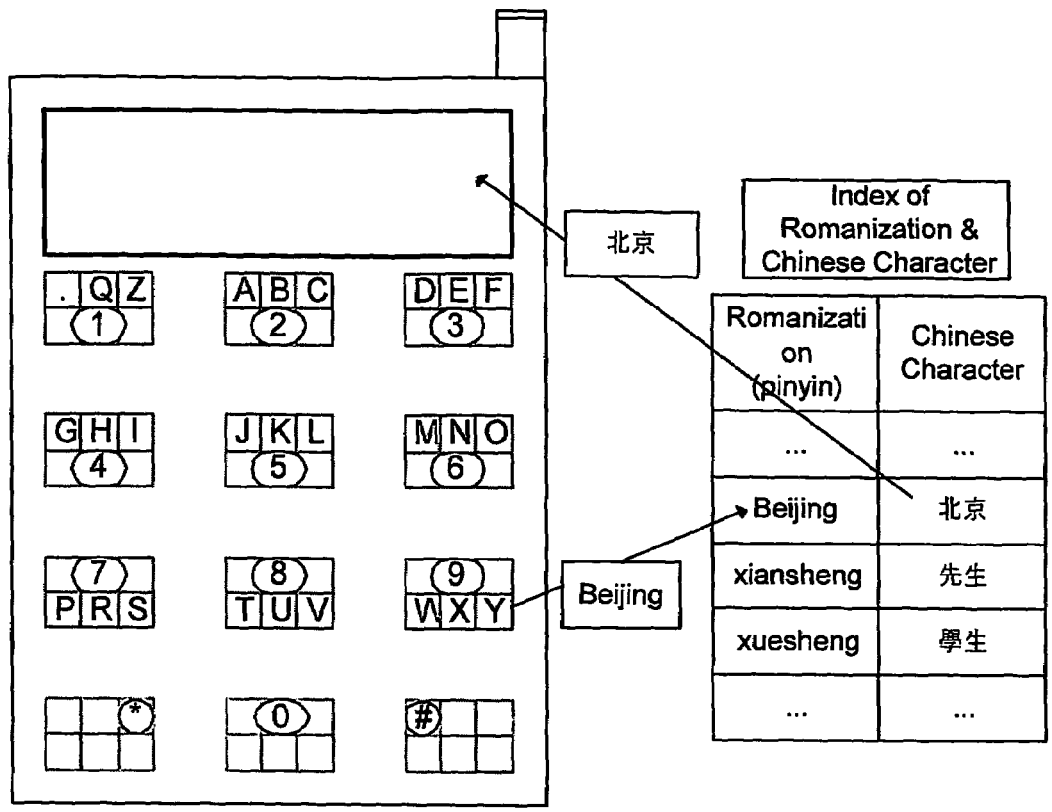
Figures 2, 5:
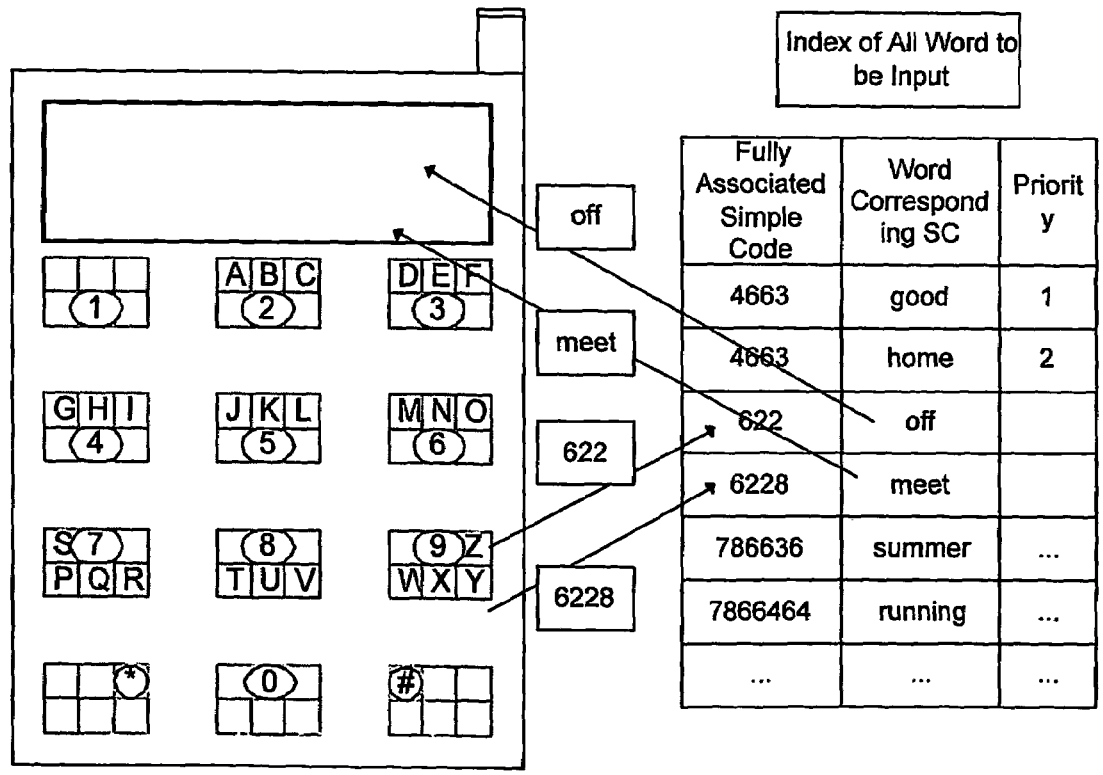
Figures 3, 5:
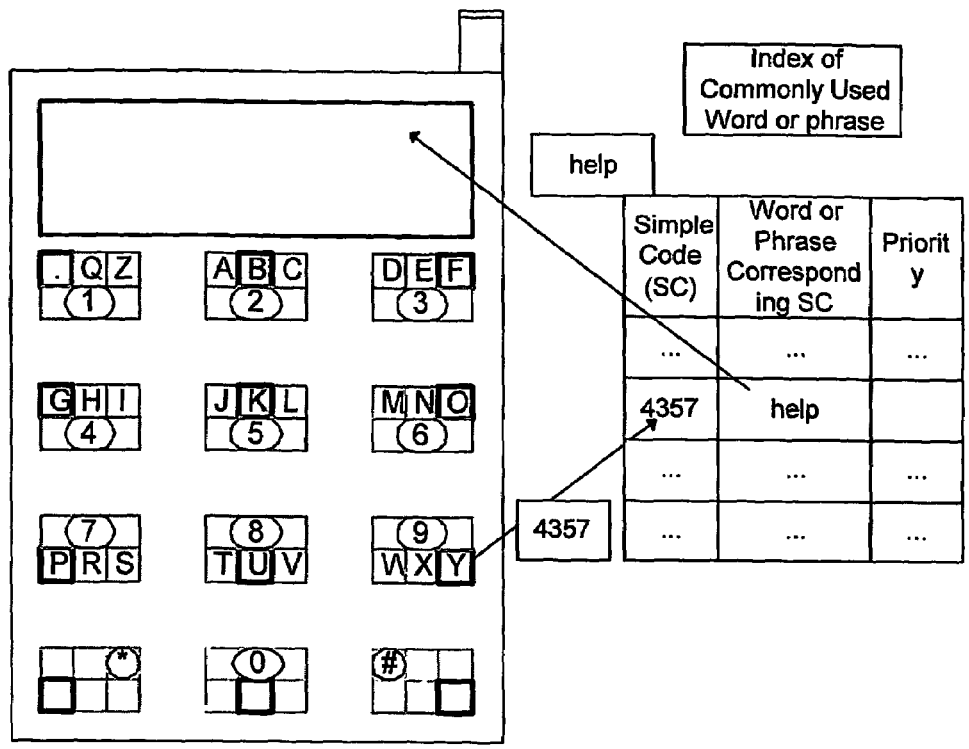
Figures 4, 5:
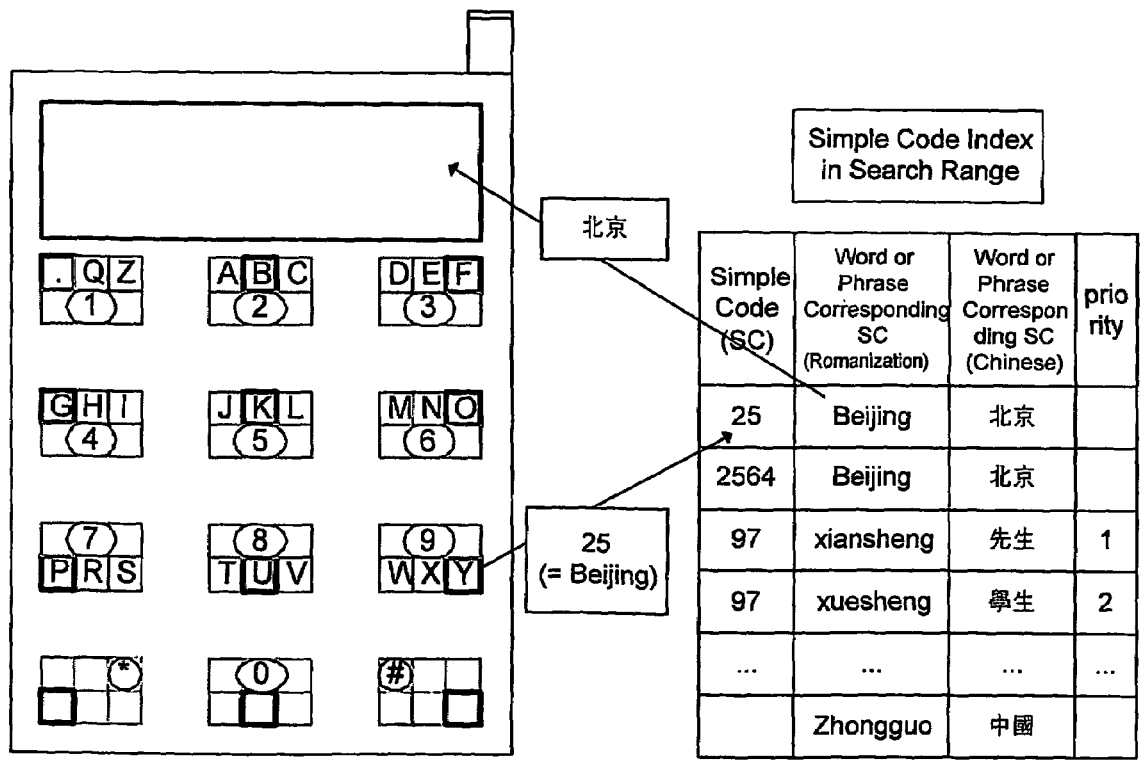
Figure 5:
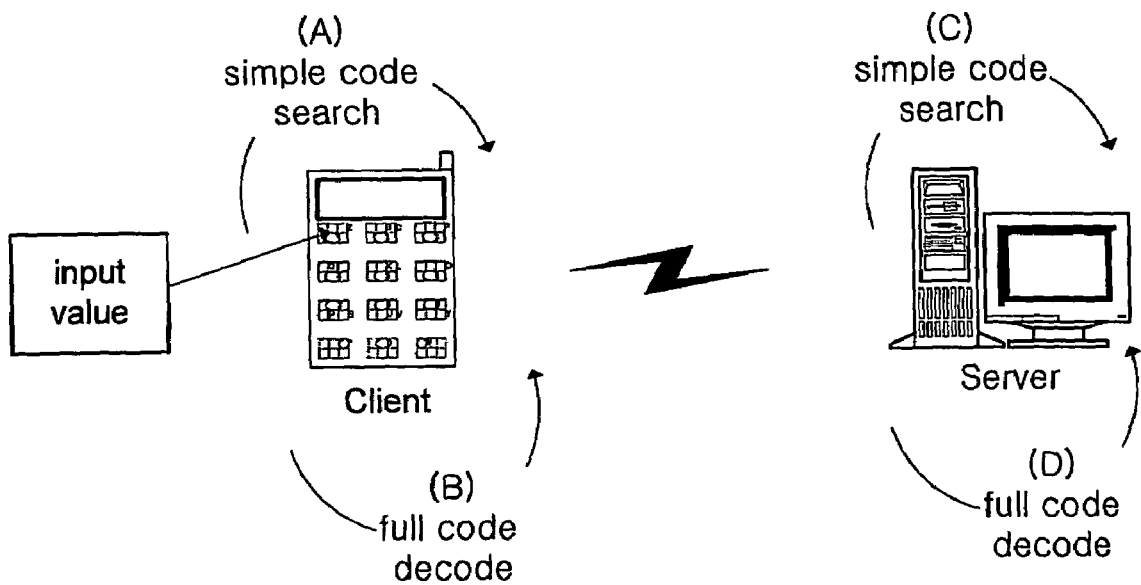

For instance, if the user presses the button [1] twice with a delay time of 0.08 seconds as in FIG. 4-1 or 4-2, the two strokes are first recognized as a vowel, i.e., ""ㅗ"", and if with a delay time of 1.1 second, the two strokes are first recognized as two consonants, i.e., ""ㄱ"" and ""ㄱ"." If the delay time is 0.5 seconds, it is possible to determine whether the user intended to enter one vowel or two consonants, from the structure of the corresponding language showing the way that consonants and vowels appear in the language. Even if the delay time of two strokes is 0.08 or 1.1 seconds, whether to recognize the two strokes as one vowel or two consonants can be determined finally from the structure of the language showing the way that consonants and vowels appear in that language.

Conventionally, the time interval is fixed (for example, as 1 second) so as to recognize successively pressing a button twice within the corresponding time as two successive strokes and successively pressing a button twice at a time longer than the corresponding time as two discrete strokes. There is a difference in the reference time delay value between recognition of two successive strokes (for example, 0.1 second) and recognition of two discrete strokes (for example, 1 second).

Typically, RSM is preferable to PWSM in the prior documents in the aspect of convenience of entry. Therefore, this method having the advantages of RSM (i.e., simplicity of input rules and convenience) uses the structure of a specific language where consonants and vowels appear alternately, to avoid ambiguity and to simplify the implementation of an algorithm in such a manner that SSDT is different from DSDT and the user is allowed to designate SSDT and DSDT.

2. Multi-Dimensional Cross Control Processing Method

FIG. 2-2 shows an example in which the characters in the ""あ"" column are designated as representative characters and are assigned to the individual buttons in the dictionary order according to the above table. While fourth and fifth controls can be additionally assigned to the control buttons for second and third controls in the prior document of the applicant, only the second and third controls are assigned to the control buttons in order to minimize the number of strokes and to make the best use of the control buttons in this example.

The method for entering succession characters in FIG. 2-2 is the same as described in the prior document of the applicant. For example, when a control is set to be selected after the input of a basic character, the entry is given as "い=あ+[*]". Next, a method for entering affixed characters (in other words, transformational characters) of each character, i.e., long sound, voiced sound and semi-voiced sound, is presented. In FIG. 2-2, buttons available as control buttons (buttons [*] and [#]) are each used as a succession control button. So there is no control button for affixed characters. But in the case where the basic character of a target character is a succession character, the succession control button not used as a succession control button after the input of the succession character can be used as an affixed character control button (expediently, called "opposite control button").

For example, entries are given as い=い+"opposite control button"=あ+[*]+[#] and ご=こ+"opposite control button"=か+[#]+[#]+[*]. It can be understood that the opposite control button not used as a succession control button for entering い is used as control button for an affixed character in the control processing method, considering い to be the affixed character of a basic character い. The Jump Control Processing Method(JCPM) as suggested in the prior document of the applicant can also be applied to this case. From a standpoint of the chain-type control processing method, one stroke of the opposite control button selects "next control" for entry of the affixed character (e.g., ご) of a previously input character (e.g., こ).

As there are two affixed characters of a character on the row of は i.e., voiced sound and semi-voiced sound, one stroke of the opposite control button is set for the long sound and two strokes of the opposite control button for the semi-voiced sound. Namely, entries are given as ぁ=あ+"opposite control button"=は+[*]+[*]+[#], ぷ=ふ+"two strokes of opposite control button"=は+[*]+[*]+[#]+[#].

The same method is inapplicable to the case where the basic character of a target character is a representative character. In this case, the affixed character of the representative character is additionally assigned to one of the succession control buttons to enter the target character.

For example, button [*] is used to enter the affixed character (long sound, voiced sound or semi-voiced sound) of a representative character, the entry is given as あ=あ+[*]+[*]+[*]. Namely, the affixed character (long sound, voiced sound or semi-voiced sound) of a representative character is considered as the fourth succession character that can be entered using button [*]. This can be summarized as follows.

That is, the case of using one control button for entry of one character is called "One-dimensional Cross Control Processing(1CCP)". This means that the control button is used in the "one-dimensional" manner. Contrarily, two different control buttons are used for entry of one character in the Two-dimensional (Cross) Control Processing Method. For example, considering ご as the affixed character of こ, the entry is given as ご=こ+"opposite control button"=か+[#]+[#]+[*]. Though the opposite control button is defined as a control button for entry of the first and second succession characters of the representative character, i.e., き, く, <the opposite control button (button [*]) in this case is used as an affixed character control button for entry of ご that is the affixed character of こ..

| Representative Character | Using Button [*] | | Using Button [#] | | Using Either of Button [*] or [#] (e.g., Button [*]) | | | | | | |
|---|---|---|---|---|---|---|---|---|---|---|---|
| | $2^{nd}$ | $3^{rd}$ | $4^{th}$ | $5^{th}$ | $4^{th}$ | $5^{th}$ | $6^{th}$ | $7^{th}$ | | ... | ... |
| あ | い | う | え | お | あ | 1 | English 1 Q | English 2 Z | English 3 | Symbol 1 | ... |
| | い | う | え | お | | | | | | | Using Opposite Control Button |
| か | き | く | け | こ | が | 2 | English 1 A | English 2 B | English 3 C | Symbol 1 | ... |
| | ぎ | ぐ | げ | ご | | | | | | | Using Opposite Control Button |
| ... | | | | | | | | | | | |
| は | ひ | ふ | へ | ほ | ば | 6 | English 1 M | English 2 N | English 3 O | ... | |
| | び | ぶ | べ | ぼ | | | | | | | Using Opposite Control Button |
| | ぴ | ぷ | ぺ | ぽ | | | | | | | Using Opposite Control Button |
| ... | | | | | | | | | | | |
| や | ゆ | | よ | | や | | | | | | |
| | ゆ | | よ | | | | | | | | Using Opposite Control Button |
| ... | | | | | | | | | | | |

Such a method of using the opposite control button to extend the use of the control button for entry of more characters or the like is called "Cross Control Processing Method (CCPM)", "Zigzag Control Processing Method(ZCCP)" or "Multi-dimensional Cross Control Processing(MCCP)". MCCP is applicable for the case that there are three control buttons or more than three control buttons.

It is apparent that the blanks other than those of the first column in the above table can also be used to enter other characters or various symbols. In the above example, only one opposite control button was used. Namely, as the entry of ぷgiven as ぷ=ふ+"two strokes of opposite control button"=は+[*]+[*]+[#]+[#], one opposite control button (button [#]) is applied for button [*] used as the succession control button by repeatedly selecting the opposite control button. Expediently, this method is called "Two-dimensional Cross Control Processing Method(2CCPM)" or "Two-staged Cross Control Processing".

It can be understood that two control buttons are used in the "two-dimensional" manner for entry of one character in comparison to using one control button in the one-dimensional manner.

The entry may also be given as ぷ=ふ+"one stroke of opposite control button"+"one stroke of opposite control button for previous control button"=は+[*]+[*]+[#]+[*]. If it is impossible to enter an affixed character by repeatedly using a control button (e.g., button [#]) used last for entry of ご, the opposite control button for the previous opposite control button can be used again to enter another affixed character or succession character. Expediently, this method is called "Three-dimensional Cross Control Processing(3CCP)" or "Three-staged Cross Control Processing". This means that the number of entries available related to the characters on the keypad or other characters is infinitely expandable using the Multi-dimensional Cross Control Processing Method. Moreover, the succession or affixed character related to the previously input character can be simply entered via control processing method.

The above-description is illustrated in the form of graph in FIG. 2-3 that exemplifies the row of ㅂhaving two affixed characters (voiced sound and semi-voiced sound). In FIG. 2-3, the light-colored symbol " . . . " marked in a circle means that an additional character or symbol, if necessary, can be entered by the Multi-dimensional Control Processing Method in a like manner to entering another character or symbol in the blank of the above table. In FIG. 2-3, buttons [*] and [#] are each used in the orthogonal direction.

In the prior document of the applicant, the second to fifth controls that are not the representative characters among the characters in the 50-character table are assigned to the button [*] and the button [*] is used as a control button for entry of affixed characters such as long sound, voiced sound and semi-voiced sound. This means that the two-dimensional control processing was also applied in the prior document of the applicant. Namely, two control buttons are used for the entry given as ㅑ=ㅏ+{affix}=ㅏ+[*]+[#]. In the prior document of the applicant, the control button is used only as a succession control ($2^{nd}$, $3^{rd}$, $4^{th}$ or $5^{th}$) button or an affixed character (long sound, voiced sound or semi-voiced sound) control button. Contrarily, in the two-dimensional control processing of the present invention, a succession control button is also used as an affixed character control button after the entry of a succession character. The reuse of a major control button (succession control button in the above example) as an affixed character control button is called "Two-dimensional Reuse Control Processing(2RCP)" or "Two-dimensional Multi-use Control Processing(2MCP)" in contrast to the Two-dimensional Control Processing of the prior document.

The method of the prior document is simple and consistent but needs a relatively larger number of strokes. To understand the difference between the prior document and the present invention, the use of a control button only as a succession control ($2^{nd}$, $3^{rd}$, $4^{th}$ or $5^{th}$) button or an affixed character (long sound, voiced sound or semi-voiced sound) control button in the prior document is illustrated in the graph of FIG. 24. In FIGS. 2-3 and 2-4, the marked portion in light color can be extendedly applied.

In the above example, a control is set to be selected after the input of a basic character in the Cross Control Processing Method. But a control can also be set to be selected before the input of a basic character in the cross control processing in a like manner to setting the control selected after or before basic character is applicable in the control processing method of the prior document. For example, the entry is given as ㅏ="opposite control button"+ㅏ=[#]+[*]+ㅎ. But it is more convenient to set the control selected after basic character in the Cross Control Processing.

The same is applied to any other language including Japanese. For example, when using buttons [*] and [#] for entry of a succession character in Arabic by CPMERC, the multi-dimensional cross control processing is applied to enter affix type vowels. For Thai, the multi-dimensional cross processing is applied to enter tone symbols in the case of using buttons [*] and [#] for entries of succession consonants and succession vowels.

3. Method for using Vowel Elements in Korean

FIGS. 4-1, 4-2 and 4-3 show an entry method in which pairs of a basic consonant and a basic vowel in Korean are assigned to the individual buttons and in which each basic consonant and basic vowel marked on the keypad is entered by repeat selection processing. In FIG. 4-1, aspirated consonants, tense consonants, and extended vowels are entered via control processing. In FIG. 4-2, aspirated consonants and tense consonants are entered via control processing. In FIG. 4-3, aspirated consonants, tense consonants, basic vowels, and extended vowels are entered via control processing.

FIG. 4-4 is no more than a flow chart for realization of the invention, and more efficient programming is possible. For example, in the case of considering final consonant in FIG. 4-4, more efficient programming is possible by checking whether the consonants can form double final consonants.

The example of Korean suggested in the prior art may be applicable to other languages having a similar feature (i.e., a structure having consonants and vowels appearing alternately). For other languages, the feature of consonant and vowel appearance of the corresponding languages may be taken into consideration.

For example, a Hindi entry system using basic consonants and basic vowels can be realized in the same manner as Korean, in consideration of the features of Hindi. The establishment of the Hindi entry system is simpler than that of the Korean entry system because the rules of consonant and vowel appearance in Hindi are simpler than that in Korean.

FIGS. 4-5 to 4-8 are views showing an example in which vowel elements in Korean is used and the vowel button is utilized as a control button. Refer to the prior document of the present applicant in connection with the present invention.

4. Simple Code Application Method and SIM/CIM 4.1 Production of Character-Associated Simple Code Entry of characters is indispensable in access to the information system with a data communication terminal. There are some cases where such characters are coded into numerals. A miniaturized data communication terminal usually has an interface in the form of a normal keypad. Here, the term "code" as used herein refers to any types of code, the examples of which are numerous including telephone number, stock index (listed company) code, city code, quarter code, subway station code, bank code, etc. Coding of various names has an advantage in the sense of simplification of entry.

The data communication terminal as used herein includes any type of data communication terminals such as PC, mobile communication equipment, smart phone, PDA, bidirectional text transceiver, ATM (Automated Teller Machine), or the like, as well as non-communication terminals such as electronic diary. The information system as used herein includes any type of systems accessible visually via GUI or only aurally accessible, such as ARS. The system also includes a server system, and in a broad sense, a client software of the terminal in communication with the server system.

Alphabet allocated to the keypad may be used for memorization of various codes. There are many approaches for this purpose, including simple naming, initial naming or full naming. Now, a description will be given as follows.

Simple naming is to designate a numeral associated with a given word or phrase as a code. For example, a Korean company name, "가산전자" has a simple code "1799" associated with ㄱ, ㅅ, ㅈand ㅈ, as shown in FIG. 4-2. In this case, characters ㄱ, ㅅ, ㅈand ㅈin "가산전자" associated with the simple code "1799" are marked in bold, so that the user can notice the simple code of a specific word with ease. Furthermore, the simple code can be extracted from a word or phrase. The simple code of ""가산전자"", for example, is specifically not limited to "1799", because the code consists of numerals associated with any character belonging to a given word in the simple naming. For example, as the simple code of "주식이란" is set as a value associated with ㅈ, ㅅ, ㅣand ㄹ, that of "가산전자" may become "1729" associated with ㄱ, ㅅ, ㄴ and ㅈ, or "1949" associated with ㄱ, ㅅ, ㅓ and ㅈ, or "13294293" associated with all characters constituting "가산전자". Expediently, designation of a code associated with all characters forming a given word or phrase is referred to as "Fully Associated Simple Naming (FASN)", and designation of a code associated with part of characters forming a given word or phrase is referred to as "Partially Associated Simple Naming (PASN)". In either case, simple naming (i.e., simple code) is associated with characters constituting a given word or phrase. The same applies to other languages as well as Korean. For example, "captain" may have a simple code of "2786" associated with consonants "CPTN" as a partially associated simple code, which is expediently referred to as "Consonant-Associated Simple Code".

The consonant-associated simple code of a word "escape" that starts with a vowel is "727" corresponding to "SCP", which is the same as the consonant-associated simple code of "scape". Thus a simple code associating the first vowel with consonants can be considered in order to minimize overlapping of the defined simple code and the corresponding word or phrase and to improve convenience in use while using the simple code. Expediently, this is referred to as "First Vowel+Consonant-based Simple Code(1VCSC)". Like the other simple codes, the first vowel+consonant-based simple code is advantageous in that the simple code can be mechanically generated for a specific word.

A phrase as well as a word can be coded by simple naming. From a phrase "어디로 가려는가" in the example of the prior document, letters (syllables) full of meaning are used to extract a simple code "8314" mapped to ㅇ, ㄷ, ㄱ and ㄹ. For English, "data tonight" in the example of the prior document may have a simple code "3886" associated with characters having a phonetic value, such as d, t, t and n.

Initial naming is a special case of the partially associated simple naming. For Korean, initial naming designates a numeral mapped to the initial consonant of a syllable (letter) as a code. Expediently, this method is referred to as "Syllable-Based Initial Naming (SBIN)". For example, the syllable-based initial code of "가산전자" extracted by the syllable-based initial naming is "1799" associated with the initial consonant of each syllable (letter). The syllable-based initial naming also applies to other languages as well as Korean. For example, an English word "entertainment" has an syllable-based initial code "3886" associated with e, t, t and m according to the syllable-based initial naming. The syllable-based initial naming is more useful for Korean in which one syllable constitutes one letter. It is also applicable to other languages such as Chinese and Japanese in which one syllable is formed by one character, as well as Korean. For Chinese, the syllable-based initial code of 北京(Beijing: the fourth tone symbol is attatched to the first "e" and the second tone symbol is to the last "i") is "25" associated with b and j with reference to FIG. 1-1, or "14" with reference to FIGS. 10-1 to 10-4.

Likewise, the initial naming is also applicable to a phrase. For example, a phrase "어디로 가려는가" in the example of the prior document may have an initial code "81" associated with the initial characters of each word, ㅇ and ㄱ. An English phrase "dance with the wolf" has a word-based initial code "3979" associated with d, w, t and w according to the word-based initial naming. The word-based initial naming is more useful for every language when the code is assigned to the entire phrase.

Expediently, both a simple code (i.e., fully associated simple code and partially associated simple code) and an initial code (i.e., syllable-based initial code and word-based initial code) are called "simple code (in a broad sense)" or "short-cut code". Especially, each of fully associated simple code, consonant-associated simple code, syllable-based initial code and word-based initial code follow regulations in their production and thus are generally used in practice. In addition, simple codes generated by others according to the regulations may also be readily used.

Full naming is an input value of a given word or phrase to be coded according to a specific character input method and thus variable depending on the used character input method. A numeral value corresponding to a given word or phrase is coded character by character. For example, "서울" in the prior document has a full code "7745888944" according to PWSM (disclosed in the prior document) as illustrated in FIG. 4-2. The full code of "서울" according to BRSM (disclosed in the prior document) becomes "7448884". If using another keypad different from that of FIG. 4-2 or another character input method, a specific full code value may be given according to the keypad or the character input method.

4.2 Conventional Chinese Character Entry Method

A general entry method for Chinese characters involves entering English characters corresponding to the pronunciation of the Chinese, using an "English-to-Chinese transition key" to display convertible Chinese characters and selecting the corresponding Chinese characters, as in the case of entering Chinese characters in the Korean mode. Namely, when the user enters Chinese sounds compatible with Roman characters, the system searches the corresponding Chinese character and provides it for the user. Refer to FIG. 5-1. The full codes in Chinese can be defined on the basis of English pronunciation of the Chinese character.

4.3 Unique Simple Code

If the client terminal is in charge of decoding the simple code (i.e., when the client terminal has a specific word or phrase and its simple code value), the word or phrase corresponding to the input simple code is transferred to the server. In the case where the server requests the simple code according to the feature of the application while the client terminal is enable to decode the simple code, the client terminal sends the simple code itself (i.e, displays the numeral) to the server, which then decodes the simple code. Thus the simple code is decoded in either the client terminal or the server.

With a simple code for multiple words or phrases, there can be many words or phrases corresponding to the same simple code. Such ambiguity between the simple codes in CIM is expediently called "second ambiguity". Although the system may add a serial number to the simple code to store a unique code value in this case, the second ambiguity occurs because the user normally uses the simple code associated with a specific word or phrase. Of course, the system has to recommend such words or phrases based on the priority for use to the user. With the same simple code for different words or phrases, the system adds a serial number to the simple code according to the priority based on the use frequency of the words or phrases and utilizes the serial number as priority in recommendation of words or phrases to the user. Here, the system does not necessarily add a serial number to the simple code and may have separate information about the priority.

For example, when the simple codes of ""증권정보"" and ""주권정보"" are both "9196" as a syllable-based initial code, the system adds a serial number to the simple code according to the use frequency of each word and uses the serial number as priority for recommendation of words to the user.

If "증권정보"has the higher use frequency, the system gives the priority to that word and defines a new simple code "91961" for ""증권정보"" and "91962" for ""주권정보".". Likewise, if 先生(xiansheng: vowel "a" is the first tone) and 學生(xuesheng: the first "e" is the second tone) have the same syllable-based initial code of "97", a serial number can be attached to each word according to the use frequency of the word to be used for prioritizing the word. For example, when 先生(xiansheng) is used more frequently than 學生(xuesheng), the syllable-based initial codes are "971" for 先生(xiansheng) and "972" for 學生(xuesheng). Such a simple code with a serial number is expediently called "unique simple code" and an overlapped simple code having no serial number is called "simple code", both of which are just referred to as "simple code".

In the example of 先生(xiansheng) and 學生(xuesheng), when the user enters "97" alone, the system offers 先生(xiansheng) and 學生(xuesheng) to the user for selection. Upon the user entering "971", the system recognizes "971" as 先生(xiansheng).

Highlighting "x" and "s" used as the basis of the syllable-based initial code may have a better visual effect on the user. One of the highlighting methods is capitalizing as 先生(Xian-Sheng). The system may extract the simple code "97" from the partially capitalized word.

4.4. Use of Simple Code

The following is the example of simple codes (for example, syllable-based initial codes) assigned to various city names, which are useful in the railway information system, or the like:

學生=78, 수원=78, 대전=39, 신탄진=739, . . .

Because ""서울"" and ""수원"" have the same syllable-based initial code, the system adds a serial number to the simple code as "學生=781" and "수원=782". If the user sends only "78" to the system, then the system properly performs feedback (e.g., provides a list of 學生and 수원or informs of the list in a voice) so that the user can select either 學生or 대전Upon the user entering "781" initially, the system recognizes the simple code as "신탄진".

If the server requests the word ""서울"" instead of the simple code "78", the client terminal interprets the simple code "78" as ""서울"" and sends it to the server. In the case where the server requests the simple code according to the feature of the application while the client terminal is enable to decode the simple code, the client terminal has only to send the simple code itself to the server.

In another example for assigning simple codes (fully associated simple code, syllable-based initial code, consonant-associated simple code, and first vowel+consonant-associated simple code) for a city name, 北京(Beijing) has a syllable-based simple code of "25" associated with "b" and "j", a fully associated simple code of "2345464", and a consonant-associated simple code of "2564" associated with "b", "j", "n" and "g" with reference to FIG. 1-1.

The simple codes of stock index (listed company) codes are given as follows, which are useful in various stock information system, or the like:

"수원"=3098, 디지털조선=39397, 한통프리텔=83643, . . .

For example, ""ㄷ, ㅈ, ㅌ, ㅈ, ㅅ"" used as a base for the syllable-based initial code of ""디지털조선"" are marked in bold to provide a more powerful visual effect to the user.

The simple codes of bank codes are given as follows, which are useful in the ATM and various financial information systems:

국민(bank)=14, 하나(bank) =82, . . .

It is apparent that a predefined simple code can be used for entry of a word or phrase in such a manner that the user enters the predefined simple code and then the client (terminal) provides the user with the decoded simple code. Such a method is called "Short-cut Input Method (SIM)", which will be described later together with "Concurrent Input Method (CIM)".

4.5. Automatic Alteration of Priority Based on Selection Frequency

Initially, ""증권정보"" takes first priority over ""주권정보".". If a specific user tends to choose ""주권정보"" very frequently, it is possible to give priority to ""주권정보" over "증권정보".". For this purpose, use can be made of, if not specifically limited to, a method that involves exchanging serial numbers to alter the priority. Alternatively, the system may change separate information about the priority.

The system or the user may (re)designate criteria used in deciding whether the use frequency of ""주권정보"" is remarkably high. For example, when the user chooses ""주권정보"" in at least eight cases out of ten, the existing priority is automatically altered. The system may request the user to confirm the alteration of the priority according to given options.

The same is applied to the other languages. For example, 先生(xiansheng) and 學生(xuesheng) can replace ""주권정보"" and ""증권정보".", respectively, in the above case.

4.6 Automatic Designation of Simple Code and Marking Simple-Code-Associated Characters in Bold Not only fully associated simple code but also consonant-associated simple code, syllable-based initial code and word-based initial code follow regulations in their production. Hence, the user enters a specific word or phrase to designate a simple code for the word or phrase while the production regulations of simple codes are defined, and then the corresponding simple code is automatically extracted and stored in the system. Here, characters associated with the simple code are marked in bold to increase convenience for use. In regard to English, the characters associated with the simple code may be embossed as capital letters.

The prior document discloses the "SIM" and the "short-cut/full CIM". The simple code for short-cut input may be defined in the system and then altered by the user. The user may further designate a simple code for another word or phrase.

Designation of a simple code for a new word or phrase may follow defined regulations for production of simple codes, such as fully associated simple code, partially associated simple code, consonant-associated simple code, syllable-based initial code, or word-based initial code, as disclosed in the prior document. To produce a simple code for "dance with the wolf" from a word-based initial code, for example, the user has to enter "dance with the wolf" and then "3983" as a word-based initial code in the simple code create mode. Likewise, in order to produce a simple code for ""증권정보"" from a syllable-based initial code, the user has to enter ""증권정보"" and then "9196" in the simple code create mode.

It is however possible to designate a simple code for a specific word or phrase automatically without taking the trouble to enter a desired code type, if the user make the system memorize the desired type of the simple code. For example, when the user sets a desired type of the simple code as the syllable-based initial code in the system and simply enters ""증권정보",", the system designates the simple code for ""증권정보"" as "9196" in an automatic manner. Likewise, when the user sets the system to use syllable-based initial codes and enters 先生(xiansheng), the system automatically designates "97" as the simple code of 先生(xiansheng).

It has been described that characters of English associated with the simple code can be capitalized and marked in bold. In regard to this, when the user designates the use of capitals in the simple code in advance and enters "DaTe ToNight", the system automatically determines the simple code as "3886" corresponding to the capitals "DTTN". Otherwise, if the user enters "ToNight ShoW", the system automatically determines the simple code as "8679" corresponding to the capitals TNSW".

4.7 SIM and CIM using Simple Code for Word or Phrase

As the user enters a simple code (unless specified otherwise, the simple code includes the initial code, which is the special case of the simple code), the system (client system or server system) can recognize the simple code as its corresponding word or phrase. It is thus apparent that when the system recognizes a specific simple code as a corresponding word or phrase and displays the word or phrase, the user can utilize the displayed word or phrase in entering a new word.

In the character input method used in other countries, a character input system is realized in such a manner that the terminal (client system) stores the index having "fully associated simple codes" assigned word by word and displays corresponding words of a given code input from the user according to the priority order by words, thus allowing the user to determine the target word. For more information, reference to the Internet sites, http://www.tegic.com and http://www.zicorp.com is recommended. Hereinafter, such a method will be referred to as "fully associated SIM" or "foreign method". Expediently the method is also called "T9 Like Input Method (T9LIM)", because the representative input system using the approach is "T9" supplied by Tegic Co. FIG. 5-2 shows an input example of the T9 system. As shown in FIG. 5-2, when the user enters "622 . . . " for "meet", the system provides "off" for the user. Otherwise, when the user enters "6228", the system displays "meet".

A comparison between the methods by Tegic Co. and Zi Corp. and the method for entering characters from a keypad according to the prior document of the applicant reveals that the character input method of the applicant assigns unique codes to each character and thereby allows the entry of a target character or a target word (phrase) with a full code, while the above-mentioned foreign method assigns fully associated simple codes to each word and allows the entry of a target word with the simple code.

The foreign method has the following drawbacks: (1) it allows exclusively the entry of predefined words, because the code is assigned to each word; (2) when different words share the same code, it is difficult to enter words less frequency used, because the user takes the trouble to select and confirm the target word with a toggle button or a move button; (3) words other than the target one may appear temporarily during inputting of the word; and (4) a large storage capacity and much cost are required to implement the system.

It is possible to assign a simple code (i.e., partially associated simple code or fully associated simple code) to a commonly used word or phrase and use the simple code in entering the target word or phrase. Of course, the commonly used word or phrase and the simple code of the commonly used word or phrase can be predefined in the system and provided to the user, or arbitrarily designated by the user. Alternatively, the user should be allowed to arbitrarily alter the simple code predefined in the system. It is advantageous to allow the user to designate the simple code, because the user is ready to get the knowledge of the simple code value for a specific commonly used word or phrase.

Expediently, in the present invention, a method for entering a target word or phrase using a simple code (including partially associated simple code, fully associated simple code and initial code) is called "short-cut input method (SIM)", while a method for entering a target character using a full code is called "full input method (FIM)". As will be described later, a combination of SIM and FIM can also be used. Expediently, such a method is referred to as "short-cut/full Concurrent Input Method (short-cut CIM)" or just "Concurrent Input Method (CIM)" for short.

Ambiguity occurs due to repeated selection in FIM, even though unique codes are assigned to each character and used to enter a target character. Expediently, such ambiguity is called "first ambiguity" or "character ambiguity". On the contrary, ambiguity occurs between different words sharing the same simple code in a method such as the foreign method (i.e., SIM) in which codes are assigned to every word and used to enter a target word. Expediently, such ambiguity is called "second ambiguity" or "word (phrase) ambiguity". The term "ambiguity" as used herein refers to the first ambiguity.

There are two scenarios: one is that the system first interprets a specific input value as a simple code (i.e., the first step of using SIM, or applying the short-cut input mode as the basic input mode), and without any simple code corresponding to the input value, the system then recognizes it as a full code (i.e., the second step of using FIM); and the other is that the system first checks whether a specific input value forms a full code (i.e., the first step of using FIM, or applying the full input mode as the basic input mode), and if the input value does not form a full code, the system then recognizes the input value as a simple code (i.e., the second step of using SIM). First interpretation of an input value as a simple code is applying the "short-cut input mode" as the basic input mode, while first interpretation of an input value as a full code is applying the "full input mode" as the basic input mode. Preferably, those who mostly input a commonly used word or phrase first apply SIM (i.e., applying the short-cut input mode as the basic input mode), and those who mostly do not input a commonly used word or phrase first apply FIM (i.e., applying the full input mode as the basic input mode).

In the full input mode designated as the basic input mode, the system first interprets an input value as a full code and erroneously recognizes an input simple code as an undesired word. For example, when BRSM is applied as FIM in FIG. 4-2, the simple code of a word ""옥수수"" is designated as "877" (using a syllable-based initial code) and the system first interprets the input simple code "877" as a full code, thereby recognizing ""옥수수"" as ""여"". This applies to the words such as ""옥수수",", ""옥수수를",", ""무진장",", ""와르르",", ""우수수",", ""와장창""

or ""우당탕"" in which the initial consonants of the second and third syllable (letter) correspond to the same button. On the other hand, in the short-cut input mode designated as the basic input mode, the system first interprets an input value as a simple code and erroneously recognizes an input full code as an undesired word. Such ambiguity between simple code and full code in CIM will be referred to as "third ambiguity".

The third ambiguity can be overcome by using a toggle button or using a move button for the selection of the target word just like the conventional ones. Another alternative method is that the input mode is switched between full input mode and short-cut input mode in the unit of word before input values causing the third ambiguity are entered. This is similar to the method described in the prior document of the applicant in which あ/ア control (i.e., Hiragana/Katakana transition control) is provided to enable entry of a Katakana word in the Hiragana mode or entry of a Hiragana word in the Katakana mode. For example, in the full input mode designated as a basic input mode, the system initially recognizes an input value after selection of the "short-cut/full" control as a simple code and provides to the user a target word corresponding to the input value with reference to the index. Likewise, in the short-cut input mode designated as a basic input mode, the system initially recognizes an input value after selection of the "short-cut/full" control as a full code. The "short-cut/full" control can be selected before or after entry of the target word, but for the case of this control, it may be more convenient for the control to be selected before target word.

In CIM, the system may determine whether the input value is a full code or a simple code. Such a determination can be made in the unit of word S as the index is referred in order to eliminate the first ambiguity as described above, or such a determination can be made in the course of entering the input value as described later.

While applying CIM in the full input mode designated as a basic input mode, the system checks input by input (i.e., value by value) whether every input code value forms a full code, determines the input value as a simple code at the time when the input code value is not considered to form a full code, and sends the user a word or phrase corresponding to the simple code with reference to the index, thereby enhancing the efficiency of CIM. Likewise, when applying CIM in the short-cut input mode designated as a basic input mode, the system checks whether every input code value is identical to the input value listed in the index, and recognizes the input code value as a predetermined full code of FIM at the time when there is no word matching the input value. This means that the third ambiguity can be eliminated at the beginning of the entry by using the regulations of FIM. The same applies to the case of using a character input method not disclosed as FIM in the prior document. Now, a description will be given as to FIM (base repeat selection method and part-whole selection method) disclosed in the prior document by way of the following examples.

For Korean, for example, the second and third input values of all syllables by the full code should be constant in using BRSM, which is illustrated in FIG. 4-2. If such a regulation is infringed, the input values are regarded as simple codes. When tense consonants can be processed through a combination of basic consonants, the associated criterion applies to all cases where BRSM is used.

In all languages, when PWSM is used as FIM, two input values correspond to one character and one input value is limited with respect to the other. In the case of English, for example, it is assumed that only a Horizontal Straight Combination (HSC) is used for English as shown in FIG. 1-1, not applying PWSM to input numerals. If the buttons [1], [2] and [3] on the first row are used as the first input value (first button) corresponding to one character, the second input value may correspond to the button [1], [2] or [3] on the first row. Likewise, when selecting the button [4], [5] or [6] on the second row after [2]+[1], the next value to form a full code is one of the buttons [4], [5] and [6] on the second row. When the input value violates this rule, the system regards the input value as a simple code and recommends a word corresponding to the simple code to the user. For example, when the user enters "4357" as the simple code of "help" in the CIM where PWSM is used as FIM and FIM is performed in the basic input mode, the system recognizes that the input value does not form a full code the moment the second input value "3" is entered. Then the system considers the input value as the simple code.

When using PWSM in FIG. 4-2, the next button in response to the input of the first button [1] for a full code is no more than button [1] or [2]. If this rule is infringed, the system regards the input value as a simple code rather than a full code and recommends a target word corresponding to the input value to the user with reference to the index. If four characters P, Q, R and S are assigned to button [7] as shown in FIG. 5-2, one of the four characters can be allocated to the lattice element that forms Vertical Adjacent Combination (VAC) in PWSM. When the button [7] is selected in order to form a full code for one character in this case, the next input button may be button [7], [8] or [9] on the third row, or button [4]. If this rule is infringed, the input value can be regarded as a simple code. The same applies to all languages if using PWSM as disclosed in the prior document.

For example, when the user enters "25" in the case where PWSM is used as FIM performed in the basic input mode and the simple code of 北京(Beijing) is stored as a syllable-based initial code "25" in the simple code index of FIG. 1-1, the system recognizes that the input value "25" does not form the full code (because the button on the position of Horizontal Straight Combination is one of buttons [1], [2] and [3]) the moment the user selects button [5] after the stroke of button [2] (from the start of the word). Then the system provides ""北京"" corresponding to the input value "25" for the user with reference to the simple code index. For Chinese, the system provides Chinese characters (i.e., 北京) as a word corresponding to the simple code "25" for the user (because the Chinese characters ""北京"" form a target word). For languages using phonetic characters other than Chinese, the system provides "Beijing" corresponding to the simple code "25" for the user. If there are multiple words or phrases that correspond to the simple code "25", the words or phrases are listed to the user for selection or the user can select a desired word or phrase by repeatedly stroking a specific button (in toggling manner). Refer to FIG. 54.

Accordingly, the Concurrent Input Method(CIM) of FIG. 5-4 is registering simple codes of frequently used words such as "北京(Beijing)" in the simple code index and using Full Input Method(FIM) and Short-cut Input Method(SIM) simultaneously without transition of FIM mode and SIM mode, thereby reducing the number of strokes in entering the registered words with simple codes.

FIG. 4-5 shows that one basic consonant is assigned to each button. Thus when syllable-based initial codes generally used in Korean are utilized as simple codes, the third ambiguity is avoidable in using both SIM and FIM. That is, when the user inputs syllable-based initial codes in using CIM, the input values from the second input (when inputting aspirated consonants and tense consonants by CPM) hardly form a full code. Thus the system refers to the index of simple codes and recommends proper words in the order of priority to the user. The similar principle can be applied to the input of a full code in CIM.

As described above, it is the core of the present invention that it is possible to determine during the input of characters whether the input value is a simple code or a full code in using CIM. The same principle applies to the case where the system uses the FIM of the prior document and the present invention, or other FIM. For example, a character input method uses a combination of a first button for each character and a second button corresponding to the sequent order of the character of the first button. Namely, the entry is given as "P=[7]+[1]" in FIG. 1-1. Because the second button is one of buttons [1], [2] and [3] in FIG. 1-1, the system considers the input value as a simple code, the moment the input value infringes this rule. Particularly, the FIM of the applicant is advantageous, as described in the above example, in that whether the input values form a full code in FIM can be checked during the input.

Furthermore, the interpretation of a simple code or full code may be achieved in the client terminal or the server, as described in the prior document of the applicant. In looking up the target word in the index in order to overcome the first ambiguity (character ambiguity) in the prior document, a scenario that the system refers to the index of the client in the first stage and then the index of the server in the second stage applies to the interpretation of simple codes or full codes. Alternatively, the system may refer to the index of the server in the first stage and then the index of the client in the second stage. Furthermore, when the system interprets the input value as a simple code with reference to the index of the client in the first stage and then the index of server in the second stage but fails to find a simple code for the input value, it recognizes the input value as a full code in such a manner that it refers to the index of the client at the first stage or otherwise the index of the server at the second stage. Alternatively, the system interprets an input value as a simple code in the first stage with reference to the indexes of both the client and the server and then allows the user to select the target word. Any similar variations are possible in regard to the interpretation method (simple code or full code) and the interpretation site (client or server). That is, there are various combinations of the interpretation method (simple code or full code) and the interpretation site (client or server). Namely, with reference to FIG. 5-5, any combination of (A), (B), (C) and (D) is available for the input value, for example (A)-(B)-(C)-(D) or (A)-(C)-(B)-(D), and so on.

A concurrent use of SIM and FIM has advantages as follows: (1) in using FIM, the user is allowed to input almost all words including those nonexistent in the dictionary as well as predefined words; (2) the user can designate simple codes for the use of SIM on commonly used words or phrases as he/she desires (either partially associated simple codes or fully associated simple codes); (3) the user can designate partially associated simple codes to dramatically reduce the stroke count of the input; and word-based initial codes are assigned for phrases as well as words. On the contrary, the methods of foreign countries refer to the index for all input words word by word and thus have to use fully associated simple codes in order to minimize the probability that the same code is assigned to different words.

In addition, the system has an "index" containing specific words or phrases commonly used and code values for the words or phrases, which index requires a much lesser capacity of memory than that in the methods of foreign countries. Such an index may be the same as an "index" in the system that contains ambiguous words that are correct or incorrect in order to eliminate ambiguity.

Consonants have the sound values of a specific word in every language and a method for extracting consonants into an abbreviation has been widely used. For an example of English, the military term "captain" is abbreviated as "CPT" that comprises consonants having the sound values of "captain", "sergeant" "SGT", "staff sergeant" "SSG", "sergeant first class" "SFC". Although "captain" and "private" have two syllables, the consonants extracted as the abbreviation are considered as those that represent the respectively syllables. Accordingly, the simple code of "captain" is "278" associated with "CPT".

The present invention in which the system is allowed to designate partially associated simple codes for commonly used words or phrases based on the syllable and apply SIM is very significant in a sense as well as the fact less labor is required in inputting characters. A syllable is phonetically defined as "psychological noumenon". It is the consonant that has a sound value in the syllable. It is impossible to analogize "captain" out of the vowel extract "AAI". But, "captain" can be easily analogized from the consonant extract "CPTN" or "CPT". It is reported that any English sentence can be analogized from the constituent consonants without a vowel in each word. That is, the use of partially associated simple codes in association with each consonant constituting a syllable makes the user to apply SIM naturally and provides more convenience in use.

In particular, the simple codes can be used on the basis of abbreviations, because abbreviations are widely used in the English-speaking world and, for example, the listed company name is usually designated as an abbreviation.

The user is allowed to designate the type of simple code (i.e., partially associated simple code or fully associated simple code) for a specific word or phrase, which is advantageous in that it is easy to memorize the code values of commonly used words or phrases. Furthermore, if the user needs to use only a part of commonly used words or phrases, simple codes (e.g, 1, 2, 3, etc.) rather than the codes associated with the characters of the word or phrase are assigned to each word or phrase.

4.8 Grouping of Simple Code/Corresponding Word or Phrase, and Designation of Searching Range There are many cases where much overlap occurs in designating simple codes for a plurality of words or phrases. The ambiguity between simple codes (i.e., the second ambiguity) can be reduced by grouping the word or phrases corresponding to the simple codes and searching simple codes only for a specific group of words or phrases. A word or phrase does not necessarily belong to only one group and may be included in a plurality of groups.

Figures 5, 6:
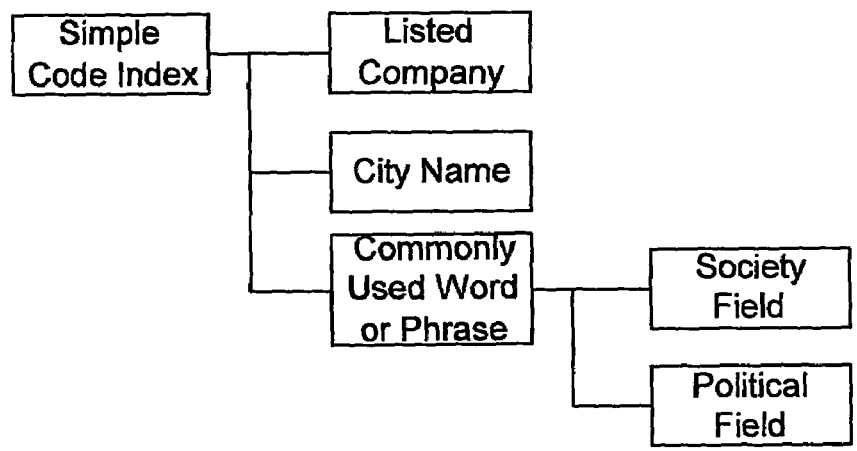

For example, the word or phrases after simple naming are divided into categories of listed company name, city name, commonly used word (or phrase), etc., and the group of commonly used words (or phrases) are subdivided into categories of society, politics, etc. Although this embodiment provides a two-staged tree-type grouping, the grouping may be of a tree type with three, four or more stages. Refer to FIG. 5-6. If the user (or system) limits the searching range of the simple code to the group of listed company names, the system searches named words or phrases corresponding to a specific input simple code within the category of the listed company name, thus reducing the second ambiguity. Likewise, when the user limits the searching range to the group of commonly used words or phrases, the system searches named words or phrases within the category of commonly used words or phrases and all its subgroups. If the user limits the searching range to the category of society in the group of commonly used words or phrases, the system searches named words or phrases within the category of society and its all subgroups.

Tree-type groups in FIG. 5-6 are considered to be folders in the Window explorer. The search range can be reset by the system in an automatic manner. For example, when the user selects a specific city in the hierarchy structure of administrative districts stored as the sub groups of city name, the search range for the next input value is the name of the lower administrative district unit of the specific city. For example, when the user selects "서울" as a city, the next selection range is "구 (gu)" as wards in Seoul city. When the user selects "양천구(Yangcheon-gu)", the next selection range is "양천구" (dong) in Yangcheon-gu.

4.9 Use of Switching Server

Interpretation of simple codes may be performed at the client terminal or the server. Alternatively, there may be used a switching server which is wholly charged with interpreting simple codes (including full codes under in some cases) to provide words or phrases corresponding to the simple codes to the client terminal or another server. Reference is made to FIG. 6-1. In the figure, the client terminal first decodes a simple code, and if it cannot interpret a word or phrase corresponding to the input simple code, the switching server interprets the word or phrase corresponding to the input simple code in the second stage. Upon failure, each server can interpret the word or phrase corresponding to the input simple code in the third stage. The third simple code-decoding server (expediently, called "third server") is a server equipped with an application using the input simple code or its corresponding words or phrases.

With the switching server, the user inputs simple codes even when the third server requests a word or phrase other than the simple codes. Even though the third server does not store simple codes and words or phrases corresponding to the simple codes, the switching server interprets the simple codes input by the user to send the corresponding words or phrases to the third server.

When a simple code is input, the system looks up the words or phrases corresponding to the simple code in the index and feeds back the words or phrases to the client terminal or each server, input by input (i.e., value by value) or in the unit of words (i.e., word by word).

4.10 Division of Word Unit

The term "word unit" as used herein refers to the length of a word ranging from head to tail of the word. The word unit can be determined by a combination of all factors that discriminate between words, such as the head of a word, space, mode transition, enter, etc. For example, the entry of a word is identified through the head of a word~the tail of a word, space~space, space~mode transition, and the like. The feedback in units of words can be performed through the programming languages that currently support the network environment.

4.11 Download of Simple Code and Corresponding Word or Phrase

It is also possible for the client to download the simple codes and the words or phrases corresponding to the simple codes from the server without directly storing the simple codes and their corresponding words or phrases.

Download may be achieved in the unit of words or phrases, or in the unit of the above-mentioned word or phrase groups (i.e, groups of the tree structure). If selecting a group, the client can download the subgroups as well as the selected group. During download, the client terminal may maintain the tree structure of the word or phrase group as set by the server, or assign the words or phrases belonging to the corresponding group and its subgroups to one group designated by the user. A switching server whose main function is decoding simple code can be in charge of this operation.

5. Use of Delete Button

The use of a delete button may be associated with "cancellation of final input" as disclosed in the prior document. For example, when the user intends to enter "ㄱ" but mistakenly inputs "ㅋ" with selection of [1]+[*] (in FIG. 4-2), selection of the delete button may cancel the final input [*] and restore "ㅋ" to "ㄱ". This is useful in entering succession characters by repeatedly pressing control buttons. Successive strokes of the delete button can delete the previously input characters by way of the known method. For example, one stroke of the cancel button restores an input of "가나ㅋ" to "가나ㄱ", which becomes "가나" with another stroke of the cancel button and "가" with further another stroke of the cancel button. For Roman alphabet, a stroke of the delete button on an input of "aba . . . " (where "a . . . " is an affixed character comprising " . . . " and "a") provides "aba", which becomes "ab" with another stroke of the delete button and "a" with further another stroke of the delete button. That is, previously formed characters are deleted in the unit of characters.

6. Language Restricted Input Method (LRIM)

The Language Restricted Input Method is using consonant and vowel association rules in word production of a specific language to reduce ambiguity in entry of characters, which will be described in detail as follows.

It is apparent that some features mentioned below in regard to a certain language can be applied to other languages without any specified notice. Furthermore, the same is applied to languages not using Roman characters.

6.1 Chinese Restricted RSM on Consonant-Vowel Separated Keypad for Language using Roman Characters

6.1.1 Construction of Chinese Language

Chinese characters generally have two parts, the one of which is 21 initials(shengmu) and the other is 16 finals (yunmu) ㄜ(ˆe) is almost never used). The initials correspond to consonants and the finals correspond to vowels. The notation of Chinese pronunciation is based on the romanization system(pinyin) in China and the commented sound (Bo-po-mo-fo) system in Taiwan. The romanization system is using the letters of the Latin consonants and vowels, i.e., the Roman alphabet, to spell out the sounds of the Chinese characters. Parentheses include Roman characters corresponding to commented sounds as follows.

| Initial (shengmu) | ㄅ(b) ㄆ(p) ㄇ(m) ㄈ(f) |
| --- | --- |
| | ㄉ(d) ㄊ(t) ㄋ(n) ㄌ(l) |
| | ㄍ(g) ㄎ(k) ㄏ(h) |
| | ㄐ(j) ㄑ(q) ㄒ(x) |
| | ㄓ(zh) ㄔ(ch) ㄕ(sh) ㄖ(r) |
| | ㄗ(z) ㄘ(c) ㄙ(s) |
| Final    simple final | ㄚ(a) ㄛ(o) ㄜ(e) ㄝ(ê) ㄧ(i) ㄨ(u) ㄩ(ü) |

-continued

| (yunmu) | double final | 万(ai) | ︿(ei) | 幺(ao) | ㄡ(ou) | |
|---------|--------------|-------|--------|--------|--------|---|
| | nasal final | ㄢ(an) | ㄣ(en) | 尢(ang) | ㄥ(eng) | |
| | retroflex final | ㄦ(er) | | | | |

Now, compound finals will be described. An associated final is a combination of an initial vowel (one of three vowels "i", "u" and "ü") and another final. The following table presents a list of the compound finals.

| | Simple Final | | | Double Final | | | Nasal Final | | | |
|---|---|---|---|---|---|---|---|---|---|---|
| | a | o | e | ai | ei | ao | ou | an | en | ang | eng |
| i | ○ | | ○ | | | ○ | ○ | ○ | ○ | ○ | ○ |
| u | ○ | ○ | | ○ | ○ | | | ○ | ○ | ○ | ○ |
| ü | | | ○ | | | | | ○ | ○ | | ○ |

In the table, the combination of "i+a" is available but that of "i+o" is impossible.

6.1.2 Romanization of Chinese

As seen from the above table, in the romanization of Chinese characters using Roman character, the 21 initials are represented with a combination of 18 Roman characters and 16 finals are represented with a combination of 7 simple finals or a combination of Roman alphabet vowels and consonants.

Among the simple finals, "^e" and "ü" are considered as the affixed characters of "e" and "u", respectively, and entered by the control processing method. Five basic vowels with four pitches of tone can also be entered by the control processing method. Accordingly, for Chinese characters using Roman character, all the finals can be entered by the use of five Roman alphabet basic vowels. This is entering affixed characters not existing in the English alphabet (i.e., Roman alphabet) via control processing, which was previously stated in regard to the French and German languages. The following table presents an example of determining a relationship between basic character(basic vowel) and succession character(succession vowel) in the case of entering finals in Chinese using the Control Processing Method.

| | basic vowel | succession vowels | | | | |
|---|---|---|---|---|---|---|
| | | 2nd | 3rd | 4th | 5th | 6th |
| Group 1 | Y(a) | ā | á | ǎ | à | |
| Group 2 | ㄛ(o) | ō | ó | ǒ | ò | |
| Group 3 | ㄜ(e) | ē | é | ě | è | ㄝ(ê) |
| Group 4 | I(i) | ī | í | ǐ | ì | |
| Group 5 | X(u) | ū | ú | ǔ | ù | ㄩ(ü) |

In the above example, the characters with the first to fourth pitch of tone are considered as succession characters, and "^e" nearly not in use is the lowest in priority. Of course, the priority depends on the frequency of use or other factor. For example, "ü" is not considered as the sixth succession character but as the second succession character and the other succession characters are relegated to the lower priority by one.

For example, when the control button is [*] and a control is set to be selected after the input of a basic character, entries are given as "e=e+[*]", " e=e+[*]+[*]", "'e=e+[*]+[*]+[*]", "`e=e+[*]+[*]+[*]+[*]", and "^e=3+[*]+[*]+[*]+[*]+[*]". If PWSM is applied to "e" marked on the keypad in FIG. 1-1, the full code of 万(r'en: second pitch of tone) is "7832**65". It is apparent that any other input method (e.g., simple repeat selection method) than PWSM can be applied to the entry of "e" on the keypad.

Accordingly, the input method can be simplified by using a single control button. The same is applied to the case of using commented sounds without the Roman alphabet (for example, the same input method can be applied to the keypad of FIG. 1-1 that marks commented sounds corresponding to Roman characters).

6.1.3 Chinese Restricted RSM(CRRSM) on Consonant-Vowel Separated Keypad(CVSK)

All the initials in Chinese characters can be entered with 18 Roman characters, and Roman alphabet consonants are used successively only for zh, ch and sh. "y" or "w" is used in romanization of a Chinese syllable consisting of only finals without an initial. For example, entries are given as "ㄡ =yi (first pitch of tone)" and "幺=wu (third pitch of tone)".

As mentioned in the prior document of the applicant, it is more convenient to use the syllable-base initial code as a simple code in Chinese in which one character constitutes one syllable. Thus 18 Roman alphabet consonants are preferably assigned to the individual numeral buttons. The present invention suggests that 18 Roman alphabet consonants are sorted in groups of two and assigned to numeral buttons [1] to [9].

bp/dt/gk/zj/cq/sx/mn/lr/hf

The above example shows the grouping of Roman alphabet consonants based on the similarity of pronunciation so that multiple words or phrases similar in pronunciation have the same syllable-based initial code when the words or phrases correspond to the same simple code. The grouping is given by way of example and various modifications are available. Grouping may be based on the dictionary order of Roman characters, the dictionary order of commented sounds corresponding to Roman characters, or other groupings including the similarity of pronunciation. Another advantage of the grouping based on the similarity of pronunciation is reducing ambiguity, because consonants of a similar pronunciation seldom appear in succession in any language using the Roman alphabet. Besides, even though there are multiple words or phrases corresponding to the same simple code (especially syllable-based initial code), they are similar in pronunciation (phonetic value) and such a grouping method minimizes confusion to use and make the use of simple codes natural.

Figures 5, 10:
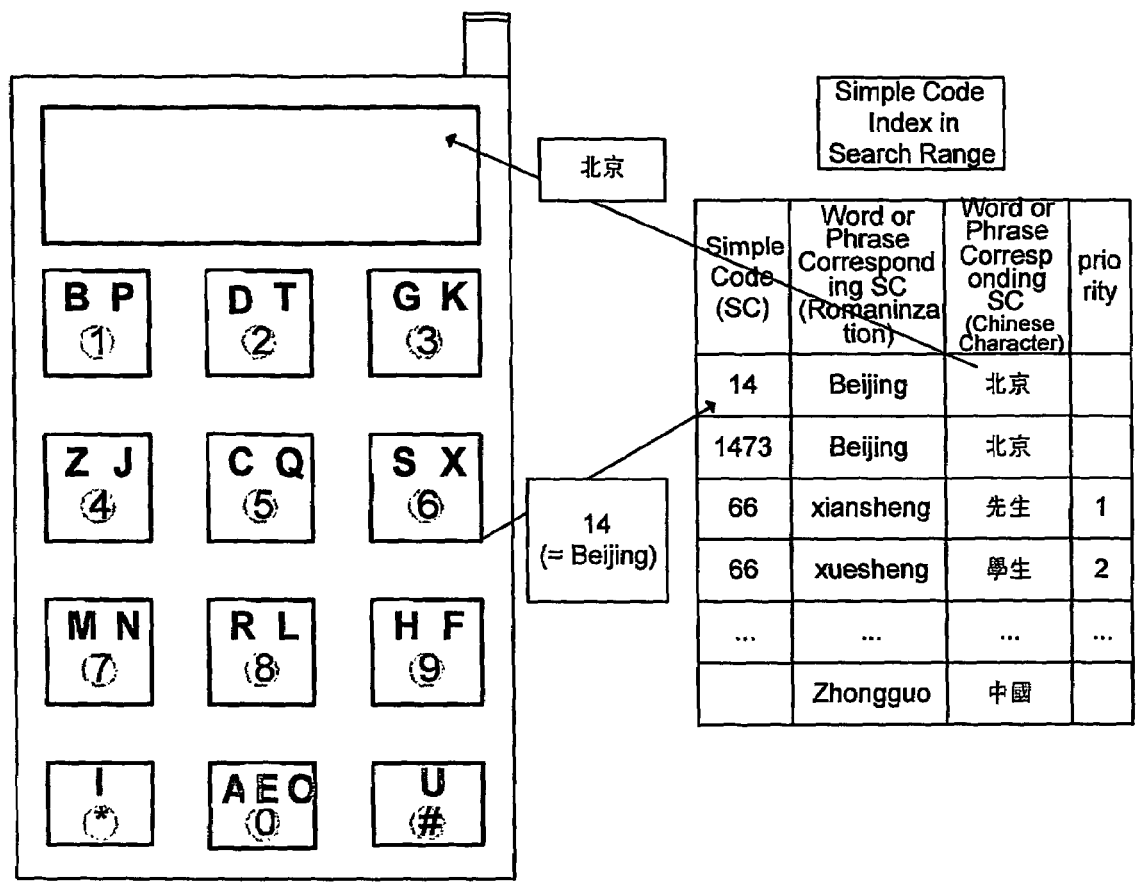
Figures 6, 10:
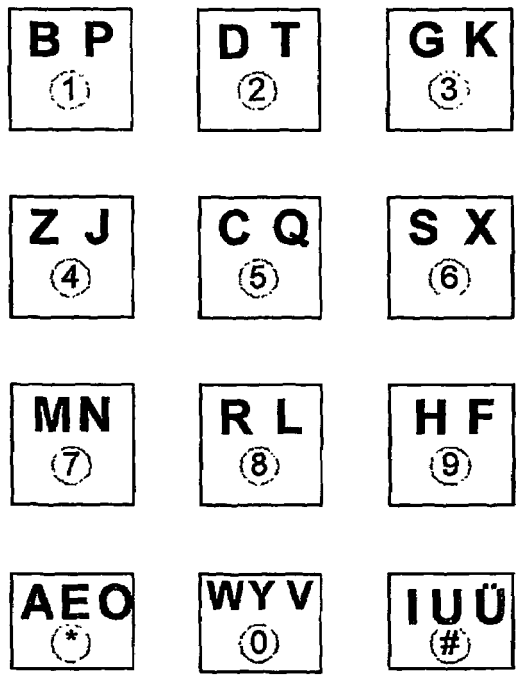
Figures 7, 10:
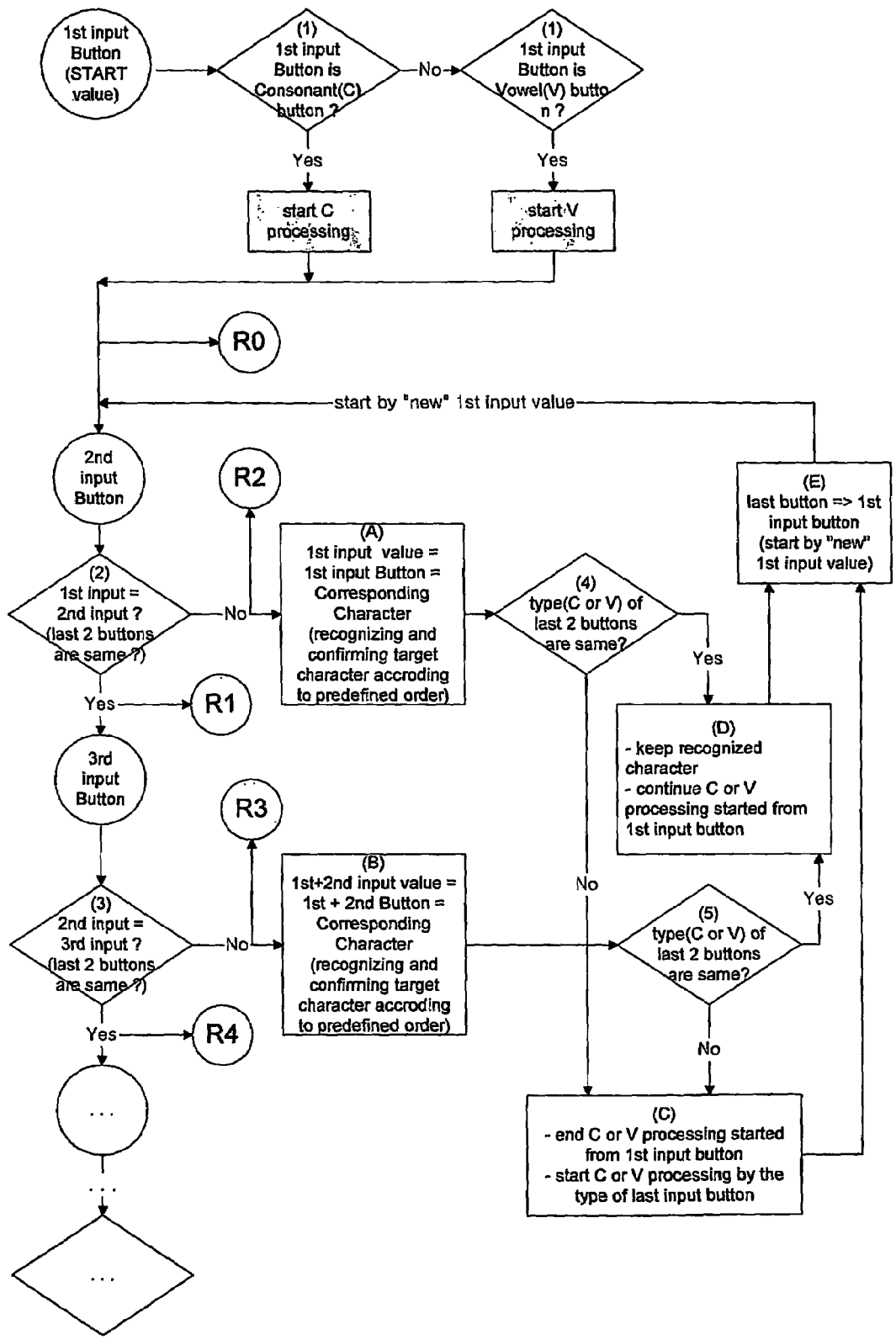
Figures 8, 10:
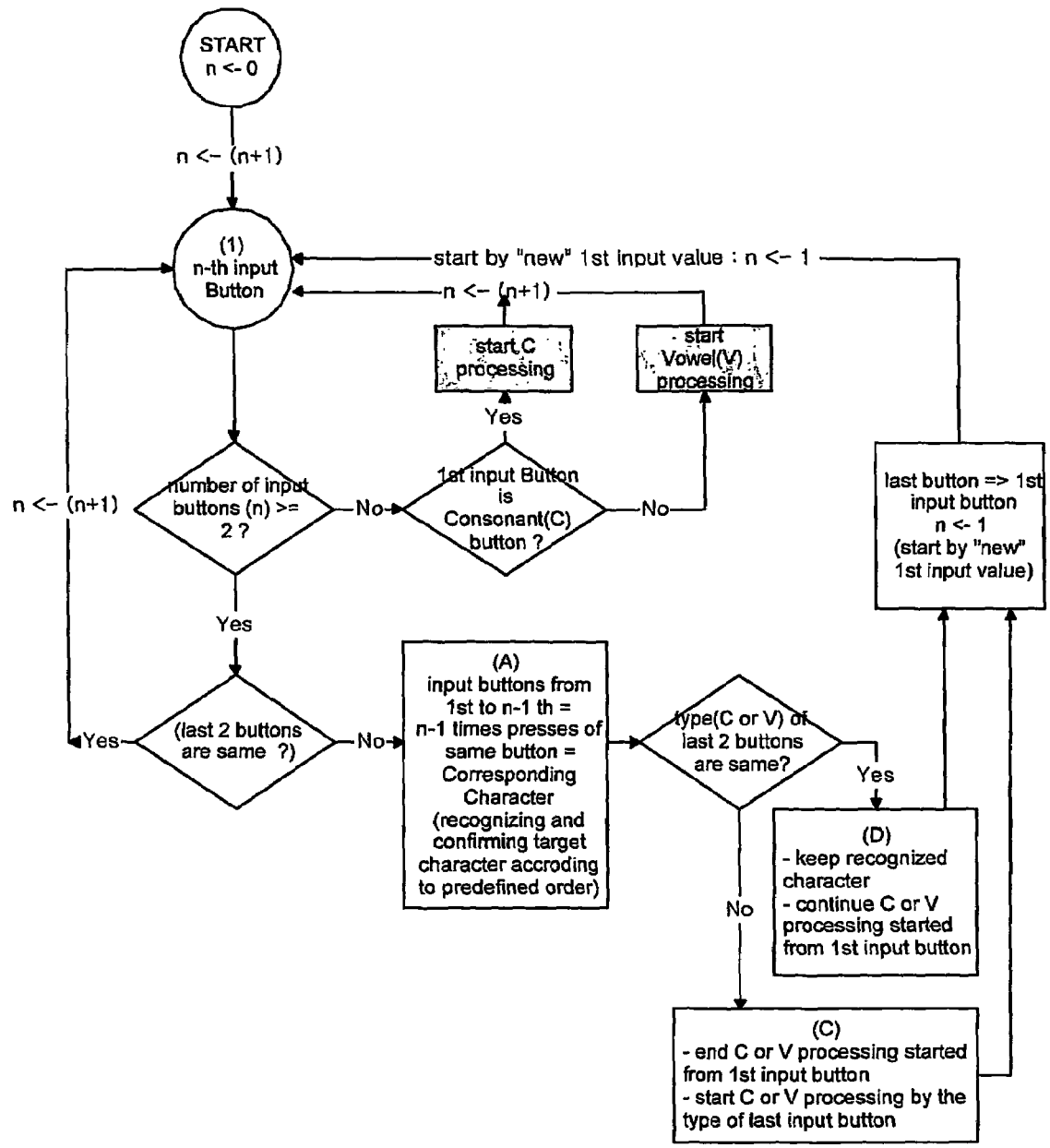
Figures 9, 10:
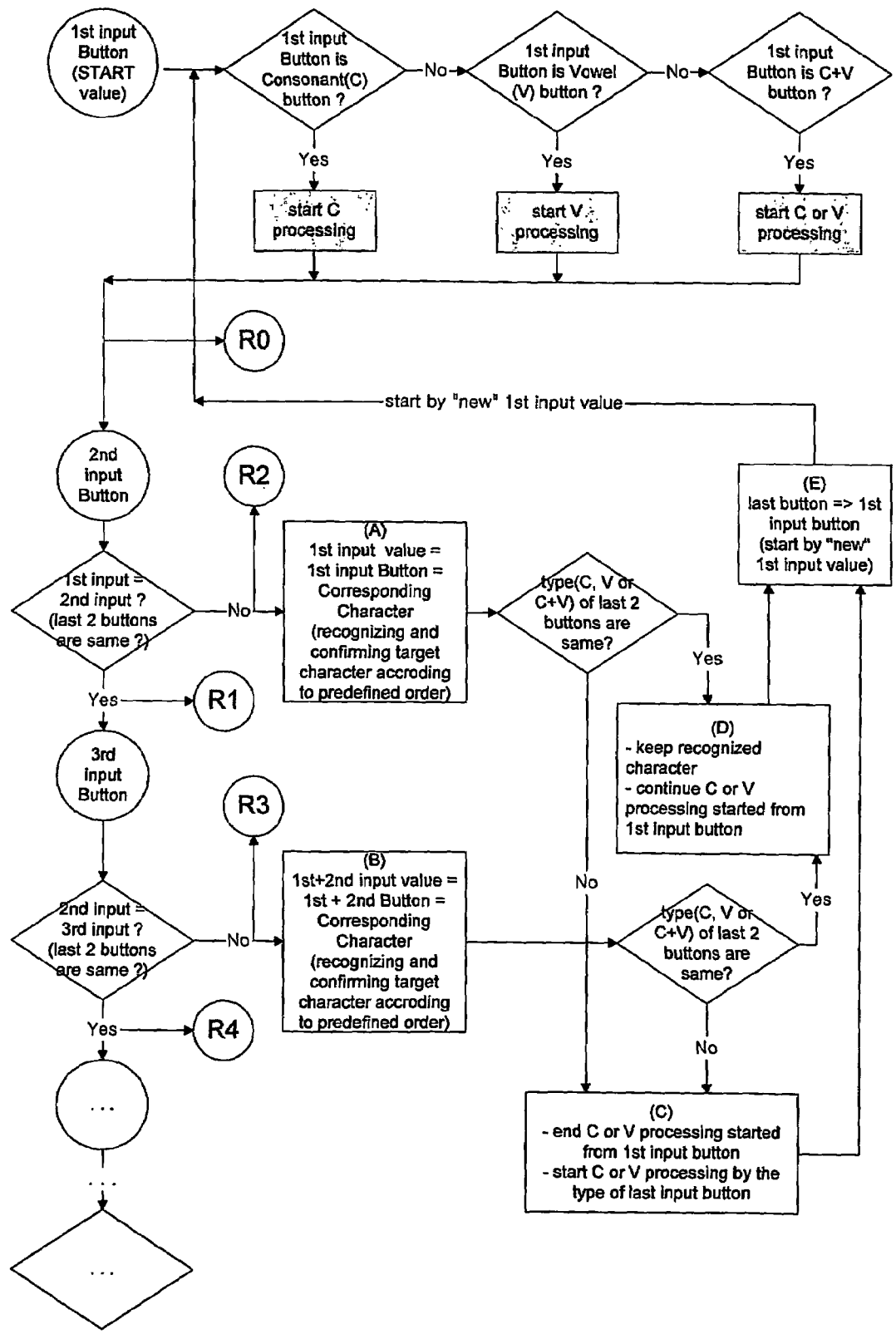
Figure 10:
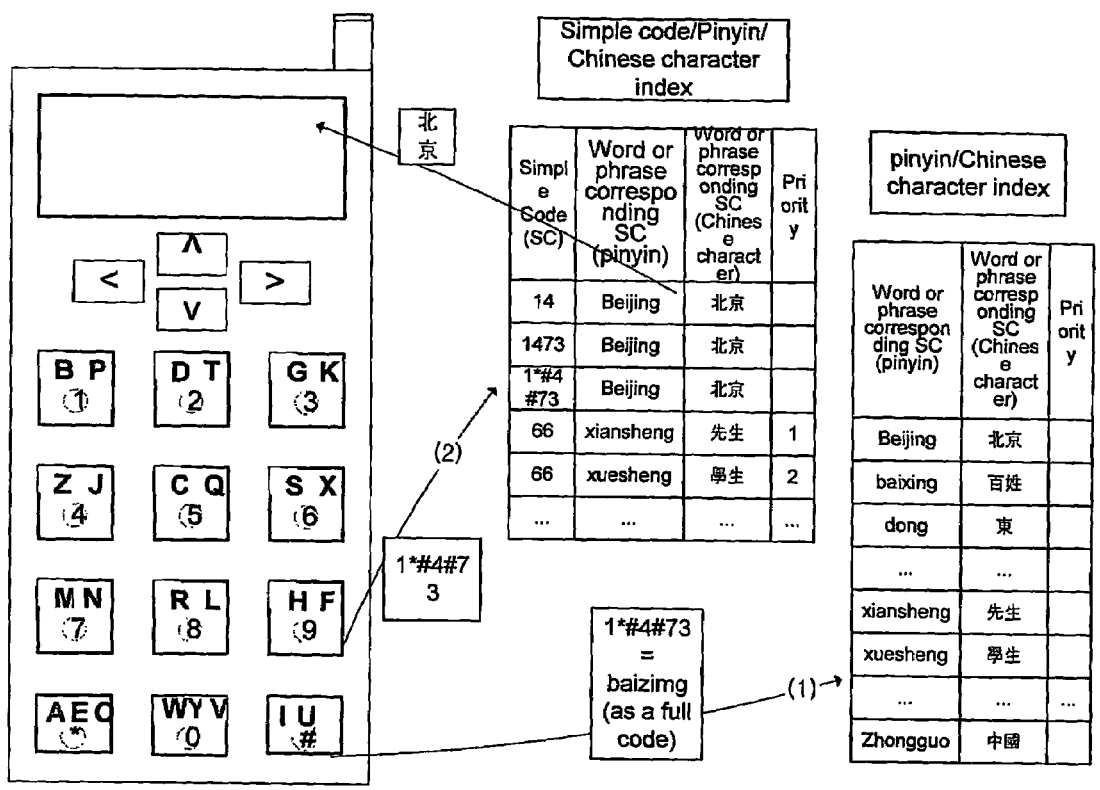

"zh", "ch" and "sh" are initials in Chinese characters, and "z" and "h", "c" and "h" or "s" and "h" are not sorted in the same group. (It is not so important not to be grouped in the same group, because a Chinese syllable generally consists of an initial and a final. But for the input of "w", "y" or "v", it is not desirable that "s", "h" and "w" is grouped in one group and "w" is input with three strokes of the corresponding button) The nine groups are assigned to nine buttons [1] to [9], as shown in FIG. 10-1, and the individual characters are entered using the repeat selection method. As the feature of Chinese, Roman alphabet consonants seldom appear in succession in entering initials, except for the case of "zh", "ch"

and "sh". It is therefore possible to enter Roman characters without ambiguity applying the Repeat Selection Method. For example, entries are given as "b=[1]" and "p=[1]+[1]" in FIG. 10-1. Of course, the most frequently used character among those assigned to a same button can be ordered to be selected with one stroke of the corresponding button.

Roman character "v" seldom used in Chinese can be assigned to one of the nine groups. For example, "v" is added to the group including "f" similar in pronunciation to "v" (or not arranged specifically) and entered with three strokes of the corresponding button. "w" and "y" used in "ㅋ=yi (first pitch of tone)" or "ㅅ=wu (third pitch of tone)" can also be sorted in a proper consonant group (or not arranged specifically) and entered by the repeat selection method (e.g., with three strokes of the corresponding button). For example, when "y" is allocated to a group including /l, r/, "l", "r", "y" are entered with one stroke, two strokes and three strokes of the corresponding button (button [8] in FIG. 10-1), respectively. When "w" s allocated to a group including /m, n/, "m", "n", "w" are entered with one stroke, two strokes and three strokes of the corresponding button (button [7] in FIG. 10-1), respectively.

The method of using the repeated appearance of a Roman alphabet consonant and vowel to remarkably reduce ambiguity in the romanization system using the repeat selection method is called "Chinese Restricted Repeat Selection Method(CRRSM)". Expediently, this method applied to any language including the Chinese language is called "Language Restricted Repeat Selection Method (LRRSM) and the method specifically applied to the Chinese language is called "Chinese Restricted RSM". The LRRSM for Korean or Hindi reduces ambiguity on the basis that consonants and vowels appear alternately, as in the case of using the repeat selection method with pairs of basic consonant and basic vowel assigned to the individual buttons. Likewise, in the method of using vowel elements in Korean, the aspirated control is selected by the repeat selection method using the principle that vowel ㅎdoes not appear in succession. This can be called "Korean Restricted RSM".

Particularly, when the buttons assigned to consonants (expediently, referred to as "consonant buttons") are separated from the buttons assigned to vowels (expediently, referred to as "vowel buttons") as in FIGS. 10-1 to 10-4, the use of the repeat selection method can remarkably reduce ambiguity using the feature of each language such that consonants and vowels are combined together. The keypad of FIGS. 10-1 to 10-4 that has a small number (e.g., one, two or three) of consonants or vowels assigned to each button and consonant buttons being separated from vowel buttons is called "Consonant-Vowel Separated Keypad (CVSK).

Roman alphabet consonants and vowels in romanization of Chinese as marked on the keypad of FIG. 10-1 can also be entered without ambiguity by using the repeat selection method. When the user selects one of the consonant buttons (buttons [1] to [9] in FIG. 10-1) in succession to enter an initial, the system recognizes that the second consonant marked on the keypad is entered. This is because there is no case where the same Roman character does not appear in succession in the entry of initials in Chinese. When the button previously stroked twice is assigned to "w", "y" and. "v", the system readily recognizes that another one stroke of the button (namely, three strokes in total) is for entering "w", "y" or "v", as previously described. The system may interpret three strokes of button [7] for entry of "w=777", because there is no construction of initials like "mmm", "mn", or "nm" in Chinese.

As shown in FIG. 10-1, six vowels "a", "e", "i", "o", "u" and "u" are sorted in three groups of two and assigned to three buttons (e.g., buttons [*], [0] and [#]) of the 4*3 keypad. The individual vowels are then entered without ambiguity using the Repeat Selection Method, which is possible because the same Roman alphabet vowel in Chinese seldom appears twice in succession. For example, there is no case that the romanization of a Chinese character represents ". . .aa. . .".

For double finals "ai" and "ei" and compound finals "ia" and "ie", "a" and "i", or "e" and "i" are not to be sorted in the same group. If "a" and "i" are sorted in the same group and assigned to the same button (e.g., button [*]), three strokes of the button (i.e., "*") may cause ambiguity between "ai" and "ia". FIG. 10-1 shows an example of grouping in consideration of this case. The vowel grouping and arrangement are not specifically limited to those of FIG. 10-1 and may be variously modified as long as they satisfy the above restriction. The individual vowels can be entered using the Repeat Selection Method in FIG. 10-1**. For example, entries are given as "i=[0]", "o=[0]+[0]", and "iao=[0]+[*]+[0]+[0]".

For double finals "ai", "ei", and "ou" and compound finals "ia", "ie", and "uo", "a" and "i", "e" and "i", and "o" and "u" are not to be sorted in the same group. When "a" and "i" are sorted in the same group and assigned to the same button (e.g., button [*]), three strokes of the button (i.e., "*") may cause ambiguity between "ai" and "ia". FIG. 10-1 shows an example of grouping in consideration of this case. The vowel grouping and arrangement are not specifically limited to those of FIG. 10-1 and may be variously modified as long as they satisfy the above restriction. The individual vowels may be entered using the Repeat Selection Method in FIG. 10-1**. For example, entries are given as "i=[0]", "o=[0]+[0]", and "iao=[0]+[*]+[0]+[0]".

For example, as long as "a" and "i" are not classified into the same group, and likewise for "e" and "i" as well as "o" and "u", "a, e, o" are classified into one group (refer to FIG. 10-2 and FIG. 10-4) and "i, u, ü" are classified into another group. Various modifications are also possible. These 2 vowel groups may be individually assigned to particular buttons (e.g., [*] and [#] buttons respectively), and consonants "w, y, v" may be another group and be assigned to another button (e.g., [0] button). When 3 characters are grouped into one vowel group (e.g., "a, e, o") and the group is assigned to a button, the vowel "o" may be recognized with 3 strokes of the button without ambiguity because "ae", "ea", and "aaa" which is recognized by 3 strokes of the corresponding button does not exist in Chinese finals. In this example, "ao" is input by 4 strokes of the button to which the characters are assigned without ambiguity because there is no "oa" in Chinese finals. Refer to FIG. 10-6. In the FIG. 10-6, the character "v" may not be marked on the keypad because "v" is not used for inputting Chinese. Grouping (i.e., sorting) "w, y" into one group and assigning to a button means grouping semi-consonants (i.e., semi-vowels) into one group and assigning to a button.

In the FIGS. 10-2, 10-4, and 10-6, when "a, e, o" are grouped into the same group, only the vowel combination "ao" exists in Chinese Romanization (pinyin). When only "a, o" are grouped into one group and assigned to a button, 3 strokes of the corresponding button are recognized as "ao" without ambiguity. When 3 characters (i.e., "a, o, e") are assigned to a button and each character is selected according to the presses (i.e., strokes) of the button in the order "a-o-e", 3 strokes of the button are recognized as both "ao" and "e", so ambiguity occurs. Thus in the case that 3 or more than 3 characters are assigned to a button and only one combination of 2 characters is possible, the characters are recognized without ambiguity by setting the selection order of the 2 characters which forms a possible combination as 1 stroke (i.e., one press) and 3 strokes of the corresponding button respectively, not as 1 stroke and 2 strokes respectively. It is also applicable to set the 2 characters which form a possible combination as 2 strokes and 3 strokes respectively, and in this case "ao" is recognized by 5 strokes of the corresponding button without ambiguity. That is, in setting the selection order of assigned characters by strokes of a corresponding button, the selection order of the characters which appear in succession with 1 stroke and 2 strokes of the button should not be set.

In FIGS. 10-1~10-4, when an initial is input by Romanization of Chinese, the same button is pressed 2~3 times, and the system recognizes a target character by sensing presses of the button. When a final is input by Romanization of Chinese, in FIGS. 10-1~10-3, a case in which a button is pressed 3 times is the case in which the [0] button is pressed 3 times for inputting "io" of the Chinese compound final "iou". The system temporarily recognizes "0" as "i", and then when a button other than the [0] button is pressed, the system confirms recognition of "0" as "i". When the [0] button is pressed once more, the system temporarily recognizes "00" as "o", and then when a button other than the [0] button is pressed, the system confirms recognition of "00" as "o". When the [0] button is pressed once more, the system confirms recognition of "000" as "io". Because Chinese is restricted such that there is no case of "oi", the [*] button is pressed twice at most, thus the system temporarily recognizes "*", as "a", and confirms recognition of "" as "e" as shown in FIGS. 10-1 and 10-3**. Because the same Roman vowel does not appear in succession in Romanization of Chinese, and the vowels in the same button does not appear in succession.

The character input system may be implemented without ambiguity in Chinese (or with far less ambiguity in a language other than Chinese), because the system recognizes that a certain consonant of consonants of a corresponding consonant button is being input while the consonant button (e.g., [1] button in FIG. 10-1) is being pressed once or more, and then when another consonant button (e.g., [9] button in FIG. 10-1) is pressed, the system recognizes that consonants which are assigned to the first button and the second button are being input in succession. Another reason is that about 2 characters are assigned to each button, rather than 3. According to a prior document of the applicant, when a consonant and a vowel are grouped into one group, 2 characters are assigned to each button, and ambiguity is substantially reduced relative to the case in which 3 characters are assigned to each button. "Successive Stroke Delay Time (SSDT)" and "Discrete Stroke Delay Time (DSDT)" which are proposed by the applicant are effectively applicable when 2 characters are assigned to each button.

Figures 1, 2, 3, 6, 7, 8, 9:
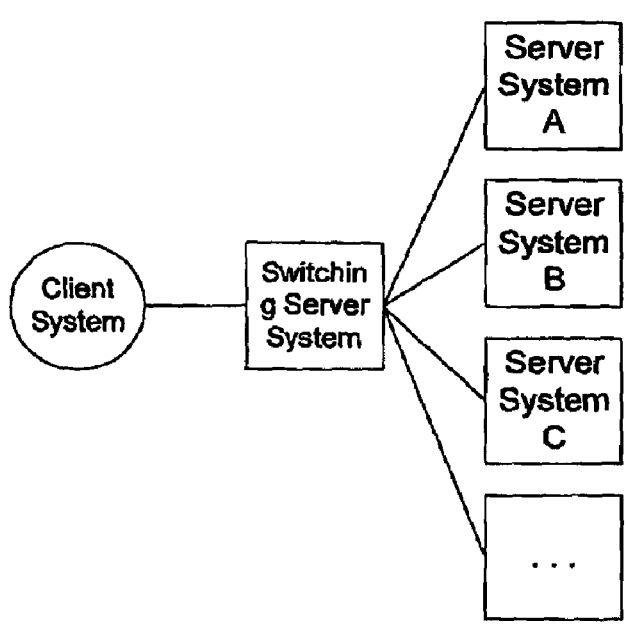

FIG. 10-7 excepting the (R) steps explains the general flow of the Repeat Selection Method in a Consonant-Vowel Separated Keypad (CVSK). Input values are assumed to be only consonant buttons or vowel buttons in FIG. 10-7. It is assumed that there is no special purpose or function button (e.g., succession control button for inputting succession characters). FIG. 10-7 is not absolute, but it may be referenced. A detailed flow in which a stroke of a button is interpreted as a first character of the corresponding button is not described precisely, but this process is performed in the step (R0) in FIG. 10-7. Language restriction is considered in the (R) steps, and the (R) steps may intrude in certain processes (i.e., steps). When a first input value is a button among consonant buttons, only 2 characters are assigned to the button, and the characters which are assigned to the button do not appear in succession (e.g., [1] button in FIG. 10-1), so the system confirms recognition of the input values as those of a consonant (e.g., "P" in FIG. 10-1) in step (R1) when the button is pressed twice consecutively. This is similar to the case of eliminating ambiguity (i.e., the case of confirming a target character without ambiguity or with less ambiguity in RSM) in FIG. 4-1 by applying language restriction. The flow of FIG. 10-7 is far simpler than that of FIG. 4-4.

When the same consonant button or other consonant buttons are pressed consecutively and then a vowel button is pressed, the system may confirm target character(s) from the input value and then proceed to the vowel process. The first input value of the vowel process is the last input button in the consonant process. This is the same as the case of transition from the vowel process to the consonant process.

In FIG. 10-7, recognizing characters while applying language restriction (R) is possible with the index of possible combinations (e.g., "ch", "sh", "zh", "iao", "iou", "ia", "ie", "uai", "uei", "ua", "uo", "ue", "ai", "ao", "ua", "uo", "...ue", "ou" . . . ) of consonants and vowels or with the index of non-possible combinations (e.g., "bb", "aa", "ee", "oa", ...) of consonants and vowels (on the specipic keypad). When ambiguity occurs from the input values, the system recognizes a target character by excluding non-possible combinations. For example, in FIG. 10-2 (to which Chinese restriction is applied), the system stores "ao" in the index of possible combination of vowels, and then when "0000" is input for "ao", the system recognizes "0000" as "ao". Another example is that the [0] button is pressed 4 times at most without any mis-inputs in FIG. 10-2 and FIG. 10-4, and the system recognizes "0000" as "ao" by considering this specific keypad. The rest of the processes are performed according to FIG. 10-7.

In FIG. 10-7, the omitted processes are similar to the described processes. The more generalized form of FIG. 10-7 without the omitted processes is FIG. 10-8, which is substantially the same as FIG. 10-7. In FIG. 10-8, (1) means virtual input of a button and "n←(n+1)" which is marked on the arrow directed to (1) means that a button is pressed once more.

When a Chinese syllable is represented as Chinese romanization (pinyin), in case of that finals such as "en", "eng", "an", "ang", and "er" are used, the end of the syllable is ended with an English consonant (English alphabet consonant) (for instance, ren: ㄣThat is, English alphabet consonants capable of being at the end of a syllable in a word or a phrase are "n", "g" and "r". Expediently, the English alphabet consonants capable of being at the end of a syllable of Chinese romanization(pinyin) are called "Available Final Consonants of a Pinyin Syllable (AFCPS)".

In case of a syllable using the available final consonant, i.e., a syllable using a final such as "en", "eng", "an", "ang", or "er", ambiguity may occur between the previous syllable and the next syllable if the two syllables have the same English consonant. For instance, in case of "Zhongguo (大)", "~gg~" can be recognized as "~k~". As described above, in the very special case, the ambiguity may occur. However, the ambiguity can be eliminated if the available final consonants, i.e., "n", "g", "r", etc., are entered with two strokes of the corresponding button from each group including the consonants (as shown in FIG. 10-6, when only two characters are arranged in the group including "n", "g", and "r").

As shown on FIG. 10-6, in case of "rennai (ㄥ)", "88**7777*#" can be entered without ambiguity as "n" of the consonants capable of being at the end of a Chinese romanization(pinyin) syllable is selected with two strokes of the corresponding button [7]. "7777" entered for inputting "nn" can be recognized as "nn" without ambiguity (as it is impossible that "mmmm", "nmm", "mnm" and "mmn" cannot be combined at the center of a word or a phrase in a Chinese romanization(pinyin)). Namely, as shown in FIG. 10-6, the Chinese romanization(pinyin) can be inputted without ambiguity if the selection order of "g" and "k" is "k-g".

As described above, to avoid any ambiguity by selecting the available final consonant with two strokes in the corresponding group, two characters must be grouped in the corresponding group. If three English alphabet characters, for example, "m", "n" and "w" are grouped and selected in an order of "m-n-w" according to the number of press of the button, even though "n" is selected with two strokes of the corresponding button, it may cause ambiguity between "renmin (人民)" and "rewin" when the user enters "renmin (人民)" (the system can recognize the input value as "renmin (人民)" as "rewin" does not exist in Chinese romanization(pinyin) actually, but "rewin" is available Chinese romanization(pinyin) combination).

Therefore, as shown in FIG. 10-4, if English consonants can be grouped by three consonants, it is necessary to group the available final consonants of the Chinese romanization (pinyin) syllable, i.e., "n", "g" and "r" in groups respectively, in which two consonants are grouped. Also, in case of that consonants are grouped by two consonants, if "n" and "r", and "g" and "r" of the available final consonants are grouped in the same group, it may cause ambiguity. For instance, if "n" and "r" are grouped in the same group, when "~nr~" is entered, ambiguity may occur between "~nr~" and "~rn~". It is same when "g" and "r" is grouped in the same group.

In FIG. 10-1~FIG. 10-6, as "n" and "g" are assigned to different buttons, they can be inputted without ambiguity. Of course, even though "n" and "g" are grouped in the same group, if only "n" and "g" are grouped, they can be inputted without ambiguity. For instance, "n" and "g" are grouped in the same group and assigned to a button [5], when the button [5] is pressed three times (namely, when "555" is entered) to input "vowel+ng", it can be recognized not as "vowel+gn" but as "vowel+ng". The reason is that the language restriction in which "vowel+gn" cannot be located at the center of a word for Chinese romanization(pinyin) can be used. As described above, in case of that "n" and "g" are grouped in the same group, if the selection order according to the number of button pressing is "g-n", "n" is represented when the corresponding button is pressed twice, and "ng" can be represented when the button is pressed once more. So, WISWYG(What You See is What You Get, and more correctly, What You Press is What You See) can be realized naturally. In FIGS. 10-2, 10-4 and 10-6, vowels of "a", "e" and "o" are grouped in one group and assigned to a button [*] (see FIG. 10-6). If the selection order according to the number of the button pressing is "o-e-a", when the button [*] is pressed three times, the system can recognize and represent it as "a", and when the button [*] is pressed once more, "ao" is represented naturally, so that it can provide the user with affinity.

In a condition in which only "n" and "g" are grouped in the same group and assigned to a button (for example, button[5]), when "5555" is inputted after a vowel button is pressed, the system recognizes it as "vowel+ngg", and when "55555" is inputted, the system recognizes it as "vowel+ngn". If "vowel+ng" is frequently used in Chinese romanization(pinyin), the grouping of "n" and "g" in the same group can increase convenience of inputting. However, the method is not good because to group consonants of similar sounds in the same group is natural for utility of simple codes.

In case of that other English consonants (for instance, 'm') as well as "n" and "g" are grouped together, if one of the consonants is selected in order of "m-n-g" or "m-g-n" to input Chinese romanization(pinyin) without ambiguity (that is, if the consonant besides "n" and "g" is selected with one stroke of the corresponding button), the selected consonant can be recognized without ambiguity. For instance, when a desired consonant is selected in order of "m-g-n" according to the number of button pressing, that the corresponding button is pressed five times after a vowel button is pressed is recognized as "vowel+ng". Furthermore, that the corresponding button is pressed six times is recognized as "vowel+ngm", that the corresponding button is pressed seven times is recognized as "vowel+ngg", and the corresponding button is pressed eight times is recognized as "vowel+ngn" without ambiguity. However, it is not preferable as the number of repeated pressing is excessive when "ng" is inputted.

In FIGS. 10-7, 10-8 and 10-9, even in case of that consonants, such as "nX", "ngX" and "rX" (the capital letter "X" means an initial represented in an English consonant), are successively entered during a process for processing a consonant of not the first of a word but the middle of the word, an input value is processed as an available consonant combination for pinyin. The reason is that English consonants such as "nX", "ngX" and "rX" are not successively used as an initial of a word. Finally, in inputting Chinese romanization(pinyin), English consonants used at the middle of a word or a phrase are four, i.e., "~ngch~", "ngsh" and "~ngzh~" to the maximum. In FIGS. 10-7, 10-8 and 10-9, such language restriction is used during the process for processing a consonant, which is at the middle of a word.

Ambiguity may occur by using an English consonant at the end of a syllable, but a method for inputting the consonant without ambiguity is represented as follows. As the selection order according to the number of button pressing can be arbitrarily determined from the alphabet character groups assigned to the buttons, it is a more detailed description of prior document of applicant. The available final consonants of pinyin syllables are frequently used as they can be used at not only the initial but also the final of a syllable. Ambiguity does not frequently occur, and the order for selecting an available final consonant from each group including available final consonants can be determined in consideration of convenience of input as non-existing pinyin (for instance, "rewin") are excluded referring to Chinese romanization (pinyin)/Chinese character index even when ambiguity occurs.

In FIG. 10-1 of the above content, the individual Roman character can be entered with 1.5 stroke of the corresponding button on average. Considering the use frequency in Chinese, the frequently used characters can be entered with one stroke of the corresponding button to minimize the number of strokes for the entry of each character.

6.1.4 Reactivation of Original Function of Functional Button used as Control Button For the entry of an affixed character of a Roman alphabet vowel with a superior in FIG. 10-1, a "separate button" out of the 3*4 keypad can be used as a control button. For example, the left cursor button [<] in the Chinese input mode can be used to enter as "e=e+[<]", " e=e+[<]+[<]", "'e=e+[<]+[<]+[<]", "ˇe=e+[<]+[<]+[<]+[<]", and "ˆe=e+[<]+[<]+[<]+[<]+[<]". Five strokes of the left cursor button in succession cannot select a control associated with "e", so that the moving function of the button is activated ("e" is already entered). The delete button (expediently, denoted as "[X]") can be used as a control button for the input of an affixed character as "e=e+[X]", " e=e+[X]+[X]", "'e=e+[X]+[X]+[X]", "ˇe=e+[X]+[X]+[X]+[X]", and "ˆe=e+[X]+[X]+[X]+[X]+

[X]". Five strokes of the delete button in succession may delete the previously input "e". In this manner, a button of another function can be used as a control button to its original function (e.g., moving function) is reactivated when no control is selected after the selection of the control according to the number of strokes of the control button.

With the moving function of the left cursor button reactivated in the above example, no more than one stroke of the left cursor button [<] activates the left moving function. That is, five strokes of the button [<] after the input of "e" makes the cursor move to the left side by one space from "e", and another stroke of the button [<] moves the cursor to the left side by one space. The same is applied to every language.

6.1.5 Chinese Restricted RSM in Consonant-Vowel Separated Keypad (Including Entry of Affixed Character on 3*4 Keypad)

Now, a description will be given as to the entry of an affixed character of a Roman alphabet vowel with a superior (e.g., a tone symbol) on the 3*4 keypad.

In the compound final table, the vowels that cannot appear next to "i" are "i" and "u" (in other words, "a", "e" or "o" appears after "i"). The vowels that cannot appear next to "u" are "u" and "i" (in other words, "a", "e" or "o" appears after "u"). Thus the vowel arrangement of FIG. 10-2 is available. To affix a tone symbol to the vowel "i", "a" or "e" on the left side of FIG. 10-2, the button [#] for the vowel "u" on the right side is used as a control button. Likewise, the button [*] on the left side is used as a tone symbol control button to affix a tone symbol to the vowel "o" or "u" on the right side. For example, entries are given as " o (second pitch of tone)=o+[*]+[*]=[0]+[0]+[0]+[*]+[*]", " a (second pitch of tone)=a+[#]+[#]=[0]+[#]+[#]", and "^e=e+[#]+[#]+[#]+[#]+[#]=[0]+[0]+[#]+[#]+[#]+[#]+[#]". The entry of a double final "ao" is given as "ao=a+o=[0]+[0]+[0]+[0]". The system readily recognizes this without ambiguity, because the vowel "a" or "e" does not appear next to "a" and there is no case of "oa". The vowel "u" similar in shape to vowel "u" can be entered with two strokes of the button for "u" (by the Hiding Repeat Selection Method).

This is based on the feature of the Chinese language that the vowel "u" does not appear next to the vowel "a" or "e" and that the vowel "i" does not appear next to the vowel "o". It is impossible to use the buttons allocated to the vowels as a control button as in FIG. 10-2 using the Roman alphabet vowel coupling rules of the Chinese language under the above-stated restriction that "a" and "i", or "e" and "i", or "o" and "u" are not sorted in the same group and that two vowels are assigned to each three buttons. The reason that "i" and "u" are assigned to the button [*] or [#] in FIG. 10-2 is for the user to readily recognize the use of the button as a control button and to take the balance of arrangement into consideration. The average number of strokes for vowels in FIG. 10-2 is about 1.5 as in FIG. 10-1.

In a modified example of FIG. 10-2, some of the three characters assigned to the button [0] can be designated as a "separate button" out of the 4*3 keypad. For example, any one of the up, down or left move button can be used for the allocation of some of the three characters separately.

Romanization is achievable without ambiguity using the Repeat Selection Method in FIGS. 10-1 to 10-4, because the consonant buttons [1] to [9] are separated from the vowel buttons [*], [0] and [#], and the romanization of Chinese characters follows the consonant and vowel appearance rules of the Roman alphabet.

6.2 English Restricted RSM on Consonant-Vowel Separated Keypad

Like the Chinese language, English can be entered with less ambiguity using the repeat selection method on a Consonant-Vowel Separated Keypad (CVSK) shown in FIGS. 10-1 to 10-4. This is because the words of every language using the Roman alphabets consist of consonants and vowels that alternately appear.

For English, the utmost repetition of consonants from the "start of word" can be expressed as "CCCCVCCCC" (e.g., "strengths"), where C represents a consonant and V represents a vowel. At most three consonants can appear at the start of word, which case is restricted to "st~" or "sp~" (e.g., spree, spleen, strength, etc.).

As in FIG. 10-1, when the user enters "622~" to input an English word "student" on the keypad containing about two or three consonants (expediently, supposing that only "ü" is not arranged in FIG. 10-1), the system recognizes "622" entered after the "start of word" as "st" rather than "sdd" (because the case that three consonants appear in succession in an English word is restricted to "st~" or "sp~" and the system has to remind such an English word production rule or a character coupling rule). The button for a corresponding vowel is chosen in entering "u" of "stu~", so that the system recognizes that the vowel (e.g., "u") appears after the consonant group (e.g., "st"). Upon the user entering "2" to input "d" after the entry of "stu", the system recognizes that the consonant appears. Likewise, when the user enters "~7722" to input "~ent" of "student", the system recognizes that "e" rather than "aa" is entered upon the users entering "", because "a" does not appear in succession in English as previously described in the prior document. Though "7722" may be interpreted as "mmt", "ndd", "nt" or "mmdd", ambiguity caused by the repeat selection method can be remarkably reduced by determining the "Successive Stroke Delay Time" and the "Discrete Stroke Delay Time" differently, as described in the prior document.

On the current standard English keypad (FIG. 1-1) in which a combination of consonants and vowels is assigned to each button, ambiguity caused by the repeat selection method can be reduced by considering the word production rules (character coupling rules) of a specific language. It is however difficult to apply the language restricted input method (especially, using the repeat selection method as the Full Input Method) in the case that a combination of consonants and vowels is assigned to a single button. For example, when the user enters "student" using the repeat selection method in FIG. 1-1, "stu~" is "777888~" and the system cannot judge whether "888" next to "777" recognized as "s" is "ut (i.e., sut)", "u (i.e., stu)", or "V (i.e., sv)" (of course, the system can consider that "888" is not "ttt", because "ttt" cannot appear next to "s" in the English restricted input method). Likewise, when the user enters "333" to input "~de~", ambiguity occurs between "de" and "ed" and the system can consider "888777" entered before "de~" as "sut", "stu" or "sv". So in three cases, the system may consider "333" as "~de~" or "~ed~".

As such, ambiguity occurs in the repeat selection method used as the full input method even when using the language restricted input method, since the system cannot clearly determine whether the input value is to enter a consonant or a vowel, in the use of the consonant and vowel appearance rules (i.e., word production rule and character coupling rule) in the language restricted input method. In case where consonants are assigned separately from vowels as in FIGS. 10-1 to 10-4, the system recognizes the stroke of the button allocated to a vowel as the input of the vowel and the stroke of the button allocated to a consonant as the input of the consonant in the repeat selection method, thereby remarkably reducing ambiguity.

At least two vowels appear in succession often in English using Roman alphabets (for example, "ai" in "captain"). In actual words, there are relatively many cases where the same vowel (basic vowels "a", "e", "i", "o" and "u") appears in succession as "oo" or "ee" of "food" or "teen". But "uu" (e.g., "vacuum") rarely appears. The applicant have never found out a word like " . . . aa . . . " or " . . . ii . . . " in the English dictionary. Accordingly, ambiguity can be avoided in many cases by assigning five English basic vowels to button [*], [0] or [#] to select "a" with one stroke and one of "e", "o" and "u" with two strokes. For example, when the vowels "a" and "o" are assigned to the button [*] in the repeat selection method, the system considers two strokes of the button [*] as the entry of vowel "o" rather than two vowels "aa". Likewise, when "i" and "u" are assigned to the button [0] in the repeat selection method, the system considers two strokes of the button [0] as the entry of vowel "u" rather than two vowels "ii". Even though it is not absolute that there is no case of "aa" or "ii", in actual words, ambiguity is nearly eliminated by determining the "Successive Stroke Delay Time" and the "Discrete Stroke Delay Time" differently as described in the prior document. The other vowel "e" is assigned to the button [#] and selected with one stroke of the button.

To utilize one of the buttons [*], [0] and [#] as a button for a special use, the user has only to assign the vowel "e" to a certain button for the vowel. For example, "i", "e" or "u" can be assigned to the button [0]. The vowel "u" is selected with three strokes of button [0], because it is the least frequently used vowel in English. Finally, ambiguity hardly occurs between the vowels "i" and "e" (with one stroke and two strokes, respectively) When "i", "e" and "u" are assigned to the button [0] and the vowel "i" does not appear in succession (i.e., " . . . ii . . . ") in English. But ambiguity occurs among "u", "ie" and "ei" when the vowel "u" is entered with three strokes of the button [0]. This case rarely occurs because of the low use frequency of the vowel "u".

Thus ambiguity can be remarkably reduced using the consonant-vowel separated keypad. Moreover, almost no ambiguity occurs in entering vowels with a button allocated to multiple vowels by selecting the vowel not appearing in succession in English words existing in the dictionary with one stroke of the button.

The same is applied to the keypad in which about two or three consonants are assigned to each button, as in the case where the vowel not appearing in succession is selected with one stroke of a corresponding button and the least frequently used vowel is entered with three strokes of the button.

Though the above description exemplified English using Roman characters, the same is applied to the other languages using Roman characters.

6.3 Indonesian Restricted RSM on Consonant-Vowel Separated Keypad

Indonesian also used Roman characters (English characters) in the notation of words. Indonesian syllables are constructed as follows (where C represents a consonant and V represents a vowel).

V: be-a (tariff)
VC: am-bil (catch)
CV: go-sok (rub)
CVC: pon-dol (hut)
CCV: tra-di-si (tradition)
CCVC: con-trak (contract)
CVCC: teks-tur (textile)
CCCV: kon-struk-si (construction)
CCCVC: strip-tis (striptease)

As can be seen from the above words, the words containing three or more consonants are foreign words originated from English words. Thus it is assumed that three or more consonants do not appear in succession in the start of the word, excepting the words such as "st~" or "sp~" in Indonesian. The Indonesian restricted repeat selection method can be applied using the word production rule (character coupling rule).

"q" and "x" are used for scientific symbols such as physics or mathematics and are rarely used for character input. So "q" and "x" may not be arranged in a specific button group and can be entered with three strokes of a corresponding button. Similar to the Chinese language, the sounds of the Indonesian language can be spelled out with a combination of two or more Roman characters, including "ny", "sy", "kh" and "ng".

Groups of consonants which are not separated into syllables are "bl", "br", "dr", "dw", "dy", "fl", "fr", "gl", "kr", "ks", "kw", "pl", "ps", "rps", "rs", "sk", "skr", "sl", "sp", "spr", "sr", "str", "sw", etc. In particular, "skr~", "spr~", "str~" appear at the beginning of words, and they are used as criteria for recognizing whether input values are full code or simple code in the Language Restricted CIM, which will be described later. (Even though the applicant does not know whether "rps" appears at the beginning of a word or not, if it may be at the beginning of a word, it may be a criterion for judging whether input values are full code or simple code.)

Any method for grouping 19 consonants other than "q" and "x" among 21 English alphabet consonants into nine groups is applied. But the grouping has to take the feature of the Indonesian language into consideration. For example, the grouping may be given as follows:

BP/DT/GK/CJ/MN/LR/SZ/FV/HWY

"q" and "x" can be arranged in proper groups. For example, "q" is included in "GK" group and "x" is included in "SZ" group.

Five vowels "a", "i", "u", "e", and "o" are used in the notation of Indonesian vowels. There are three double vowels "ai" "au" and "oi", among which "oi" is rarely used. It is therefore preferable that "a" and "i", or "a" and "u" are not arranged in the same group in sorting the five vowels into two or three groups. For example, the grouping is done as ae/uo/i. As in the case of English, the vowels not appearing in succession (or less frequently used in succession) are preferably selected with one stroke of the corresponding button in the individual group.

6.4 Japanese restricted RSM on Consonant-Vowel Separated Keypad

It is a widely used Japanese input method that enters the sounds of the Japanese language using Roman characters and converting them into Japanese. Thus Roman characters on the consonant-vowel separated keypad as shown in FIGS. 10-1 to 10-4 can be used to input the sounds of the Japanese language and to convert them to Japanese. あ, い, う, え, and おare transcribed as a, i, u, e, and o, respectively. な, に, ぬ, ね, and のare transcribed as na, ni, nu, ne, and no, respectively. The other characters can be transcribed in a combination of Roman alphabet consonants and vowels.

In Japanese, it is when a Soku-on sound or a You-on sound (marked in small letter) is used that Roman alphabet consonants appear twice in succession. Supposing that a combination of あ, い, う, え, and おrarely appears in succession in words containing Roman alphabet vowels in succession, such a successive appearance of at most two or three Roman alphabet vowels is very rare. Accordingly, the five Roman alphabet vowels "a", "i", "u", "e" and "o" are sorted in three groups as in FIGS. 10-1 to 10-4 and assigned to three buttons. In this case, the entry of vowels by the repeat selection method rarely cause ambiguity. For Japanese, the input of "a" corresponds to ""あ"" and the input of "na" corresponds to "" な"" (the same is applied to the other Japanese characters). So the system provides "" な"" the moment it recognizes the input value of "na" entered by the user.

There are 14 Roman alphabet consonants that are used for romanization of Japanese characters in the 50-character table, including k, s, t, n, h, m, y, r, w, g, z, d, b, and p. For You-on sounds, a combination of two Roman alphabet consonants (e.g., "cha" or "sha"), a combination of "y" (e.g., "kya"), or "j" is used for the notation. Roman alphabet consonants appear two or more times in succession in the case of ch, sh, ky, ny, hy, my, ry, gy, py or py, and using Soku-on sounds. When using Soku-on sounds, there are cases where the same alphabet among k, s, t, and p appears in succession (e.g., "ippai"). Thus the 16 Roman alphabet consonants (14 consonants+c and j) are indispensable in the entry of Japanese characters. The Consonant-Vowel Separated Keypad can be constructed to make the entry of those consonants easier. The other five Roman alphabet consonants f, l, q, v, and x are also needed for the entry of English, but the 16 Roman alphabet consonants are mainly grouped. For example, the grouping may be achieved as follows:

BP/DT/GK/CJ/H/MN/R/SZ/YW/=> in nine groups
BP/DT/GK/CJ/H/MN/Y/SZ/RW/=> in nine groups
BP/DT/GK/CJ/HR/MN/SZ/YW/=> in eight groups The five Roman alphabet consonants necessary for the entry of English can be properly added to the individual groups as in the case of Chinese. In the example of grouping the Roman alphabet consonants in eight groups, the other 4 buttons on the 3*4 keypad are used as a vowel button and, if using only three vowel buttons, the other one button is used for the consonants necessary for the entry of English.

6.5 Intentional Cancellation of Language Restriction

LRRSM is applied at the expense of the advantage of FIM that enables the entry of all words irrespective of the existence of the words in the dictionary. It is therefore preferable that the user is allowed to determine to use language restriction or not. But even in the "language restricted input mode" that enables the language restricted input method, the user who intends to enter a word not present in the dictionary and infringing the word production rules (character coupling rules) has to input a specific function (for example, space, left move or word ending) after the input of a basic character to intentionally confirm the target character and enter the next character. This makes it possible to enter all possible combinations of character. For example, when the user enters "622~" in the English restricted input mode" in FIG. 10-1, the system recognizes the input value as "st~" rather than "sdd~". To enter "sdd~", the user has only to enter "62", a space or left move function, and then "2", or to enter "62", a certain means for activating "word end function (e.g., a control to end the word)", and then "2". If the word end function is activated after the input of "62", the system considers the next input of "2" as "d" because "2" is the first input after the "start of word". Such an intentional input of the word end function to overcome language restriction in a specific Language Restricted Input Mode is called "intentional cancellation of language restriction" The example of "sdd~" is the "intentional cancellation of English restriction".

Likewise, to enter "ui" that is a combination of consonants present in English rather than in the romanization system of Chinese in the Chinese Restricted Input Mode (applying the Chinese Restricted RSM) in FIG. 10-2, the user has only to enter "u", a means for ending the word (as mentioned above) and then "i". Otherwise, when the user selects the button allocated for "i" after the input of "u" in the Chinese restricted input mode (using the Chinese restricted RSM) in FIG. 10-2, the affixed character of "u" is entered as described in the prior document (e.g., if the system is set to consider a character with a tone symbol added to "u" or a character (i.e., "u") with " . . . " added to the top of "u" as the affixed character of "u") (because the button for "i" entered after the input of vowel "u" or "o" is used as a control button in the Chinese Restricted RSM). Thus the user can enter any word not present in the romanization system of Chinese (e.g., all combinations of alphabet such as English words) in the Chinese restricted input mode. In other words, the user who mainly uses the Chinese language can enter all the combinations of characters not present in Chinese in the Chinese restricted input mode (e.g., the mode using Chinese Restricted RSM) without a change of the mode. This corresponds to the "intentional cancellation of Chinese restriction".

The same is applied to the entry of a consonant or a vowel as a single character in the method using three vowel elements in Korean. For example, to enter consonant ""ㄱ"" and vowel "ㅜ" as a single character in FIG. 45, the user has to select button [1] in the "start of word" state, a means for the word end function, and then button [*] in the "start of word" state again. Successive strokes of buttons [1] and [*] provides ""ㅜ".". In the standard keyboard (i.e., standard English and Korean keyboard), a stroke of the right cursor button activates the word end function instead of entering a space. The same is applied to the present invention if the right cursor button is added.

6.6 Delay time for Cancellation of Language Restriction

The "Successive Stroke Delay Time" and the "Discrete Stroke Delay Time" are applied in the case where three or more characters are assigned to one button. For example, when the successive stroke delay time is set to 0.1 second in the standard English keypad of FIG. 1-1, the system considers two successive strokes of button [2] within 0.1 second as "B".

Likewise, the system recognizes the entry of "C" when button [2] is selected three times in succession (i.e., [2]+[2]+[2]) and the delay time interval between the first and second input values (i.e., the first and second strokes of button [2]) is less than the predetermined time (e.g., 0.1 second), the delay time interval between the second and third input values being less than the predetermined time (e.g., 0.1 second) (i.e., [2]+less than 0.1 second+[2]+less than 0.1 second+[2]). The system can be set to recognize the entry of "C" when button [2] is selected three times in succession (i.e., [2]+[2]+[2]) and the total delay time is less than double the successive stroke delay time (e.g., 0.2 second).

For English, if "u" is not present in FIG. 10-1 and the rule that vowel "a" or "i" does not appear in succession in English words is strictly applied, the user can enter an abbreviated word such as "NII" in the English restricted repeat selection mode through "intentional cancellation of English restriction" by activating the word end function. But the entry of "NI" can be confirmed without activating the word end function at the end of a predetermined time after the input of "NI". The predetermined time may be the same as the "discrete stroke delay time" as mentioned in the prior document and is preferably longer than the "discrete stroke delay time". For example, the input of "NI" is confirmed without activation of the word end function at the end of 2 seconds after the input of "NI" and the system returns to the "start of word" state.

This delay time is called "Delay Time for Temporary Cancellation of Language Restriction (DTTCLR)" and is preferably set by the user. Evidently, the same is applied to every language.

The delay times can be summarized as follows:

Successive Stroke Delay Time (SSDT) ≦Discrete Stroke Delay Time (DSDT)≦Delay Time for Temporary Cancellation of Language Restriction (DTTCLR)

The three delay times may be set to be the same. Preferably, the discrete stroke delay time is longer than the successive stroke delay time and the delay time for temporary cancellation of language restriction is longer than the discrete stroke delay time.

6.7 Portuguese Resctricted RSM in CVSK

In Portuguese, "k", "w", and "y" are used in abbreviations or foreign languages, but they may be needed for inputting text. Some compound consonants in Portuguese are as follows.

bl, cl, dl, fl, gl, pl, tl br, cr, dr, fr, gr, pr, tr, vr

Additional compound consonants are "gn", "mn", "pn", "ps", "pt", "tm", "ch", "lh", "nh", "rr", and "ss". Thus, when configuring CVSK for the Portuguese Restricted Input Method, it is preferable that the characters which appear consecutively are not grouped into a group. For example. FIG. 10-1~FIG. 10-6 are referenced. Even though "m" and "n "are grouped into one group in FIG. 10-1~FIG. 10-6, this may be modified. The examples of keypads in FIG. 10-1~FIG. 10-6 may be applied to other languages as well as Chinese because the characters are grouped on the basis of similarity of pronunciation (i.e., voiced sound character and unvoiced sound character which have simliar pronunciation are grouped into one group—e.g., /b p/, /d t/, /g k/, . . . ), and it is rare that the characters which have similar pronunciation appear consecutively in most languages.

There are 5 basic vowels "a", "e", "i", "o", and "u" in Portuguese. "a", "e", and "o" are strong vowels and "i" and "e" are weak vowels. There are 6 cases of combination of 2 successive different vowels (i.e., "ai", "au", "ei", "eu", "oi", and "ou") in which the combination consists of "a strong vowel+a weak vowel" and 1 case (i.e., "ui") in which the combination consists of "a weak vowel+a weak vowel". Therefore the strong vowel group and the weak vowel group are classified separately (e.g., the keypad in which " . . . +u" is eleminated from FIG. 10-6). Every other classification into several groups is available as long as the strong vowel group and the weak vowel group are classified separately. For example, vowels are grouped as "/a/ le o/, and /u i".

6.8 Spanish Resctricted RSM in CVSK

There is a "~+n" character (the character with "~" affixed on the head of 'n') in Spanish. The affixed character "~+n" does not exist in English. "k" and "w" are used only for foreign language in Spanish, but they are needed for inputting text. Some compound consonants in Spanish are as follows.

bl, cl, dl, fl, gl, pl br, cr, dr, fr, gr, pr, tr

Thus, for the configuration of CVSK for the Spanish Restricted Input Method, it is preferable that "l" and "r" is not grouped in the same group and the consonants which appears consecutively is not grouped in the same group. The classification of consonants in FIG. 10-1~FIG. 10-4 and FIG. 10-6 are referenced.

There are 5 basic vowels "a", "e", "i", "o", and "u" in Spanish. "a", "e", and "o" are strong vowels and "i" and "e" are weak vowels. There are 6 cases of combination of 2 successive different vowels which consist of "strong vowel+ weak vowel", 6 cases which consist of "a weak vowel+a strong vowel", and 2 cases (i.e., "iu" and "ui") which consist of "a weak vowel+a weak vowel". Triple vowels consist of "a weak vowel+a strong vowel+a weak vowel". Therefore the strong vowel group and the weak vowel group are classified separately (e.g., the keypad in which " . . . +u" is eleminated from FIG. 10-6). Ambiguity occurs during the entry of a compound vowel which consists of "weak vowel+weak vowel". In the case of "iu" and "ui", ambiguity may be overcome by using Successive Stroke Delay Time (SSDT), Discrete Stroke Delay Time (DSDT), Intentional Cancelation of Language Restriction, and other methods which the applicant proposes. They are also applicable when the same consonant appears consecutively, the same vowel appears consecutively, and for other cases in which ambiguity occurs.

6.9 Italian Resctricted RSM in CVSK

In Italian, "j", "d", "w", "x", and "y" are used only for old Italian and foreign languages. They are also needed for the entry of English. The consonants excepting these 5 consonants are regarded as main consonants and they are classified into groups, and these 5 consonants are additionally and properly classified into groups.

Double vowels in Italian are "ia", "io", "ie", "iu", "ai", "ei", "oi", "ui", "uo", "ou", "eu", etc. Excepting "iu" and "ui", these double vowels are the combination of a strong vowel (i.e., a vowel from "a", "e", and "o") and a weak vowels (i.e., a vowel from "u" and "i"). Triple vowels are also structured as a combination of "a weak vowel+a strong vowel+a weak vowel". Thus, classifying vowels into one group of strong vowels and another group of weak vowels is possible, for example, /a e o/ and /u i/. Ambiguity occurs in the case of "ui" and "iu".

6.10 German Restricted RSM in CVSK

Compound consonants in German are "ch", "chs", "ck", "ds", "dt", "ng", "nk", "pf", "ph", "sch", "sp", "st", "th", "ts", "tz", "tsch", etc. To make sure consonants which appear consecutively are not classified into the same group, the grouping in FIG. 10-1~FIG. 10-6 is referenced. "sch~" is a case in which 3 consonants appear at the beginning of a word in German, and it may be used for the criteria in "Language Restricted CIM". "tsch" may also appear on the beginning of a word, but it is rare.

In German, there are 5 short sound vowels, and there are vowels with " . . . " affixed on the "a", "o", and "u". Double vowels are "au", "ei", "ai", "eu", " . . . +au", "ie", etc. Entry of vowels with the combination of short sound vowels (i.e., basic vowels) results in ambiguity between "ie" and "ei". Thus, separation of "i" and "e" is needed. For example, it is possible to classify short sound vowels into /a e o/ and /i u/, and various modifications are also possible.

When the same consonant appears consecutively and the same vowel appears consecutively, ambiguity may be avoided by the methods that the applicant proposes.

6.11 Vietnamese Resctricted Input Method 6.11.1 Vietnamese Resctricted Input Method in CVSK In Vietnamese, the main structure of a Syllable is "Vowel", "Consonant+Vowel", "Vowel+Consonant", or "Consonant+Vowel+Consonant". Especially, words in Vietnamese are basically structured of one syllable, even though the number of multi-syllable words is increasing. A large number of one syllable word means that it is easy to implement the text input system based on CVSK.

There are 5 basic vowels in Vietnamese, "a", "e", "i (or 'y')", "o", "u", and 6 affixed vowels, "v+a ('v' is affixed on the vowel 'a'. In the following, 'x+vowel' means that 'x' is affixed on the vowel)", "^+a", "^+o", ",+o", ",+u". "y" is the character of long pronunciation of "i". CVSK may be configured using 5 basic vowels, and affixed vowels may be input by CPM. CVSK may be configured using some basic vowels and some affixed vowels, or using all 11 vowels.

There are various double consonants and triple consonants in Vietnamese. Thus it is not easy to classify the 5 basic vowels into 2~3 groups as shown in FIG. 10-*, so as not to have ambiguity when RSM is applied. There are 6 kinds of sound tones, and 5 kinds of sound tone symbols are affixed on a vowel or beneath a vowel. The same vowel does not appear consecutively in Vietnamese, and this is very useful property for the entry of vowels. Thus, 5 basic vowels are classified into 5 groups, affixed vowels are entered (i.e., inputted) by Hiding RSM, and a sound tone symbol is affixed on/beneath a vowel (i.e., a basic vowel / an affixed vowel) by CPM. Here, "y" is regarded as an affixed character of "i". In other words, vowels are classified into 5 groups, such as /'a', 'v+a', '^+a'/, /'o', '^+o', ',+o'/, /'u', ',+u'/, /'i', 'y'/, and /'e', '^+e'/. Modification into 4 groups by adding 2 groups together which have a few affixed vowels is also possible. For example, it is possible to classify vowels into 4 groups, such as /'a', 'v+a', '^+a'/, /'o', '^+o', ',+o'/, /'u', ',+u'/, /'i', 'y'/, and /'e', '^+e'/. When the vowels are classified into the 5 groups, the vowels are entered without ambiguity by applying RSM. A certain character in each group may be designated as a Representative Character (i.e., a Representative Vowel) and the rest of the characters may not be marked on the keypad. It is natural for the basic characters (i.e., short sound vowels) to be designated as the Representative Characters. In the example of classifying vowels into 4 groups, both "i" and "e" are marked on the keypad. The selection order of characters according to strokes (i.e., presses) of a button is determined by considering use frequency or other factors.

There are "−+d ('−' is crossed in the center of 'd')" in Vietnamese consonants, and "f" and "z" are not used. "−+d" is regarded as an affixed character of "d", and it is entered by (Hiding/Non-hiding) RSM or CPM. According to some school books, "f", "w", and "z" are not used in Vietnamese. According to some other school books, "w" and "j" are semi-consonant in Vietnamese. Thus, it is considered that "f" and "z" are not used in Vietnamese and "w" is used but only infrequently even though "w" is used. In this embodiment, it is considered that "w" is not used in Vietnamese, but it may be included into a proper group if it is needed.

Compound consonants (including double consonants and triple consonants) in Vietnamese are "ch", "gh", "gi", "kh", "ng", "ngh", "nh", "ph", "qu", "th", "tr", etc. "gi" and "qu" among them are the combination of a consonant and a vowel in structure, and they are not considered here. The fact that words in Vietnamese are mainly constructed with single syllables means that it is rare for syllables constructed as "C+V+C" to appear consecutively, thus consonants do not appear consecutively except in the case of compound consonants described above. Consequently, when compound consonants described above are classified into several groups and RSM is applied, if the consonants which construct a compound consonant are not grouped into same group, ambiguity is removed just like in the case of Chinese.

For example, consonants may be classified into 8 groups, such as /b p/, /d t/, /g k/, /c q/, /s x/, /m n/, /l r/, /h v j /, or they may be classified into 6 groups, like /b p v/, /d t/, /g k q /, /s x c/, /m n j/, /h l r/. It is also possible to classify consonants into specific groups. Each of the consonants "f" and "z" which are not used in Vietnamese may be added into a certain group.

When consonants are classified into 8 groups and vowels are classified into 4 groups, all characters in Vietnamese are accommodated in a 3*4 keypad. When consonants are classified into 6 groups and vowels are classified into 5 groups, all consonants and vowels are accommodated in 11 buttons and the rest of the buttons are used as control buttons for affixing sound tone symbols to vowels. When consonants are classified into 6 groups and vowels are classified into 4 groups, all consonants and vowels are accommodated in 10 numeral buttons, which makes it possible to form the simple code with only numerals. The rest of the buttons in 3*4 keypad are used as control buttons.

RSM may be applied using pairs of a consonant and a vowel. Refer to the case of Korean. When 10 pairs of a consonant and a vowel are grouped, the rest of the consonants and vowels may be input by CPM.

6.12 Russian Restricted Input Method in CVSK

The prior document of the applicant, PCT/KR02/00247, is referenced for CVSK for Russian.

There are 33 characters in the Russian alphabet. Among them, there are 10 vowels, 20 consonants, 1 semi-vowel (i.e., semi-consonant), and 2 sign characters (i.e., hard consonant sign and soft consonant sign).

The 33 Russian characters (capital and small) by dictionary order are as follows.

А Б В Г Д Е Ё Ж З И Й К Л М Н О П Р С Т У Ф Х Ц Ч Ш Щ Ъ Ы Ь Э Ю Я

а б в г д е ё ж з и й к л м н о п р с т у ф х ц ч ш щ ъ ы ь э ю я

20 Russian consonants are classified as voiced consonants and unvoiced consonants in the following. Roman characters in parentheses represent pronunciation.

| Unvoiced Consonants | п, т, к, ф, с, ш (p), (t), (k), (f), (s), (sh) | х, ц, ч, щ (x), (ts), (tsh), (shsh) |
|---|---|---|
| Voiced Consonants | б, д, г, в, з, ж (b), (d), (g), (v), (z), (zh) | л, р, м, н (l), (r), (m), (n) |

Russian Vowels are classified as hard vowels and soft vowels.

| Hard Vowels | а (a), э (e), ы (y), о (o), у (u) |
|---|---|
| Soft Vowels | я (ja), е (je), и (i), ё (jo), ю (ju) |

In classifing Russian consonants into proper groups, pairs of a voiced consonant and an unvoiced consonant which have similar phonetic values may be classified into the same group. For example, /(b) п(p)/, /д(d) т(t)/ and so on. The consonants which do not have a relationship of a voiced consonant and an unvoiced consonant may be classified into proper groups, like examples in the prior document of the applicant. Some examples are as follows, and various modifications are possible.

Examples of classification into 10 groups

Example 1 : Б П / Д Т / Г К / В Ф / З
С / Ж Ш / Л Р / М Н / Х Ц / Ч Щ

Example 2 : Б В / Г К / Д Т / Ж З / Л Р /
М Н / П Ф / С Х / Ц Ч / Ш Щ

Example 1: of classification into 9 groups:

(b) п(p) / д(d) т(t) / г (g) к
(k) / в (v) ф(f) х(x) / з (z) с (s)/ж(zh) ш(sh)/ц(ts) ч(tsh) щ(shsh) / л (l) р
(r) /м(m) н(n)

Example 2: of classification into 8 groups:

(b) п(p) / д(d) т(t) / г (g) к
(k) / в (v) ф(f) х(x) / з (z) с (s) ж(zh) / ш(sh) ц(ts) ч(tsh) щ(shsh) / л (l) р
(r) /м(m) н(n)

Example of classification into 7 groups:
...

In the above examples, each of semi-consonant "й",hard consonant sign ""ъ";", and soft consonant sign ""ь "" may be addtionally included into a proper group. In the assignment of these groups to each button, some of the characters (e.g., e.g., й, ъ, ьand other characters) may not be marked on the keypad to make the keypad simple.

10 Russian vowels may be classified into 5 groups using the pairs of a hard vowel and a soft vowel. There are 10 vowel characters and 11 pronunciations of vowels but there are 5 basic phonemes of vowel, (a), (e), (i), (o), and (u). Among them, (e) and (o) only appear in an accented syllable. Thus, phonemes of vowels (e) and (o) may be regarded as strong vowels. Phonemes of vowels without an accent are the other 3. Thus, 5 vowels from 10 Russian vowels may be regarded as basic vowels, strong vowels may be classified into one group, and the other 3 basic vowels may be classified into another group or other groups. Because it is expected that consecutive appearance (e.g., strong vowel after strong vowel) of the same type of vowels is unusual and rare. For example, classification into 2 groups such as /a(a) °or 3 groups such as /a(a) o(o)/,/y(u) э(e)/,/я(i)/possible. For the entry of the vowels which have a pair relationship with basic vowels, RSM may be applied by regarding them as being classified into groups with each corresponding basic vowel, or CPM may be applied by regarding them as succession characters of each corresponding basic vowel.

CVSK may be configured properly (e.g., "5 groups of vowels and 7 groups of consonants", or "3 groups of vowels and 9 groups of consonants") using groups of consonants and groups of vowels. Several consonants appear consecutively (e.g., CCCVC . . . ) in Russian just like the case of English, but it is uncommon, and the typical structure of Russian syllables is the structure of alternative appearance (e.g., CV, CVCV, CVCVCV, . . . ) of consonants and vowels. This means that Russian words may be input without ambiguity (or with less ambiguity) in most cases by RSM in the CVSK.

6.13 Hindi Resctricted Input Method in CVSK

The prior document of the applicant, PCT/KR00/00601, shows the example of classifing Hindi consonants into 9 groups on the grounds of similarity of pronunciation, and this invention shows an example of 10 groups. The "group consonants" in Hindi which have a strong relationship of similarity of pronunciation may be classified into the same group. For example, the "group consonants" which have the pronunciations (k), (kh), (g), and (gh) in the above figure may be classified into the same group. This is also applicable for the other "group consonants" which have similar pronunciations. From among 35 Hindi consonants, 33 consonants excepting _(ud) and _(udh) which have "." at the button of the characters may be grouped into 9 groups or 8 groups. _(ud) and _(udh) may be regarded as affixed characters of _(d) and _(dh) respectively, and they may be classified into the group to which each of the corresponding basic consonants belongs.

Hindi vowels are as follows, and they are described in the prior document of the applicant.

---

Basic forms: a aa i ee u oo ae aae o au ri
अ आ इ ई उ ऊ ए ऐ ओ औ ऋ

Simplified forms: aa i ee u oo ae aae o au ri
None ा ि ी ु ू े ै ो ौ ृ

---

Hereinafter, expediently, the Hindi vowels are written as parenthesized English alphabet characters which represent pronunciation of a Hindi character with or without a left-sided underscore (on the underscore, it is regarded that there is a Hindi character which corresponds to its pronunciaion). Expediently, _(aa) is written as _(a-), _(ee) is written as _(i-), _ (oo) is written as (o-), _(ae) is written as (e), and _(aae) is written as (ai).

The vowel _(ri) may be regarded as a consonant according to some Hindi schoolbooks. 10 vowels excepting the vowel _ (ri) may be classified into 5 groups by pairs of Hindi vowels in above figure.

Single vowels in Hindi are separated into short sound vowels and long sound vowels. Short sound vowels are (a), _(i), _ (u), and long sound vowels are _(a-), _(i-), _(u-) in Hindi. The remaining 4 vowels are compound vowels which may be presented by the combination of single vowels. That is, _(e)= (a)+(i) or (a)+(i-), _(ai)=(a)+(e), _(o)=(a)+(u) or (a)+(u-), and _(au)=(a)+(o). Thus, basic vowels (a), (i), (u) may be classified into 3 groups, assigned to 3 buttons, and then the each of 3 basic vowels may be selected by 1 stroke of corresponding button and each of the 3 long sound vowels which corresponds to each of basic vowels may be selected by 2 strokes of the corresponding button, and the remaining 4 compound vowels may be input by the combination of basic vowels. The approach of input of compound vowels is similar to the that of Korean, for example,¹

For example, when _(a), _(i), and _(u) are assigned to the button [*], [0], and [#]respectively, the entries are given as "_(a-)=**", "e=*0 or *00". When "" buttons are pressed during the input of "0", the system temporarily recognizes "" as _(a-), but when "0" is pressed succesively, the system recognizes "0" as "(a)+(e)=_(ai)". Similarly, when "" buttons are pressed during input of "#", the system temporarily recognizes "" as _(a-), but when "#" is pressed succesively, the system recognizes "#" as "(a)+ (o)=_(au)".

This approach may be realized completely when the 10 Hindi vowels do not appear successively in a word. When the Hindi vowels appear successively, ambiguity may occur. For example, when "0" is input, the system maynot distinguish between "0=_(a)+_(i)" and "0=_(ai)". But even though Hindi words exist that include successive vowels, it is not common, so when input values may represent a compound vowel just like the case of "0=_(ai)", the "Hindi Restriction" in which the input values are recognized at first as a compound vowel is applicable. For implementation, the system may store the cases of a compound vowel which is composed of basic vowels, and the system recognizes a vowel by sensing strokes of vowel buttons. The system recognizes input values as a predefined compound vowel, when a vowel combination (e.g., "_(a)" and "_(i)" in this embodiment) which is regarded as an impossible vowel combination is recognized by the system.

In this example, if a user intends to input long sound vowel _(a-) and short sound vowel _(i), "Intentional Cancellation of Language Restriction (ICLR)" or "Delay Time for Cancellation of Language Restriction (DTCLR)" is useful. In the above example, "**" is pressed, Hindi restriction is temporarily cancelled by passage of a predefined time or by intentional activation of a word end function, and then "0" is pressed.

It is assumed that _(a) does not appear consecutively in a Hindi word because there exists _(a-). Even though _(a) rarely appears consecutively in a word, the "Hindi Restricted Input Method" in which "**" is recoginzed as "_(a-)" may be applied. For the successive input of "_(a)", ICLR or DTCLR" may be useful. For example, "*" is pressed, "word end" function is activated, and then "*" is pressed again.

RSM may be applied on the CVSK of Hindi for input of Hindi vowels on the assumption that vowels of the 10 Hindi vowels (or 11 Hindi vowels including the vowel "_(ri)") do not appear or rarely appear successively in a word.

For example, it is expected that same vowel from among 3 short sound vowels does not appear consecutively in a Hindi word, because 3 long sound s vowels which correspond to 3 short sound vowels respectively already exist. Thus, when vowels are classified into 3 groups and the 3 groups assigned to 3 buttons, 3 short sound vowels may be classified into 3 sonant appears after a consonant which ends without a vertical line, a symbol such as "\" is attatched beneath the first consonant and the 2 consonants form a combined consonant. In addition to these rules, there are some more rules and there are also irregular cases. When input of consecutive consonants is recoginzed (temporarily or with confirmation), i is easy to output a proper combined consonant because it is implemented in a commercial Hindi word processor.

English characters are usually marked on a keypad and are used for the input of English even in countries in which English is not the mother tongue. Hindi and English are official languages in India, thus it is natural to use a simple code and character input in which Hindi consonants and English consonants which have similar pronunciations may be grouped into the same group and assigned to the same button. The following is only an example, and various modificatioins are possible.

| Hindi Consonant | | | | Eng Consonant | Hindi Consonant | | | | | Eng Consonant |
|---|---|---|---|---|---|---|---|---|---|---|
| क(k) ख(kh) ग(g) घ(gh) | | | | GK | ङ(n) ञ(n) ण(n) न(n) म(m) | | | | | MN |
| च छ ज झ | | | | CJ | य(y) व(v) | | | | | YV |
| ट(t) ठ(tth) ड(d) ढ(dh) ड़(ud) ढ़(udh) | | | | DT | श(sh) ष(shh) स(s) | | | | | SZ |
| त(t') थ(th') द(th) ध(thh) | | | | H | र(r) ल(l) | | | | | RL |
| त(p) थ(f) द(b) ध(bh) | | | | BP | | | | | | | groups, each vowel of 3 long sound vowels may be classified into 3 groups and each group may be added to each corresponding group respectively, and the remaining 4 vowels (or the remaining 5 vowels including "_(ri)") may be also classifed into 3 groups properly and then each group may be added to each of the prior 3 groups of short sound vowels respectively. A short sound vowel, a long sound vowel, and (a) compound vowel(s) which are grouped into a group are set to be selected in a predefined order. When the selection order is set to be "short sound vowel-long sound vowel-(a) compound vowel(s)", the input method of (i.e., operation of a button for inputting) short sound vowel and long sound vowel is the same as the above method, and only the operation of buttons for inputting a compound vowel is different from the method described above. It is natural to input a short sound vowel and a long sound vowel with one stroke and two strokes of the corresponding button, respectively. The compound vowels are input by repeated strokes of the corresponding button.

Classification of vowels into groups, number of vowel groups, and selection order of vowels in each group is arbitrary. Even when a group of vowels is assigned to a button, it is not necessary to mark all vowels on the button. When Hindi vowels appear successively, ICLR or LRCDT may be applied.

A consonant and a vowel alternately appear in most Hindi syllable structures, but sometimes consonants appear successively. When a consonant appears after a consonant which ends with a vertical line, the vertical line is ommitted and the first consonant is combined with the second consonant and the 2 consonants forms a combined consonant. When a con- In the above example, it is relatively easy to determine Hindi characters corresponding to "g", and "k", and to configure CVSK for English in India. In the above example, the English consonants such as "z" and "w" may be grouped in a proper group additionally or separately, just like the case of Chinese. To simplify a keypad, not all characters of a group but only some characters of a group may be marked on the keypad (applying Hiding Control Processing Method). For example, when the first group in the above table is assigned to a button, only _(k) and _(g) or one of _(k) and (g) need be marked on the keypad. The selection order of assigned characters may be defined arbitrarily. The vowel _(ri) may be assigned to the button to which / R L / is assigned.

To simplify arrangement of letters on the keypad, only English vowels (English alphabet vowels) can be marked on the keypad. As described above, in case of Hindi vowels, it is natural to use only English vowels as Hindi vowels and English vowels are similar to each other in view of pronunciation. Furthermore, as shown in the Table for comparing Hindi consonants with English consonants, Hindi consonants corresponding to consonant groups of /GKI, /MN/, /DT/, /BP/, /RL/ . . . , which are similar to each other in view of pronunciation, are not represented but only English consonants are represented to more simplify the keypad. Also in case of that Hindi alphabets are omitted, like that Chinese romanization(pinyin) can be inputted without ambiguity in the Chinese restricted input mode, Hindi can be inputted without ambiguity in the Hindi restricted input mode according to Hindi restriction.

6.14 Language Restricted Input Method in Semi-Consonant Separated CVSK

Semi-consonants (i.e., semi-vowels) are not common in each language. Usually "w", "y", and "j" are semi-consonants in English. In other language, "j" is excluded from semi-consonants and "v" is included in semi-consonants. Generally "w" and "y" seem to be common semi-consonants in most languages.

Classifying semi-consonants into a separate group is substantially the same as classifying characters on the similarity of pronunciation, because semi-consonants have similar phonetic values and properties like vowels.

There are some English characters (e.g., in Spanish, "k" and "w" which are used only for foreign language) which are not used in a specific language, and there are some characters (e.g., affixed characters or additional characters in the applicant's document) which are not used in English. Probably, the English characters that are not used in a specific language are needed to input English, because English is universal. Thus, when the number of English characters which are not used in a specific language is not large, the characters may be grouped with semi-consonants and assigned to a button. Refer to 10-4 in Chinese.

The English characters that are not used in a specific language may be grouped in a group and assigned to a button.

6.15 Language Restricted Input Method in Incomplete CVSK

This invention shows that it is possible to remove or minimize ambiguity by configuring CVSK optimized in a specific language and applying RSM. CVSK also makes the algorithm of the system simplified. It is obvious that various modifications are possible. Thus, even though some consonants and vowels are grouped into the same group and assigned to the same button, it is only a modification of Language Restricted Input Method in CVSK. Expediently, the keypad is called "Incomplete CVSK" and the button on which consonants and vowels are assigned is called "Consonant-Vowel Mixed Button (CVMB)".

For example, the vowel "i" and the semi-consonant "y" may be grouped into the same group and assigned to a button, and the vowel and the consonant (in this example, semi-consonant) may be selected by a pre-defined order. The remaining buttons are separated into consonant buttons and vowel buttons. When "iy" and "yi" do not exist in Chinese, it is possible to input romanization (pinyin) of Chinese without ambiguity. In this example, it is assumend that "y" is selected by pressing the CVMB once and "i" is selected by pressing the CVMB twice. When this CVMB is pressed after a consonant button is pressed, a consonant of the previous consonant button is confirmed, thus the system also confirmins recognition of the input of the CVMB as "i" while not temporarily recognizing it as "y". Because the consonant "y" maynot appear after a consonant in Chinese, this Language Restriction is applicable.

For another example, the vowel "i" and consonant "j" may be grouped into a group, or vowel "i" and consonant "k" may be grouped into a group, and (Language Restricted) RSM may be applied. When " . . . ik . . . " or " . . . ki . . . " exists in romanizatoin (pinyin) of Chinese, ambiguity occurs. Assignment of (a) consonant(s) and (a) vowel(s) to a button without any special reason makes the algorithm of the system complex and lowers efficiency of the system. It is not better than applying Language Restricted RSM in a complete CVSK. But, for a special reason (e.g., to assign (a) consonant(s) to all of 10 numeral buttons), some buttons may be CVMB (Refer to the case of Korean).

Modification of FIG. 10-7 is possible. Refer to FIG. 10-9. It is applicable when there are one more CVMB and 2 or more consonants, and 2 or more vowels are assigned in the CVMB. Applying language restriction in Incomplete CVSK is a little more complex than applying language restriction in CVSK (Refer to the above example of "i" and "y"), and a detailed flowchart of a specific language may be more complex than FIG. 10-9 in order to present a combination rule of consonants and vowels in a specific language. FIG. 10-9 is a modification of FIG. 10-7 and generalities of an incomplete CVSK are presented in brief.

For instance, when Chinese romanization(pinyin) is entered on the standard English keypad of FIG. 5-1, vowels can be recognized without ambiguity as five vowels are assigned to different buttons. A consonant, which is represented next to "~vowel+n", can be recognized without ambiguity. In case of that "~vowel+n+m" is inputted in case of "~n+X" ('X' means initials indicated as English consonants), when vowels capable of being combined to vowel, "o", which are assigned to a button [6] together with the vowel, "o" (for instance, 'a') is entered, "a" and "o" can be instantaneously recognized as "~ao". However, as normal pinyin syllables are not ended to "m", the previously input value can be recognized as "·anm+vowel" with reference to a vowel recognized by the next input value. If "n+m=666" is inputted next to the vowel capable of being combined with "a", it can be processed not to "eo" but to "~enm~" using the language restriction in which "eo" combination is impossible (as '~emn~' is impossible in Chinese romanization(pinyin)).

When a consonant is inputted next to a syllable ended to "~vowel+ng", it may cause ambiguity. For instance, "~ngg~" can be recognized to "~nh~". In Chinese, the system can search all Chinese characters, which correspond to "~ngg~" and "nh~" from the Chinese index, and provide to the user. "~ngh+vowel~" can be recognized as "ni+vowel". If the next vowel cannot be combined to "i" (for example, 'u'), the input value may be recognized as "~nghu", but otherwise, the system can search and process all Chinese characters corresponding to "~ngh+vowel~" and "~ni+vowel". Moreover, the system can search all words, which correspond to an interpretation result capable of being made in case of that partial ambiguity occurs, and provide the user with the searched words.

In the standard English keypad of FIG. 1-1, when the Chinese restricted s RSM is applied and a Chinese romanization(pinyin) is inputted, "~ngh+vowel~" can be recognized as "~ni+vowel", and in this case, the system can search and process words corresponding to both two cases from the pinyin index. If the full codes (full codes by the RSM based on FIG. 1-1) are all stored in the pinyin index, like that the Chinese restricted RSM is applied, the system can search all words, which can be created by the input value, (for example, "~ngh+vowel" and "~ni+vowel") from the index and recognize the corresponding word.

For instance, in FIGS. 1-1 and 5-1, when the RSM is applied, "222" can be recognized as "aaa", "ab", "ba" and "c". Therefore, In FIGS. 1-1 and 5-1, "Beijing" is "22334445444664", and the successive numeral group can be recognized as a combination of a number of alphabets. The successive numeral group, "22~" can be interpreted as "aa" or "b". "~33~" can be interpreted as "dd" or "e". Therefore, "2233~" may be interpreted as "aadd~", "aae~", "bdd~" and "be~". If input values are added, also the number of possible combinations is increased in geometrical series. Expediently, the analyzable character combination to the input value is also called a "available character combination" or a "candidate character combination".

However, when "22~" is pressed, it can be interpreted as "aa~" or "b~". At this time, when the system recognizes that there are no more words, which have initials of "aa~", in the index with reference to the index, the system excludes the combinations of "aa~", and processes the input value of "22~" as "b~". It is similar to the case in which the input value of "22~" can be interpreted as "b~" using the Chinese restriction that Chinese romanization(pinyin) is not started from "aa~". Therefore, when "2233~" is pressed, the system searches words in connection with the two combinations of "bdd~" and "be~" from the index. After that, when the system recognizes that there are no more words, which have initials of "bdd~", the system processes only "be~" according to the next input values without regard to "bdd~". It is similar to the case in which the input value of "2233~" can be interpreted as "be~" using the Chinese restriction that Chinese romanization(pinyin) is not started from "bdd~". The input value of "22334~" can be interpreted as "beg~", and the input value of "223344~" can be interpreted as "begg~" or "beh~". At this time, the system processes the input s value of "223344~" as "beh~" the moment the system recognizes that there are no more words, which have initials of "begg~" in the pinyin index. It is similar to the use of the Chinese restricted input method (for example, "begg~" is not effective syllable, but only "beh~" is an effective syllable according to the construction rules of Chinese romanization(pinyin). When "4" is pressed additionally and the input value becomes "2233444~", it can be interpreted as "behg~" or "bei~". the system processes the input value of "2233444~" as "bei~" the moment the system recognizes that there are no more words, which have initials of "behg~" in the pinyin index. It is similar to the case in which the input value of "2233444~" can be interpreted as "bei~" as "behg~" is an impossible pinyin combination in the Chinese restricted input method.

In the system, which stores all words and full codes to be inputted, in "Beijing=22334445444664", the number of candidate character combinations is "2*2*4*1*4*2*1=128". Of course, to compare the 128 candidate character combinations with the index and process only the corresponding words are included in the category of the present invention. However, in the system, which can recognize the input value from the early input, a method of excluding character combinations (for example, 'aa~', 'bdd~', 'behg~', and so on), which do not exist in the indexes, according to increase of input values will be useful.

The system can search only the candidate character combinations, which exist in the indexes, of a number of the candidate character combinations created according to the successive increase of the same input values in the RSM. If all candidate character combinations by the input values do not exist in the indexes, the system regards the processes the input value as the appointed type simple code.

6.16 Applying Non-hiding Control Processing Method

In the CVSK, a button (in or out of a 3*4 keypad) may be designated as a control button, and a representative character may be selected by pressing a corresponding button once and the rest of the characters may be input by CPM. For example, in FIG. 10-6, "w", "y", and "v" which are assigned to the [0] button may be reassigned to other consonant buttons, and then the entries may be given as "p=b+0=10" (when control is set to be selected after a representative character) by using the [0] button as a control button. This is already explained in the prior document of the applicant.

7. Concurrent Input Method Based on Length of Input Value

The length of the short-cut code stored in the simple code index may be less than a predetermined number. In specific cases, the user or the system may designate the type of the short-cut code (e.g., type I (city name), type 2 (bank name), . . . ; and type 1 and type 2 are grouped in three-like structure according to the prior document). If the type of the short-cut code is designated as type 1 (city name) and the length of the short-cut code is less than 3, the system considers the input value as a full code the moment the length of the input value exceeds 3 in the CIM applying SIM as basic input mode. Contrarily, the system considers the input value as a simple code (or short-cut code) when the user enters three input values and activates the word end function (e.g., space) in the FIM-based CIM (CIM applying FIM as basic input mode).

This is particularly useful in the case where the length of the short-cut code of a specific type (city name - 北京company name - l, . . . ) is less than a predetermined value as in Chinese (In Korean or Chinese, nouns of a specific type usually comprise less than a predetermined number of syllables and the use of the syllable-based initial code as the short-cut code is natural. For example, most of Korean bank names consist of two syllables and the length of the syllable-based initial code for bank name is 2).

This is useful for the case where it is not necessary to determine at the beginning of the input whether the input value is a short-cut code or a full code, i.e., the case where the system can determine the input value as a simple code or a full code according to whether or not the length of the input value is greater than a predetermined value. Namely, the system has only to check on whether or not the length of the input value is greater than a predetermined length, without referring to the short-code index whenever an input value is entered. This simplifies the realization of the system and enhances the system performance.

8. Language Restricted Concurrent Input Method (CIM)

In the Language Restricted Concurrent Input Method, the system considers the input value as a simple code the moment the input value infringes the "word production rules" of a specific language (i.e., infringes language restriction) in the FIM-based CIM (CIM applying FIM as basic input mode). If it is judged that there is no concurring value with the input value in the simple code index, the system considers the input value as a full code again.

8.1 Language restricted Concurrent Input Method(CIM) using LRRSM as FIM 8.1.1 Chinese In particular, the syllable-based initial code of Chinese in FIGS. 10-1 to 10-4 has a numeral value of consonant buttons [1] to [9] (vowel "a", "o" or "e" are used alone sometimes to have a meaning of no more than an interjection and are actually rare, while vowels "i", "u" or "u" prefixed with "y", "w" or "y", respectively, are used alone). For a full code using the repeat selection method, one of buttons [*], [0] and [#] must be selected to enter a vowel as for the second or third input value in the examples of FIGS. 10-1 to 10-4. This provides a useful feature that determines whether or not the input value forms a full code at the beginning of the input, in the case of using the "Concurrent Input Method" as described in the example of Korean according to the prior document of the applicant.

For example, when the user enters "693 . . . =shk . . . " in the concurrent input method(e.g., FIM-based CIM) using the full input mode as a basic input mode, the system recognizes that the input value does not form a full code (because consonant "k" cannot appear next to "sh"), and considers the input value as a simple code, the moment the third value [3] is entered. When the user enters "112 . . . =pd . . . ", the system recognizes that the input value does not form a full code (because the input "11" is not considered as "bb" but as "p" in Chinese and the Roman alphabet consonant "d" or "t" appearing next to "p" does not form a Chinese syllable), and considers the input value as a simple code, the moment the third value [2] is entered. Likewise, when the user enters "7771 . . . =wb . . . ", the system considers the input value as a simple code the moment the fourth input value [1] is entered. In most cases, the system can determine whether the input value is a full code or a simple code, upon the user's entering the second or third input value.

If the user enters "14 . . . =bj . . . ", the system determines that the input value does not form effective Chinese syllables (because a combination of Roman alphabet consonants such as "bj" is not present among the finals in Chinese), and considers the input value as a simple code, the moment the second input value [4] is entered. Namely, the system can provide a word of "Beijing" or ""北京"" corresponding to the simple code "14" for the user. Without a simple code of "14" or "14 . . . " in the simple code index, the system considers the input value as a full code and provides "bj" for the user.

This is the same as the case of Korean using vowel elements (in FIG. 4-5). The full input method of FIG. 4-5 is not considered as the Korean restricted RSM. When the user enters "12" not forming effective Korean syllables in the FIM-based concurrent input method, the system considers the input value as a simple code and provides a word or a phrase corresponding to the simple code with reference to the simple code index. But when it is determined that there is no simple code corresponding to "12" in the simple code index, the system considers the input value as a full code and provides ""ㄱㄴ"" for the user.

For further understanding, it is seen that the simple codes are sorted in alphabetical order in the simple code index of FIGS. 5-4 and 10-5. But the arrangement of the simple codes stored in the system does not matter, and if necessary in searching the simple code index, the system may sort the simple codes and checks whether or not the input value is present in the simple code index.

In the Concurrent Input Method using the Short-cut Input Method as a basic input mode (SIM-based CIM), (supposing that the simple code index to be searched contains only syllable-based initial codes consisting of [1] to [9] in FIG. 10-1), the system considers the input value as a full code without searching the simple code index the moment the second value [*] of the input value "1* . . . " is entered. This is the same as in the case of Korean in FIG. 5-4.

In FIGS. 5-4 and 10-5, a Chinese romanization(pinyin)/Chinese character index and a simple code index are explained as only one index. However, as shown in FIG. 10-10, it is obvious that the Chinese romanization(pinyin)/Chinese character index(it is referred to as "pinyin index", and is an index storing "pinyin+pinyin corresponding Chinese characters" for searching Chinese characters corresponding to an inputted Pinyin) may exist, and the simple code/Pinyin index (it is referred to as "simple code index", and is an index storing "simple code+simple code corresponding pinyin+pinyin corresponding Chinese characters" or "simple code+simple code corresponding pinyin" also may exist.

As shown in FIGS. 5-4 and 10-5, not only the syllable-based initial code but also other type of simple code such as consonant associated simple code may be stroed in the simple code index, and it is possible to store different type simple codes together. Like the above, various indexes, such as a syllable-based initial code index, a consonant associated simple code index, a fully associated simple code index, can be made according to kinds of simple codes.

As shown in FIG. 10-10, it is assumed that ""北京"" has a syllable-based initial code of "14", a consonant associated simple code of "1473", and a fully associated simple code of "1*#4#73". When the Chinese restricted FIM-based CIM is applied to the keypad of FIG. 10-10, in case of the syllable-based initial code of "14" and the consonant associated simple code of "1473", the system regards the input value as a simple code the moment the second input value of "7" is pressed, and searches and processes the index. However, in case of that "Beijing" has the fully associated simple code of "1*#4#73", if the input value, "1*# . . . " is interpreted as a full code, it becomes "bai . . . ", and "1*#4" does not violate the construction rules of Chinese romanization(pinyin). However, "baiz . . ." (and "bail . . . ") is a Chinese romanization (pinyin), which does not exist in the pinyin index of FIG. 10-11 (as they can also become "baij . . . " according to the next input value). Therefore, the system interprets the input value as the full code according to the entry of input values one by one, and searches corresponding words and phrases with reference to the pinyin index whenever the input value is recognized to "b . . . => ba . . . => bai . . . =>baiz . . . ". As shown in FIG. 10-10, the corresponding Chinese romanization(pinyin) can be searched up to "bai~", but the system checks that there are no more words and phrases corresponding to the pinyin index the moment the input value is recognized to "baiz~" (and potentionally, "baij~") (see FIG. 10-10 (1)). Therefore, the input value of "1*#4 . . . " for "baiz~" is regarded as a simple code, and the system can search the corresponding word or phrase with reference to the simple code index (see FIGS. 10-11 (2)-(A) and (2)-(B)). If a word or a phrase corresponding to the input value of "1*#4# . . . " is not searched also in the simple code index, the system regards the input value as a full code, and processes it to "bai . . . ".

As index of all pinyin and Chinese characters (pinyin/Chinese character index) must be stored in the system in view of the property of Chinese, which is an ideograph, the system regards and processes the input value as a simple code the moment the input value does not exist in the pinyin/Chinese character index even though the input value is an effective pinyin syllable. That is, the system regards and processes the input value as a simple code the moment the system does not recognize that the input value is not any full code.

Figures 10, 11:
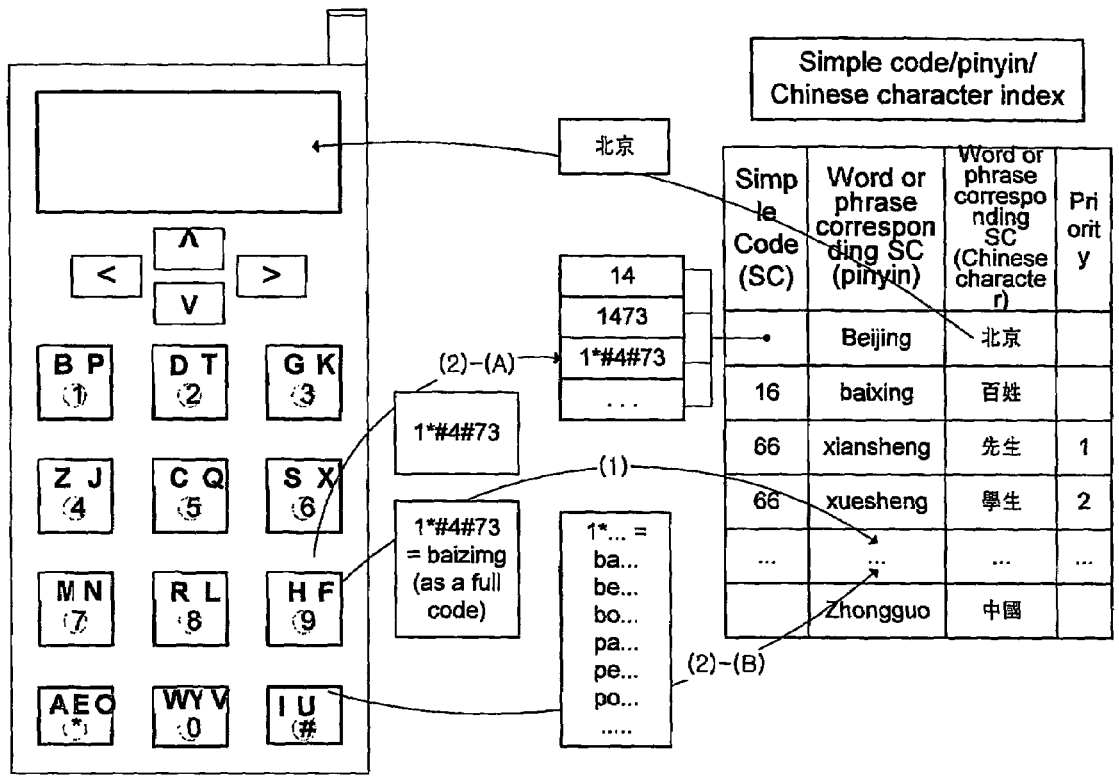
Figures 10, 11, 12:
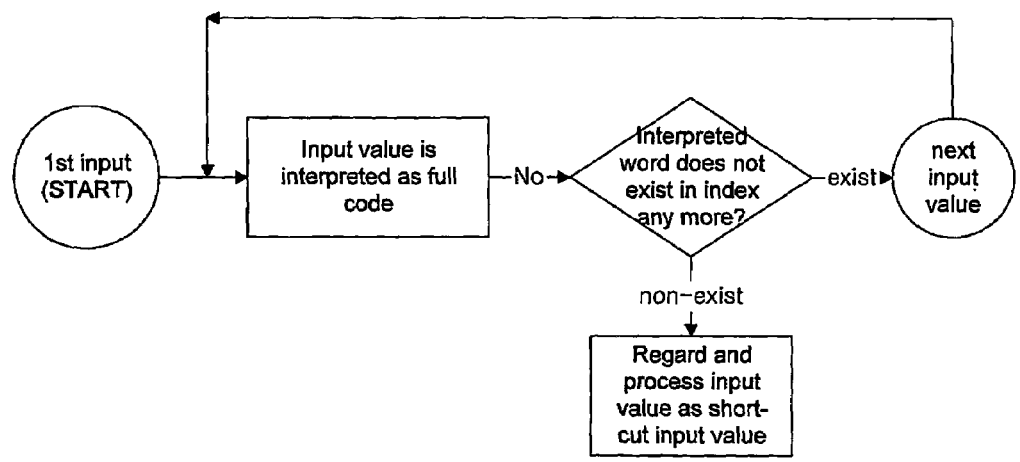

When simple codes of different types are stored in relation to the same word, as shown in FIG. 10-10 or 10-11, simple code index for one Chinese romanizatoin(pinyin) can be constructed with a form of multiple-catalogue. When the system regards and processes the input value as a simple code (namely, the input value is regarded and processed as a short-cut input), it is possible to select one of processes of FIGS. 10-11 (2)-(A) and (2)-(B). In the process of FIG. 10-11 (2)-(B), an index does not have a simple code. The process of FIG. 10-11 (2)-(B) is to search the corresponding Chinese romanization(pinyin) in comparison with pinyin combination and pinyin of the index, which can be made by the input value whenever each input value is entered. Number of available pinyin combinations is six(=2×3) (i.e., possible alphabet character combinations are six), when the syllable is pressed up to "1*", as two alphabets are assigned to a button [2] and three alphabets are assigned to a button [*]. Expediently, it is called "available (alphabet) character combination by simple code" or "available (alphabet) character combination". In FIG. 10-11, 12 combinations can be made when the syllable is pressed up to "1*#", and 24 combinations can be made when the syllable is pressed up to "1*#4" as two alphabets are assigned to a button [#]. However, in realizing the system, combinations besides "poi . . . " can be eliminated from regarded objects as a Chinese romanization(pinyin) starting as "poi . . . " does not actually exist in Chinese romanization (pinyin) dictionaries. That is, not only "poi . . . " but also "poiz . . . " and "poil . . . " which are the combinations next to "poi . . . " in connection with the input value of "1*#4" can be eliminated. Like the above, the system can search pinyin corresponding to the input value while eliminating combinations of the available character combinations, which do not exist in the index.

As shown in FIG. 10-11 (2)-(A), the index must have a simple code, but, they system can process even though irregularly defined simple code is used. The using of the process of FIG. 10-11 (2)-(B) requires a premise that the simple code may not be stored in the index, but a simple code having a regular rules (for instance, a fully associated simple code) is inputted, and the system is aware of an appointed simple code type (for instance, a fully associated simple code) beforehand.

In view of the property of Chinese, which must have indexes of all pinyin/Chinese characters, as shown in FIGS. 10-12 and 10-13, when a value interpreted as a full code does not exist in the index, it is possible to regard and process the input value as a simple code (namely, a short-cut input value). In application of the FIM-based CIM, FIG. 10-12 shows a processing, which can be generally applied in input of Chinese. Likewise, it can be applied also to the FIM-base CIM, which uses a syllable-based initial code or a consonant associated simple code. For instance, when a syllable-based initial code is inputted, the system interprets it in a full code and searches the pinyin index and the system can recognize that the input value does not exist in the pinyin index the moment the second or third input value is inputted in most of cases. FIG. 10-13 shows a processing for checking whether or not the input value is included in an effective pinyin syllable before the system searches the pinyin index using the linguistic property of the Chinese (i.e., Chinese restriction).

In not only the input system for Chinese but also the input system for other languages, when the system stores indexes of all words, as the processes of FIGS. 10-12 and 10-13, the system interprets the input value in a full code, checks whether or not the input value corresponds, and regards and processes the input value as a short-cut code whenever input values are inputted one by one.

8.1.2 English and Others

The system considers the input value as a simple code the moment it recognizes the fourth consonant of a word starting with "st~" or "sp~" and that it recognizes the third consonant of a word not starting with "st~" or "sp".

For example, when the user enters "467=gms . . . " using the simple repeat selection method on the keypad of FIG. 1-1, the system considers the input value as a simple code the moment the third input value [7] is entered, because the input value infringes the word production rules. If the simple code index contains the fully associated simple code "4678255" for "install", the system provides the word "install" corresponding to the simple code. If there is no simple code corresponding to "467 . . . " in the simple code index in the searching range, the system considers the input value as a full code again.

When the English restricted RSM is applied as FIM on the consonant-vowel separated keypad, as described above, the system can determine whether or not the input value infringes the English word production rules (e.g., there is no English word that contains three consonants from the beginning without starting with "st~" or "sp~"), thereby making the use of the concurrent input method more efficiently.

8.2 Language Restricted Concurrent Input Method using CPMERC as FIM

When the user enters the first character of each button in FIG. 1-1 as a representative character with one stroke of the corresponding button and the other characters using control processing (i.e., when the user applies CPMERC), the language restricted concurrent input method can be applied to consider the input value as a simple code considering that the input value infringes the above-mentioned word production rules in English.

For example, when the user enters the first character in FIG. 1-1 as a representative character and the other characters using control processing, the system considers the input value as a simple code as the input value infringes the word production rules in English the moment the third input value [7] of "467 . . . " for "gms . . . " is entered.

Likewise, the same is applied to languages other than English. The details are similar to case of the Language Restricted Concurrent Input Method (LRCIM) using RSM as FIM.

8.3 Overcoming Third Ambiguity in Language Restricted Concurrent Input Method

When the user enters the fully associated simple code "72673" of "scope", the system recognizes the simple code as a full code at the first stage and considers the input value as "72673 =pampd" that does not infringe the word production rules in English. So the system first considers the input value as a full code and secondly interprets it as a simple code to cause "third ambiguity" in which the input value is also interpreted as "scope" corresponding to the simple code.

In this case, the system first provides "pampd" for the user. But when the user intends to enter "scope", one stroke of a specific button (for instance, down-arrow button [v]) may choose "scope". If the word input ends after the input of "72673" (e.g., space is entered), the system provides the user with a list of "pampd" and "scope" and causes the user to choose either of "pampd" or "scope". Here, "pampd" results from the first interpretation of the input value and "scope" results from the second interpretation of the input value as a simple code.

The same is applied to the concurrent input method using CPMERC as FIM. Not only in the FIM-based CIM, but also in the SIM-based CIM, even though the input value is present in the simple code index at the point of "end of word" after entry of input value, if the input value considered as a full code does not infringe the language restriction (e.g., if the third ambiguity occurs), the system may cause the user to chose the target word or phrase (by repeatedly pressing a specific button or selecting from a given list).

The same is applied to languages (especially, the Japanese language using CPMERC) other than English.

To select one of a number of candidates, the user can select a target word or phrase of the candidates, which are outputted by the system, using a button of move buttons. It can be applied to all cases in which ambiguity occurs as well as cases in which the third ambiguity occurs.

9. CIM using the Text (or String) which Infringes Language Restriction

A client or a server can interpret an input value (full code or simple code). FIGS. 11-1 and 11-2 show the interpretation of an input value by the client or the server, respectively.

Namely, the simple conception of "system" means either the client system or the server system. When the input value is a simple code and the client system interprets the input value to send a word or a phrase corresponding to the simple code as a text to the server system, the server system uses the text to provide various services. Likewise, even when the input value is sent to the server system as a numeral and the server system interprets the numeral, the server system interprets the simple code and uses it for various services. The case where the client system sends a DTMF tone to the server system and the server system uses the transmitted input value is also one of the examples in which the client sends the numeral value to the server.

When an input value infringes the language restriction in the language restricted concurrent input method (i.e., the input value does not form effective syllables of a specific language), the system considers the input value as a simple code and the simple code index may not contain the simple code corresponding to the input value. In this case, the system considers the input value as a full code again. For example, when the user enters "7799" for ""삼성전자"" in FIG. 4-5 but the simple code index of the client system does not store "7799" or ""삼성전자"" corresponding to "7799", the system simply considers the input value as ""ㅅㅅㅈㅈ"". For example, when the client sends the input value "7799" or ""삼성전자"" corresponding to input value "7799" to the server in the stock information system, the stock information server interprets "7799" without any problem (it is supposed that the stock information server stores the simple code "7799" and its corresponding word ""삼성전자""). But when the client consider the input value "7799" as a simple code and the simple code index of the client system does not contain "7799", the client system secondly considers the input value as a full code and sends a text ""ㅅㅅㅈㅈ"" to the server. In this case, the stock information server cannot use the text.

If the text ""ㅅㅅㅈㅈ"" sent from the client is a meaningless value, the stock information server extracts "7799" used to entry of ""ㅅㅅㅈㅈ"" and searches for the corresponding word ""삼성전자"" and uses the searched word. In another method available only in this case where the syllable-based initial code is used as the simple code in Korean, the system searches for ""삼성전자"" that is in accord with word ""ㅅㅅㅈㅈ"" corresponding to the simple code in the first consonants of the syllables, to provide services. The syllable-based initial code of ""쌈썽쩐챠"" is also "7799". In this case, "7799" is interpreted as ""ㅅㅅㅈㅈ"" so that the system searches for words or phrases in which the first consonants of syllables are ""ㅆ"" for ""ㅅ"", and ""ㅉ"" or ""ㅊ"" for ""ㅈ"", as well as for words or phrases being identical in the first consonants of syllables to ""쌈썽쩐챠"". Namely, the system searches for a word or phrase in which the first consonants of syllables are identical to the characters assigned together with ""ㅅ"" (considering that the aspirated consonant and the tense consonant are implicitly assigned to a button for a basic consonant).

The same is applied to the PC environments using a keyboard other then a keypad. In the stock information system using the existing PC as a client system, for example, the user has to enter ""삼성전자"" in order to search for the stock price of ""삼성전자"". When the user enters ""ㅅㅅㅈㅈ"" and send the input value to the server, the stock information server system, recognizing that ""ㅅㅅㅈㅈ"" is not present as a listed company name, provides services using the two methods as described above (a method of extracting "7799" and searching for ""삼성전자"", or a method of searching for ""삼성전자"" that is identical in the first consonants of syllables ""ㅅㅅㅈㅈ"".

In another method, the server index stores ""삼성전자 (characters corresponding to simple code)" as well as "7799 (a simple code)" "and "삼성전자(a word corresponding to the simple code)" and the server determines that the input value ""ㅅㅅㅈㅈ"" from the client does not form effective Korean syllables, and then compares the input value with the stored characters corresponding to simple code. Thus the system can find out ""삼성전자"" as intended by the user.

The above content is illustrated in FIG. 11-3, where (A), (B) or (C) is selectively available.

In case where the client using the existing PC enters characters via a keyboard or the like (e.g., using the word processor of PC), the syllable-based initial code is used to enter the first consonants of syllables and the (client or server) system converts the syllable-based initial code to a target word, thereby making it possible to rapidly enter characters or to use them in various information systems. For example, when the user enters ""ㅅㅅㅈㅈ"" instead of ""삼성전자"", the system searches the index and provides the user with ""삼성전자"" that has ""ㅅㅅㅈㅈ"" as the first consonants of syllables. Another method as described above (extracting the simple code of the input value based on a specific keypad, searching the simple code index, and storing characters corresponding to simple code in the index) can also be applied. Refer to FIG. 11-5, where (A), (B) or (C) is selectively available.

It has been so far described that a commonly used word or phrase is registered and entered simply with a combination of special function buttons and numeral buttons irrespective of the connection with the word or phrase. For example, ""삼성전자"" is stored as a commonly used word and entered with "alt+1".

Likewise, the syllable-based initial code of ""四通集團 (satongjipdan: The applicant having no knowledge of Chinese pronunciations romanizes the Korean pronunciations of the word. But the same is applied to Chinese pronunciations)" is "6242" that corresponds to "s, t, j, d". When the user entering "6242", and "6242" and ""四通集團 (satongjipdan)" are not stored in the client system, the client system provides "sdzd" to the user. As the user sends "sdzd" to the server, the server considering that "sdzd" does not form effective Chinese syllables extracts "6242" from "sdzd" and searches for ""四通集團"" corresponding to the simple code (syllable-based initial code, in this example) "6242" (it is supposed that the server system stores the simple code and the word or phrase corresponding to the simple code).

As in the case of Korean where the system searches for a word identical in the first consonants of syllables to ""ㅅㅅㅈㅈ"" and the characters assigned together with the individual consonants, the system provides the user with a word identical in the first consonants of syllables to "sdzd" and other variable combinations of consonant (e.g., sixteen combinations including "xdjd", "stjt", "sdjt" and so on) in FIG. 10-2.

The character set "sdzd" corresponding to the simple code is stored in the server system, and "sdzd" from the client does not form effective Chinese syllables. Thus the system compares the input value with the characters corresponding to simple code in the index and finds out that the user intended to enter ""四通集團".".

The above content is illustrated in FIG. 11-4, where (A), (B), or (C) is selectively available.

The processes of FIGS. 11-3 and 11-4 can be achieved in the server or the client terminal.

Not only the device having the keypad but also Information communication device such as a PC also searches for a word (""四通集團"") identical in the first consonants of syllables in romanization to the input value "stjd" entered by the user, and provides the word to the user. Alternatively, upon the user entering "stjd", the system (i.e., PC) registers the simple code (characters corresponding to simple code) as the first consonants of the individual syllables "stjd" and, upon the user entering the second consonant, considers the input value as a shortcut input value (considering the user performs a short-cut input) because the input value infringes the Chinese language restriction (two Roman alphabet consonants other than sh, ch, or zh appear). Extraction of the simple code (e.g., 6242) from the input value "stjd" can be performed with a negotiated keypad (e.g., FIG. 10-2). Refer to FIG. 11-6, where (A), (B) or (C) is selectively available.

FIG. 11-6(B) is to compare a word, which is created by the input value and does not create effective pinyin syllables (for example, "stjd" as "a syllable-based initial value") with the first character ("sa-tong-jip-dan=>stjd") of each syllable of words and phrases stored in the index and to search the corresponding word or phrase. It means that the syllable-based initial value is used as the short-cut input value. In the keypad of FIG. 10-1~FIG. 10-6, a syllable-based initial value corresponding to "stjd " is "622442". As you can see from the drawing, FIG. 11-6(B) can be realized only by having a pinyin index for inputting Chinese characters without a simple code index. Likewise, when "Consonant-based input values" are entered, the system can interpret a word or a phrase, by comparing a text produced by the input values with the consonants of a word in the pinyin index.

In a word, similarly to the sorts of the simple code, the input value for short-cut input, which can be recognized regularly, is sorted to "a syllable-based initial value" (for instance, "Beijing" has a syllable-based initial value of "144=bj"), "a consonant-based initial value" (, "Beijing" has a consonant-based initial value of "144773=bjng"), "an initial vowel+ syllable-based initial value", "a word-based initial value", and so on. The system regards and processes the input value as a short-cut input value the moment the input value violates the language restriction.

The sorts of the "short-cut input value" are shown in a Table of FIG. 11-11. In FIG. 11-11, a short-cut input value (A) includes from (B) to (L), and it shows shorts of the short-cut input values, which can be recognized by the system according to the regular rules. The sorts of the short-cut input values also include a partially associated simple code associated to partial alphabets and a short-cut input value having only partial alphabets. As you can see, "full input value" (Z) can be a full code of a FIM.

As described above, it is obvious that also the using of a short-cut input value, which is not presented in the present invention is included in the CIM category of the present invention as the key point of the CIM is that the system regards and processes the input value as a short-cut input value (that is, the system regards and processes that the input value Is not the full code of the appointed FIM) if the input value satisfies any condition (for instance, in case of that the input value violates the construction rules of the full code, or that the input value does not form an effective syllable of a special language). In the table of FIG. 11-11, the short-cut input values of (H) to (L) can be used not only in a device having a keypad but also in a device such as a PC, as shown in FIGS. 11-5 and 11-6. FIG. 114(B) shows an example that "syllable-based initial value" is used as a short-cut input value. The terms of "simple code" or "short-cut code" is used as the terms, which commonly designates the short-cut input value, and the short-cut input values of (H) to (L) are simple codes in a comprehensive meaning. That is, in FIG. 11-11, "a syllable-based initial value" of (I) can be called "a syllable-based initial value simple code", and also the short-cut values of (H) to (L) can be called in the same way.

In FIG. 10-1~FIG. 10-6, when a syllable-based initial value of "14=bz" is inputted, the system searches a word or a phrase having consonants of each syllable corresponding to "bz" from the index. Here, when "4" is inputted additionally for "144=bj", the system searches a word or a phrase having an initial consonant of each syllable corresponding to "bj" (for instance, "Beijing").

The present invention can analyze an arbitrary short-cut input value as short-cut input values of various kinds when the arbitrary short-cut input value of the previously presented short-cut input values is inputted. For instance, the system first regards and processes a certain short-cut input value as a predetermined short-cut input value (for example, a syllable-based initial value), second regards and processes as other short-cut input value (for example, a consonant-based input value), third regards and processes as another short-cut input value, and then, can analyze the one short-cut input value as short-cut input values of various kinds. Based on FIG. 10-1~FIG. 10-6, when a short-cut input value of "144=bj" is inputted, the system first searches a word or a phrase having an initial character of each syllable corresponding to "bj" (for example, "Beijing"), and then, second searches a word or a phrase having the consonant corresponding to the word or phrase stored in the index (regardless of existence of first result).

It shows that the system can analyze even though the user inputs any short-cut value presented in FIG. 11-11. If the above is applied, one short-cut input value may have a number of search results, and the priority order outputted can be applied according to the type of the applied short-cut input value. For instance, preferentially, words or phrases interpreted and searched as the syllable-based initial value are outputted, and then, words or phrases interpreted and searched as the consonant-based input value are outputted. If a user mainly uses the syllable-based initial value as the short-cut input value, it is preferable to first output words or phrases interpreted by the syllable-based initial value. Therefore, it is preferable that the user designates the priority order according to the types of the short-cut input values. Furthermore, if a user wants to use only consonant-based initial values, it is preferable to set the system to analyze the short-cut input values only as the consonant-based initial values. As described above, the order of output priority of words or phrases obtained by interpreting as the same type short-cut input value can be determined by various factors, such as frequency of use. The outputted priority order can be determined according to frequency of use of each interpreted and searched word or phrase regardless of the type of the short-cut input applied to the interpretation of the short-cut input value.

In case of "jinzhi (禁止) and zhuijian (逐o), they have syllable-based initial values of "jz" and "zj" respectively, and the syllable-based initial values are all "444". In this case, when the FIM-based CIM is applied, the system can recognize that the input value does not form a pinyin syllable the moment the third input value of "4" is inputted. Based on FIG. 10-1~FIG. 10-6, all possible words or phrases can be searched if the syllable-based initial values are different alphabets assigned to the same button. That is, words or phrases having syllables corresponding to "jz" and "zj" are all searched in connection with the short-cut input value of "444".

Likewise, also when SIM-based CIM is applied, the system can regard and process the input value as the short-cut input value of FIG. 11-11(B) to (L). Moreover, it is possible that the input value is first regarded and processed as a syllable-based initial value, second regarded and processed as a syllable-based initial code, third regarded and processed as a consonant-based initial value, and then, processed as other shortcut input value in the same way. The system regards and processes the input value as a full code the moment it checks that there is no corresponding word in the index after processing the input value as the short-cut input value. It is preferable to allow the user to previously designate a kind of a short-cut input value, which the user mainly uses.

In case of "jinzhi (禁止)" and "zhuijian (逐o)", to solve the problems caused when the syllable-based initial value is used, a syllable-based initial value simple code and a syllable-based initial code of retroflex can be made as follows. The retroflexes, "ch", "sh" and "zh", in Chinese are actually single initials, and indicated with only one sign as a tonic sign, but indicated in combination of two alphabets when being written in English. Therefore, also the syllable-based initial value simple code of zhuijian of FIG. 10-6 includes "h", and inputted with "4944" corresponding to "zh+j". The syllable-based initial code is "494" corresponding to "zh+j". in the keypad of FIG. 10-1~FIG. 10-6, ambiguity occurring when the both syllable-based initial value simple codes of "jinzhi (禁止) and zhuijian ("逐o") are "444" is avoidable, as the initial alphabets, "c", "s" and "z" of the retroflexes, "ch", "sh" and "zh" are assigned to a button different from the button, to which the second alphabet, "h" is assigned.

In the FIM-based CIM using the syllable-based initial value simple code as the short-cut input value, the system recognizes the input value "4~" as "z~", and the input value "49~" as "zh~". However, there is little meaning even though the system outputs the corresponding words or phrases to the user terminal after processing the input value "49~" as "zh~", as there are lots of words having the initial of "zh~". Therefore, the system can analyze the input value of "49" as the syllable-based initial value simple code, and output words or phrases, which have a syllable structure of "z_h_" (the underline parts are positions for locating vowels). If "49" is interpreted only as "zh", it is difficult to shortly input words, which have the syllable-based initial value of "z_h_". As most Chinese words includes one or two syllables(letters), it is useful to shortly input the retroflex for short-cut input of the words having two syllables. Refer to FIG. 10-17. In FIG. 10-17, [ . . . ] faintly indicated next to [在乎] on the display means that other words of the post order are output if there are lots of words of "z_h_". Of course, words of "zh_" can be outputted in post-order, and the system can be set to first output the words of "zh_" according to the user's taste. Generally, it is convenient to set the system to first output the words of "z_h_".

When a vowel input after "49" is recognized (for example, the vowel button is pressed), the system processes the input value as "zh_" (that is, processes the input value as a full code). When a consonant input after "49" is recognized (for example, the consonant button is pressed), the system processes the input value as "zh_X_" (the capital letter 'X' is an English consonant for representing an arbitrary initial). That is, also in the FIM-based CIM, the system first interprets the input of retroflexes of "ch", "sh" and "zh" as a simple code (e.g., a syllable-based initial value simple code or a syllable-based initial code), and then, interprets it as a full code or a simple code according to whether the next input value is a vowel or a consonant.

The above has a similar result to that a consonant-based initial value simple code is regarded as a short-cut input value and the shortcut FIM-based CIM is applied. The consonant-based initial value simple code is regarded as the short-cut input value and the short-cut FIM-based CIM is applied, but the input value is regarded and processed as the short-cut input value (words corresponding to the word, which has the initial of "z_h_" (other retroflexes of 'ch' and 'sh' are also in the same way), are searched) when the retroflex is inputted in a word-starting condition (after pressing of a "OK" or "enter" button or completion of an appointed type word in the input system).

The above is described based on FIG. 10-1~FIG. 10-6, but it is obvious that the above concept can be applied to other keypads.

The same is applied to any other modified character set (there can be various types of character sets realized on the screen) as well as the PC keyboard or the keypad.

10. CIM Using Available Character Combination by Simple Code

In the case of using a syllable-based initial code as a simple code in the above-stated method, a comparison between the simple code with the first consonants of the individual syllables can be usefully applied to the case where the client does not have an index of simple codes (e.g., "6242", "satongjipdan" and "四通集團")" but an index of specific words or phrases (e.g., "satongjipdan" and "四通集團")."). For example, upon the user selecting the second button [2] of "62 . . . ", the system recognizes that the input value infringes the Chinese language restriction, and searches for a word of the index identical in the first consonants of the individual syllables to the input value "62 . . . =sd . . . , st . . . , xd . . . , xt . . . (expediently, referred to as "available alphabet character combinations"). As the number of strokes of the button increases, the number of available alphabet character combinations increases. The available alphabet character combinations are used for comparison/searching of the words from the index. Refer to FIG. 11-7. In the index of FIG. 11-7, the system retains a multiple catalog (2\*\*4=16, 16 are possible) of "stjp", "sd . . . ", "xd . . . ", "xt . . . " etc in the row (i.e., record) of ""四通集國";", and then the system provides ""四通集國""corresponding to "sd . . . " by comparing "sd . . . " and values in the multiple catalog. The concept is the same, but it is not recommended. Refer to FIG. 11-9. Both method includes the comparison of available character combination capable of being presented by input values with words or phrases(Chinese romanization(pinyin) in FIG. 11-9) of an index.

Likewise, supposing that the client does not have an index of simple codes (e.g., "7799" and ""삼성전자기"") but an index of specific words or phrase (e.g., ""삼성전자기"") and that the user enters "77 . . . " for ""삼성전자기".". Upon the user selecting the second button [7], the system recognizes that the input value infringes the Korean language restriction, and searches for a word of the index identical in the first consonants of the individual syllables to the input value "77 . . . =入入 . . . , 入从. . . , 从入. . . , 从从. . . (expediently, referred to as "available alphabet character combinations"). Refer to FIG. 11-8.

Without a word identical to the input value in the index, the system considers the input value as a full code and provides it. This has the same effect as the concurrent input method on the system having an index of words instead of an index of simple codes, only when the user enters a syllable-based initial code. This method is also the same in the procedure of the system's recognizing that the input value infringes the full code production rule in the FIM-based Concurrent Input Method, or the language restriction in the FIM-based Language Restricted Concurrent Input Method, but different in the procedure of searching for a word or phrase corresponding to the input value. Namely, upon recognizing that the input value infringes the full code production rule or the language restriction, the system considers the input value as not to be a full code and interprets (or searches for) a word corresponding to the input value for the user, without using a simple code, considering that the input value is the syllable-based initial code.

It is the point of the concurrent input method that the system automatically recognizes that the input value infringes the full code production rule or the language restriction, and considers the input value as a simple code (i.e., considering that the user performs short-cut input rather than full input). Thus this is a modification of the above-described concurrent input method in regard to the step of searching for a word corresponding to the input value in a specified case (using a syllable-based initial code).

Like the syllable-based initial code, in case of that a simple code can be automatically extracted as having regularity as in the fully associated simple code, the consonant-associated simple code, and the initial vowel+consonant-associated simple code, it is possible to search a target word from the index by comparing the "available character combination" of the input value with the word of the index. In FIG. 10-11, the system can search the target word by comparing the "available character combination" of the input value with the Chinese romanization(pinyin) after regarding the input value as a short-cut input value the moment the system recognizes that there is no Chinese romanization(pinyin) interpreted as a full code in the pinyin index after interpreting the input value as the full code whenever input values are inputted one by one. The above is shown in FIG. 11-10, and FIG. 11-10 represents a part of FIG. 10-11 ((2)-(B) part) and shows a case that the fully associated simple code is used.

11. FIM and CIM in an Input System Storing a Full Code

The prior document describes that it is somewhat difficult to discriminate a correct word to the input value on a specific keypad using a specific language restricted FIM (for example, English input and pinyin input on a standard English keypad by the RSM). As described in the description of Chinese, if the system has indexes of all words, the input value is first interpreted as a full code, and second interpreted as a simple code of an appointed type if the input value does not exist in the index. It can be applicable not only to Chinese but also to all languages.

Hereinafter, expediently, Chinese will be described. As shown in FIG. 10-14, if the system storing all Chinese Romanization(pinyin) (all words in case of other languages) stores all full code, the system can simply search words or phrases corresponding to the input value, and recognize a target alphabet. If the FIM-based CIM is applied, the system regards and processes the input value as the simple code of the appointed type the moment the system recognizes that there are no more corresponding full code in the index. A process for inputting " "北京"" of FIG. 10-14 shows a process for interpreting and processing the input value as a full code. Just as the full code is stored in the index, the full code is interpreted through search of the index.

If the FIM according to the language restricted input method, which can discriminate words without ambiguity, is applied, it is not useful to store the full code in the index. However, it is useful in case of that the FIM such as the RSM, which may cause ambiguity, is applied, and all target words are stroed in index. As described in the description of "Language Restricted Input Method in Incomplete CVSK", if all words intended by the user to be inputted are stored in the index when the FIM, which may cause ambiguity, is applied (it can be applied to other languages as well as Chinese), the input value can be processed using the full code index.

It is obvious that the above can be applied to other languages besides Chinese. Additionally, the above can be applied not only to the keypad of FIG. 1-1 but also the keypad of FIG. 10-1~FIG. 10-6 or other keypads.

12. CIM for Simultaneously Processing Input Values as Various Type Codes (i.e., Various Types of Input Values)

CIM for simultaneously recognizing an input value as various type codes

The CIM for regarding and processing input values as predetermined type codes (input values) is possible. For instance, In FIG. 10-14, if an input value is regarded and processed as a full code(A) and a fully associated simple code(B) at the same time, the system can recognize "bai" interpreted as the full code and "bei" interpreted as the fully associated simple code in connection with the input value "1*#". In this case, the system can provide the user with "bai" and "bei" at the same time.

There is a difference in that the system outputs only "bei" when interpreting the input value "1#" as the full code adopting the FIM-based CIM but outputs only "bai" when interpreting the input value "1*#" as the appointed short-cut code adopting the SIM-based CIM. Also, in such CIM, the system can regard and process the input value as only a different type code the moment the system recognizes that there are no more input values existing in a special type code. As the result, it is included in the category of the above CIM. It is not necessary to store the full code and the fully associated simple code in the indexes of the system as shown in FIG. 10-14, and the input value can be interpreted as various type codes at the same time.

13. Priority Order of Words, When Ambiguity Occurs

In a specific input method (for example, a full input method, or a specific type short-cut input method), If the same input values cause ambiguity, as shown in FIG. 10-14 and other drawings, the system can output a target word according to the input order on the basis of the priority order in case of that ambiguity occurs when a specific input method is applied. For instance, in FIG. 10-14, in case of that ambiguity occurs when the full input method is applied. the system outputs a target word according to a "priority order (A)" between full codes(A) and recommend the target word to the user.

Next, interpretation of an input value as various type codes will be described. As described above, in FIG. 10-14, if the input value of "1*#" is interpreted as a full code, it is interpreted as "bai", and if interpreted as a fully associated simple code, it is interpreted as "bei". Like the above, when ambiguity occurs by interpreting the input value as different type codes, the system can provide a target word to the user according to the priority order "(A)+(B) priority" (i.e., the priority that input value is regarded as (A) and (B) simultaneously) in FIG. 10-14.

For instance, in the CIM that the input value is first regarded and processed as a full code, but second regarded and processed as a syllable-based initial code and a syllable-based initial value simple code the moment the full code construction rules are violated, the syllable construction rules of a special language are violated, or the system recognizes that there are no more corresponding full codes in the index, when the input value is regarded and processed as a short-cut code, the input value can be processed based on the priority order made when ambiguity occurs between the "syllable-based initial code" and the "syllable-based initial value simple code" (namely, if the syllable-based initial code is (C) and the syllable-based initial value simple code is (D), the target word is outputted according to the priority order of "(C)+(D) priority").

Chinese is described in the above, but it is obvious that other languages can be applied in the same way if the target word is not Chinese characters but Chinese romanization (pinyin).

14. CIM Adopting the CPM(Control Processing Method) as the FIM(Full Input Method)

As shown in FIGS. 2-1 and 2-2, in case of that control buttons are a button [*] and a button [#] and the CPMERC (Control Processing Method Except Representative Character) is applied, the CIM is applied, and if all words including only representative characters in the index and the SIM-based CIM is applied, the system can regard and process the input value as a full code the moment "*" or "#" is pressed as the input value.

In case of Japanese of FIGS. 2-1 and 2-2, it is assumed that all short-cut codes have only numeral values. In this case, the system stores all words, which have only the representative characters in the index (it can be included in the shortcut code index or formed in separation from the short-cut code index), and the CIM is applied. At this time, the system can provide the user with the result that the input value is interpreted as a full code and the result that the input value is interpreted as a short-cut code with reference to the index of words, which have only representative characters, (or the simple code index including the words, which have only representative characters) as target words according to a predetermined priority order.

For instance, in FIGS. 2-1 and 2-2, if an input value of "111" is processed as a full code (namely, if the FIM-based CIM is applied), it is interpreted as ""あああ".". If words starting from ""ああ~"" does not exist with reference to the index of all words including only the representative characters, but only ""あい"" or ""あい~"" exists, the system can provide the user with ""あい"or ""あい~"" in priority to ""ああ~".".

Refer to FIGS. 10-15 and 10-16. In FIG. 10-15, the input value of "11" is interpreted as the full code, but the system searches the "index of all words including only representative characters" and checks whether or not the word is effective as the word includes only the representative characters. Here, if ""ああ"" obtained by interpreting "11" as the full code exists in the index, the system recognizes the input value as an effective word. The system recognizes ""あい"" corresponding to the input value by interpreting the input value as a simple code again the moment the system checks that there are no more words corresponding to the input value in the index of all words, which include only representative characters. In FIG. 10-15, the system recognizes ""あい"" as the very best word in connection with the input value of "11". As ""あい..."..."("..." means characters added to ""あい")") may represented according to succession input values of "11", the system can output it in the next order of ""あい".". Likewise, as the target word may be ""ああ"" even though it does not exist in the index, it can be also outputted in the next order of ""あい".". In FIG. 10-15, ,"あい..."..." and ""ああ"" are indicated with a blur color and in the second and third recommendation orders. It means that the system can output the input word as ""あい..."" or ""ああ";", or output only ""あい".".

In FIG. 10-15, (1), (2) and (3) may occur in order, or simultaneously occur as described in the description of the "CIM for simultaneously processing an input value as various type codes". Likewise, the full code and the simple code indicated in the index are to help your understanding. It is obvious that the same process can be carried out even though the full code and the simple code are not stored in the index (if the simple code can be interpreted regularly like the syllable-based initial code or the fully associated simple code). As shown in FIG. 10-16, a case in which the index of all words including only representative characters and the simple code index exist in one index is also identical with the above. The data structure in embodiment may have various types.

An operation result of the system is similar to the SIM-based CIM described above. At this time, not the SIM-based CIM but the FIM-based CIM or the general CIM is applied.

It can be applied in the same way not only to the CIM adopting the CPMERC as the FIM but also to all CIMs adopting the CPM as the FIM.

15. Chinese Transition (Chinese Shift)

Korean characters or Roman characters for romanization of Chinese and Chinese character are in a one-to-multiple ratio. For example, there are so many Chinese characters (e.g., 禮意, 禮儀, 銳意 .... . . ) that correspond to Korean ""예의".".

For the Chinese language, the Chinese characters corresponding to "beijing" includes 北京, 背景 or the like. Thus the "Succession Characters in Chinese" are selected with multiple strokes of the Chinese transition button (e.g., 北京($2^{nd}$), 背景($3^{rd}$)). For example, after entering "beijing", one stroke of the Chinese transition button selects ""北京"" and then one more stroke of the Chinese transition button selects ""背景";". Alternatively, the user may select the Chinese characters from a given list.

For the Chinese language, an index has to store all the Chinese characters to be entered (expediently, referred to as "target Chinese characters"). Thus the target Chinese character confirmed by system can be provided for the user even in the course of entering Roman characters for romanization of Chinese. For example, when there is no word but "北京"that starts with "beij ... ", the system provides ""北京"" for the user the moment the user enters "beij". If only one "beijing (=北京)" exists in the pinyin index, the system can convert and output "beijing" into ""北京"" the moment the system conclusively recognizes "beijing" even though the user does not decide a target Chinese character during inputting.

For the Japanese language, Hiragana and Katakana are in a one-to-one ratio, and Hiragana or Katakana and Chinese character are in a one-to-multiple ratio. As described previously, a selection of Katakana transition control (e.g., ""あ/ア"" control in FIG. 2-1) after the input of Hiragana may convert Hiragana mode to Katakana mode. In FIG. 2-1, an affixed character is entered using the cross control processing method and ""あ/ア"" control is selected with two strokes of button [0]. The Chinese characters corresponding to Hiragana or Katakana can be selected with multiple strokes of button [0]. For example, when the ""あ/ア"" control is set to be selected after representative character, [0]+[0] after the input of a Hiragana word (or character) converts the input to Katakana corresponding to the input Hiragana and one more stroke of button [0] converts Katakana to Chinese character. Contrarily, [0]+[0] after the input of Katakana in the Katakana mode converts the Katakana to the corresponding Hiragana and another stroke of button [0] converts the Hiragana to Chinese character.

16. Construction of Index of Simple Code

The simple code proposed by the applicant, "Fully Associated Simple Code", "Syllable Based Initial Code", "Consonant Associated Simple Code", "First Vowel+Consonant Associated Simple Code", and "Word Based Initial Code" may be extracted mechanically (i.e., automatically) from a word or a phrase. Thus, the system constructs an index of simple code automatically for the words which are input using Full Input Method (FIM), and the index of simple code may be used for CIM. In the enviroment like FIG. 5-5, the index of simple code may be strored in the client side or server side, or may be stored in the client and server side.

Various kinds of simple code (e.g., "Fully Associated Simple Code" and "Initial Based Initial Code") may be generated for the same word. It may be generally convenient for a user to use a specific kind of simple code, so it is needed for the user to know the kind of simple code. It is beneficial for the automatic construction of the index of simple code that the more words the user inputs, the richer the index of simple code is.

To extract Syllable Based Initial Code from a specific word of a specific language, the system should separate syllables from the words. It is possible to separate syllables from words according to the syllable separation rule of a specific language. It is easy to separate syllables from a word, because there are syllable separation rules in specific languages, so this is not described in detail.

For instance, "zhongguo" of Chinese romanization(pinyin) can be syllabically separated into "zhong" and "guo" from the vowel "o" and "uo", and it can be carried out more easily than the Chinese romanization(pinyin) recognizing process of the present invention. In separation of a syllable by a forward scanning from the front of a word, for example, the system can recognize that the consonant of "n" next to "zho" belongs to the first syllable as the succession consonant is "g". Likewise, the system can recognize that the first "g" belongs to the first syllable and the second "g" belongs to the next syllable as "g" is added next to the first "g" (a syllable can be ended to "~ng" in Chinese romanization(pinyin)). The first syllable "zhong" can be separated by scanning to "zhongg". The system can recognize that "u" is a vowel, which belongs to the second syllable, and successively indicated "o", is, also a vowel, which belongs to the second syllable (in Chinese romanization(pinyin), English vowel of "uo" can be indicated successively). The system can separate the syllable of "zhongguo" into "zhong" and "guo" as there is no more character next to "o", and recognize that the syllable-based initial code of "zhongguo" is "43". Of course, the system can automatically separate syllables of a specific word or phrase according to the syllable separation rules of the corresponding language in also case of other languages.

17. Interpretation of a Target Word or Phrase from a Word or Phrase without Special Symbol (e.g., affix)

When a tone symbol is not affixed on the vowel, "beijing" corresponds to ""北京"" and "背景", and in this case, a target word or phrase may be selected by pressing a predefined button repeatedly or it may be selected from the list by a user.

Likewise, in a language as well as Chinese, when only (a) basic vowel(s) in a word is/are input without a sound tone symbol or an affix, the system recognizes a target word or phrase by sensing repeated pressing of a predefined button. Or the system searches an index and provide a user with a list which includes corresponding words or phrases with affixes, and then the system recognizes a target word or phrase by sensing selection from the list.

This is useful when there are many affixed characters and tone symbols like in Vietnamese. However, the system must maintain the index which retains words or phrases with affixes. Likewise, the index which retains words or phrases with affixes may be constructed from the user's inputs. For example, when a word "^+abc ('^' is affixed on 'a')" is input, the system stores "^+abc" (the system stores both "abc" and "^+abc" which corresponds "abc"). When "abc" is input and then a predefined button is pressed, the system provides a user with "^+abc", or the system provides a user with the list which includes "abc", "^+abc", and other words which corresponds to "abc". When the word "abc" is a target word, the user will not press a predefined button, or select "abc" when the list is provided. The list may be provided to a user at any point of time, for example at the end of input of a word or during input of a word.

18. Concurrent Input Method for Inputting Word or Phrase by Full Input Method in Part and by Shortcut Input Method in Part A method for outputting words corresponding to the input of word(pull cord input) from the index and allowing the user to select the target word has been used widely. For instance, there is an "auto-completion" function of a Microsoft windows. Of course, even in case of the full input(entered in full code), the corresponding syllables (words or phrases) are output from syllables (words or phrases) stored in the index (for example, index for concurrent input) and the user can select the target word or phrase.

Figures 10, 11, 12, 13:
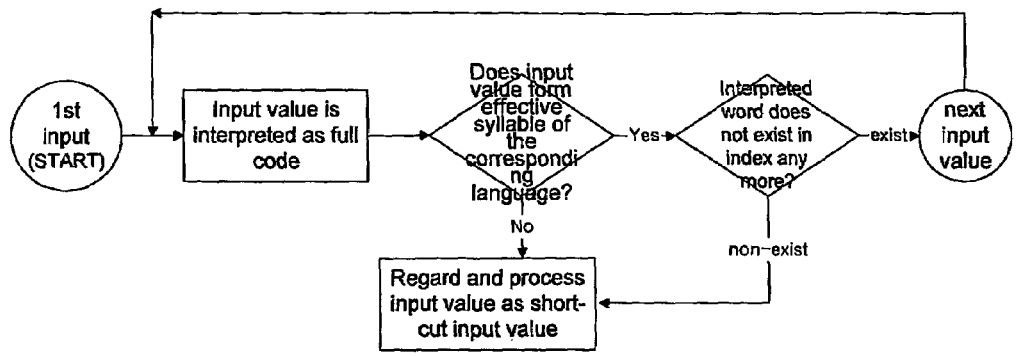

The above will be described on the basis of the input system shown in FIGS. 4-5 to 4-8 as follows. For instance, assuming that words such as ""고맙습니다"" and" ""고마워요"" are stored in the index, if "10*=고" is entered, the system can output words corresponding to ""고..."" (namely, words starting with ""고"" such as ""고맙습니다", "고마워요",", . . . ) in a proper form. Under circumstances similar with a cellular phone, contents generated by input values are displayed on an input line(the top of an LCD in FIG. 13-1), and candidate words or phrases outputted from the index can be display on the bottom of the LCD in a table form or the like. The user can select, confirm and input the target word using the move button(i.e., navigation button). For example, FIG. 13-1 shows the LCD of the cellular phone. FIG. 13-1 shows an example of outputting the corresponding words of the syllable formed according to the full input onto the bottom of the LCD.

Here, to input ""고맙습니다", "고"", ""고""is entered, and then, the remaining syllables can be inputted by the short-cut input method(short-cut input using the syllable-based initial value simple code). That is, ,고+ㅁㅅㄴㄷ=10*+5723" is entered. Here, the target word(namely, ""고맙습니다"") which has the first syllable of ""ㄲ"" and the remaining syllables having the initial value of ""ㅁㅅㄴㄷ""is provided to the user.

Meanwhile, half of syllables in Korean have the final consonant, but the residuals do not have the final consonant. In case of ""고맙습니다,"" if "1*05723" is entered in succession, it corresponds to ""곰ㅅㄴㄷ".". In this case, the system can recognize "ㅏ=1*057" in a normal full input, and the residual part (for example, "ㅅㄴㄷ=723") in the short-cut input by recognizing that a part of the input value does not form normal Korean syllables the moment "2" is entered. The above also belongs to the category of the "concurrent input method(FIM based concurrent input method)", which is presented in the prior document. Syllables recognized in full code (for example, ""곰") are naturally recognized in full code, and the remaining input values(for example, "ㅅㄴㄷ 723") is recognized in simple code.

Here, the corresponding words including the syllable formed by the full input are searched from the index (for example, if ""곰습니다"" is stored in the index) and provided to the user, the words corresponding to the simple code input values (for example, if ""습니다"" is stored in the index) are provided to the user, or all the above may be outputted. If the words searched by all the two cases are outputted, a specific word can be outputted on the top of the LCD according to determined rules (for example, according to the priority order of words including parts recognized in full code, the priority order of words, or the priority order of words belonging to a specific group). It is preferable that the output order is set by the user as words can be displayed on the LCD in various ways.

In case of that the words searched by all the two cases are outputted, when ""곰습니다"" and ""습니다"" corresponding to ""곰ㅅㄴㄷ"" are outputted on the bottom of the LCD, if the user selects ""곰습니다.",", all of ""곰ㅅㄴㄷ"" will be changed into ""곰습니다.",", or if the use selects ""습니다","ㅅㄴㄷ"", corresponding to ""습니다"" is changed into ""곰습니다".".

If only ""고맙습니다"" is stored in the index, ""고맙습니다"" corresponding to the input value of "1*05723" cannot be outputted. Therefore, the system can analyze "1*05723" into ""곰ㅅㄴㄷ""and ""고ㅁㅅㄴㄷ""" at the same time, and output the target word (provide to the user) referring to the index. To interpret ""곰ㅅㄴㄷ"" into ""고ㅁㅅㄴㄷ",", if the syllable in front of ""ㅅ"" which is recognized as the start of the short-cut input is ended to the final consonant, the syllable is excepted from the front consonant (namely, ""ㄲ"),"), and the final consonant as unit consonant is put between ""ㄲ"" and ""ㅅ".". It would be shown complex, but any person who has the basic knowledge of Korean structure can easily know it. The above can be applied similarly even though the final consonant is double consonant. FIG. 13-2 shows an example of outputting candidate words by applying the priority output order of "words of the specific group designated as priority output, words including parts analyzed in full code, words which do not include the parts analyzed in full code, and so on".

Here, ""습니다"" belongs to the group designated as priority output, and so, is outputted onto the uppermost top.

If the user wants to interpret only ""고ㅁㅅㄴㄷ"",", after "10*=고" is entered, only ""고ㅁㅅㄴㄷ"" is interpreted by pressing "5723" after the appointed manipulation for deciding the syllable (for example, non-input for a predetermined period of time, or one-time pressing of a [>] button), and only the corresponding words are searched. Also, in this case, words (for example, ""고맙습니다")" corresponding to ""고ㅁㅅㄴㄷ"" including ""고",", which is a syllable previously recognized can be outputted, words (for example, ""곰습니다"" if it is stored in the index) corresponding to ""ㅁㅅㄴㄷ"" excepting ""고"" can be outputted, or all of the above can be outputted. Refer to FIG. 13-3.

Here, the syllable can be decided by once pressing the [>] button for intentional syllable decision. Furthermore, the [>] button can be utilized as a space button, and so, after the decision of syllable, the [>] button can be served to input space. That is, if the user presses the [>] button once after inputting ""고",", the syllable ""고"" is decided, and if the [>] button is pressed again, ""고"("고"" (""고",'+space) is formed. That is, when "10*>5723" is entered, the system recognized it as ""고ㅁㅅㄴㄷ",", and provides the user with ""고맙습니다"" which is the corresponding word. Of course, if the system refers to the index of example in FIG. 13-3, the system can output ""고맙습니다"" even if only "10*>57=고ㅁㅅ"" is entered.

In such concurrent input method, the output method of syllables including the syllable formed by full input is useful for decision of the target word form the list of candidate words when the corresponding candidate words are provided during the full input. Moreover, the output method of candidate syllables corresponding to only the input values treated by the short-cut input (namely, input values processed as simple code) excepting the previously formed syllable) is useful for rapidly inputting frequently used suffixes or particles in short-cut input. For example, after ""고맙"" is entered, (after the input contents is decided by a predetermined tool) ""ㅅㄴㄷ"" is entered to output ""습니다"" (under the assumption that it is stored in the index), As described above it would be appreciated that suffixes frequently used like " . . . "...습니다"" is stored in a specific group (for example, a suffix group) in the index, and then, words of the corresponding group are first outputted when candidate words are outputted with concurrent input. If ""고맙습니다"" and ""습니다"" are all stored in the index, when ""고맙ㅅㄴㄷ"" is entered, ""고맙습니다"" and ""습니다"" can be all listed as candidate words.

For more example, when ""고맙습니다"=70##90*838", is entered, the system recognizes ""세종"" as full input values, and "38", which has an incorrect syllable, as short-cut input values. Likewise, if only ""세종대왕"" is stored in the index, ""세종대왕"" is outputted. On the contrary, if only ""대왕"" is stored in the index, only ""대왕"" is outputted. If both ""세종대왕"" and ""대왕"" are stored in the index, they can be all outputted. However, it is preferable that only one is outputted according to regulations (including/not including parts recognized with full input). Furthermore, in case of ""문무대왕",", if ""ㄷㅇ"" is entered in succession after ""문무"" is entered in full input, the system recognizes it as ""문문ㅇ".". Therefore, if the user wants to enter only ""대왕"" in short-cut input after ""문무"" is entered in full input, after the user enters ""문무"" and confirms the input syllable ""문무"" (for example, press the button [>] once for termination of the syllable), the user can enter "38=ㄷㅇ". Here, even though ""대왕"" has a bad priority order in comparison with other words (for example, ""다와ㄱ"), which are stored in the index and correspond to "ㄷㅇ=38", if ""세종대왕"" is stored in the index, the system can output ""대왕"" prior to other candidate words (for example, ""다와ㄱ") relative to the input value "5*025*0>38".

Moreover, also in a case of that the user enters some syllables in short-cut input like "ㄱㅁ습ㄴㄷ=157*623" and some syllables in full input, it is possible that the system recognize it as ""고맙습니다"". When "157=c is entered, the system interprets the simple code "157" (for example, syllable-based initial value simple code or word-based initial code), and then, searches words corresponding to ""ㄱㅁㅅ"" by each syllable. When "*6" is entered, the system can recognize "157*6= "문무대왕"" and "7*6=습"." That is, the system recognizes that the previously entered "15" is a short-cut input value, and if "23" is entered again, the system recognizes it as short-cut input value as it does not form a proper syllable. Also, in this case, the system can recognize ""ㄱㅁ습ㄴㄷ"" as the full code in part, and as the short-cut code in part, and so, provide ""고맙습니다"" to the user.

As described above, a syllable in Chinese is composed of "shengmu+yunmu". Furthermore, as set forth, in the notation of Chinese pronunciation, which is based on the Chinese romanization system (i.e., Chinese pinyin), the "shengmu" is consonants of the Roman alphabet, and the "yunmu" is vowels of the Roman alphabet or "vowel+n" or "vowel+ng". that is, as you can see above, a syllable in Chinese characters written by the Romanization system (pinyin) has the form of "consonant+vowel", "consonant+vowel+n", or "consonant+vowel+ng". Rarely, the romanization system has syllables starting from a vowel "a", "e" or "o". Here, as described above, Roman alphabet consonants, which can be located at the end of one syllable in the romanization system (pinyin) are only "n" and "ng". It can be considered as the final consonant in Korean. Namely, the final consonant of one syllable can have only "n" and "ng".

For example, if "中華(zhonghua)", "民國(minguo)", "中華民國(zhonghuaminguo)", and so on are stored in a pinyin index, "中華(zhonghua=49***77392##*, see FIG. 10-6) is entered by the Romanization system in full input, "民國(minguo)" is inputted by entering "mg=73 (see FIG. 10-6)" in short-cut input (using the syllable-based initial value simple code as the short-cut input value). To input "中華民國" the user enters the corresponding romanization system ("zhonghua=49***7739##*"), selects and confirms one of listed candidate Chinese characters, and enters "mg=73". Alternatively, the user enters "zhonghua=49***7739##*", and enters "mg=73" in succession. In case of the former, it is natural that the system outputs only "民國(minguo)", "民歌(minge)", . . . corresponding to "73=mg" as the candidate words. In case of the latter, it is also natural that the system recognizes the input value of "49***7739##*" as "中華民國" and outputs ""民國"" and ""中華民國"" corresponding to "73" recognized as the short-cut input value. When "49***7739##*7" relative to "49***7739##*73=zhonghua+mg" is entered, the system recognizes the final numeral "7" as the pinyin shengmu inputted in a normal full input, but when the final numeral "3" is entered, the system recognizes the final input value "73" as the short-cut value. It is the same case as Korean. Therefore, the system can output ""中華民國"" including ""中華"" corresponding to the full input value "49***7739##*" and "中華民國" corresponding to the short-cut input value "73". Refer to FIG. 13-4.

On the contrary, even when the user enters "zh=49" in short-cut input relative to ""中華"" and enters "7#773##*" in full input relative to ""中華民國"" in succession without selection and input of ""中華"" from the candidate words, the system can output ""中華民國"" corresponding to "z_h_minguo". Likewise, when the user enters "73##*" to input "民國(minguo)", the system can output "中華民國" by recognizing "73##*=mguo=m_guo". The moment "73" is entered, the system recognizes it as the short-cut input, and searches words corresponding to "m_g_", and recognizes "##*=uo" as vowel forming the second syllable. The input of "uo" next to "mg" serves to restrict the candidate words corresponding to "m_g_" to ""民國"".

When the user enters "73" in short-cut input relative to "中華民國" after entering ""中華"" in another way (one of all Chinese input ways such as short-cut input, full input, input using stroke of Chinse character, and so on), if the system outputs words corresponding to "m_g_" by simply recognizing the input value "73" as a simple code, the system outputs a list of lots of candidate words (for example, "民國(minguo)", "民歌(minge)", . . . ). However, if ""中華民國"" is stored in the index, the system can recognize "中華+mg=中華+73" as ""中華民國"" regardless of storing "中華民國" in the index. In this case, as ""中華"" is previously inputted in Chinese, the system can output "中華民國" corresponding to the input value "mg=73" prior to other candidate words (for example, "民歌(minge)", . . . ).

Here, when "zhong . . . " is entered, the system recognizes it as "zho"+"n_g_" or "zhon"+"g_". However, as the syllables starting with "zho" or "zhon" do not exist in the Chinse dictionary in reality (so, they are not naturally contained in the pinyin index), the system recognizes it as ""中"" relative to "zhong . . . " by referring to the index. If they are contained in the index, when "zhong" is entered, the system can output candidate words according to a predetermined output order. In FIG. 10-6, the system may recognize "zhongg . . . = 49***7733" as "zhonk . . . "="zho"+"n_k_" or "zhon"+"k_". It is similar with the concurrent input method for simultaneously processing the input values in full code and in short-cut input value (simple code), as described above.

As set forth, as the short-cut input value (i.e., simple code), for convenience, an example using "syllable-based initial value simple code" is presented, but if "syllable-based initial code" is applied as the short-cut input value (i.e., simple code), the example shown in FIGS. 11-3 to 11-10 can be applied for simple code recognition.

19. Character Input Method & Control Processing Method using Long Pressing

In general, one object (for example, alphabet, numeral, English alphabet of languages, which do not use English as the native language, character (special character), function, and control of specific purpose are called "alphabet etc.") can be expressed by pressing a button once. Here, the user can express another object, which is different from an object expressed by one-pressing, by pressing a specific button long once. Hereinafter, to press the specific button long is called "long pressing" or "long stroke". Hereinafter, when the "long pressing" is not mentioned, it means normal button pressing, and called "short stoke" to describe the normal button pressing in comparison with the "long pressing". Hereinafter, English will be explained for describing general matters, and each language will be explained for describing applicable cases by each language. In this case, it would be evident that the matters explained in one language can be applied to other languages in the same way.

19.1. English (and Other Languages)

19.1.1. Alphabet Input using Long Pressing

Presently, a method for inputting the corresponding numeral by pressing a specific numeral button long has been used. However, it is not restricted to only numerals. For example, assuming that one-pressing of each numeral button as shown in FIG. 1-1 means that the first character of characters assigned to the corresponding button is entered (for example, "A" is entered by pressing a button [2] once), the second character (for example, "B") assigned to the same button can be entered by the long pressing. However, it is not preferable that the long pressing is applied for input of frequently used characters as it may break a natural flow of input. Therefore, it is preferable that the input by the long pressing is applied to "alphabet etc." which is not used frequently. Moreover, it is preferable that time for the long pressing can be set by the user according to the user's pressing speed.

In the present invention, the long pressing is used appropriately, and thereby, the present invention can simplify input regulations of a specific input method, widen an expression range, and remove ambiguity. For convenience, the long pressing of the button [2] is expressed by "2~" by attaching "~" next to "2". As described above, for applying the existing repeat selection method, when the button [2] is pressed three times in FIG. 1-1, there is ambiguity as it cannot be recognized whether "222" means "C", "AAA", "AB", or "BA".

In FIG. 1-1, for example, it is defined that "A" is entered by long pressing or one-pressing of the button [2], "B" is entered by one-pressing of the same button after "A" is entered, and "C" is entered by one-pressing of the same button after "B" is entered. If characters assigned to the same button are entered in succession, when the character next to the second character is entered, it can be entered without ambiguity by starting the entry with the long pressing. For example, when "DACB" is entered, it can be entered by "3 2 2~22 2~2" without ambiguity. When A,C and B assigned to the same button are entered in succession, they can be entered without ambiguity as "C" and "B" are entered by the long pressing. This input method is similar with the existing repeat selection method, and can remove ambiguity by using the long pressing only when characters assigned to the same button are entered in succession. Of course, it is possible that "A" is entered by the long pressing of the button [2] (namely, "2~") in case of "DACB=322~222~2".

In this case, one (for example, "A") of characters assigned to the specific button (including both clearly expressed assignment and suggestively expressed assignment) is called a representative character, the remaining characters (for example, "B", "C") are called succession characters. The succession characters are entered by pressing the button, to which the representative character and the succession characters are assigned, several times. That is, if characters are assigned to a button in order of "A(representative character)-B($2^{nd}$ succession character)-C($3^{rd}$ succession character), the system recognizes "A=2~", "B=A+2="2~2", and "C=B+2=A+2+2=2~22". In addition, that "A" can be entered not by the long pressing but by the normal pressing (namely, short stroke) means that the representative character can be entered by the one-pressing (namely, short stroke) as in the existing repeat selection method if the characters assigned to the same button are not entered in succession. Hereinafter, for convenience, it is called "repeat selection method by long pressing of representative character".

If only two characters are entered using only one button, one of the characters is entered by the normal one-pressing (namely, short stroke), and the other is entered by the long pressing (namely, long stroke) (for example, in FIG. 10-1, "B=1", "P=1~"). However, as shown in FIG. 1-1, in case of that three characters are assigned to one button (for example, a button [2]) (including both clearly expressed assignment and suggestively expressed assignment), if the first character is entered by one-pressing (for example, "A=2"), the second character is entered by long pressing (for example, "B=2~"), and the third character is entered by two-pressing (for example, "C=22") or by long pressing and one-pressing (for example, "C=2~2"), there is also ambiguity when the third character is entered. The reason is that if "C=22" is defined, it may be recognized as "AA", if "C=2~2" is defined, it may be recognized as "BA". In this case, the first, second and third characters can be selected optionally. Also, the above method can reduce ambiguity more considerably than the typically simple Repeat Selection Method.

Figures 10, 11, 12, 13, 14:
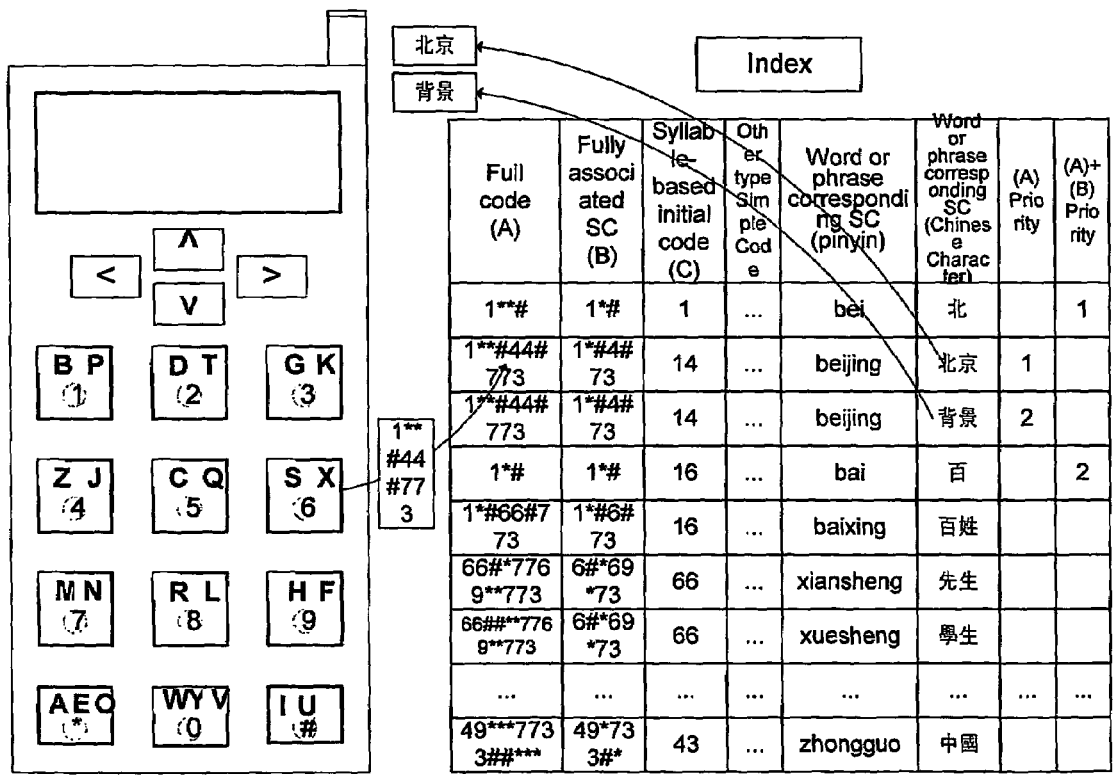
Figures 10, 11, 12, 13, 14, 15:
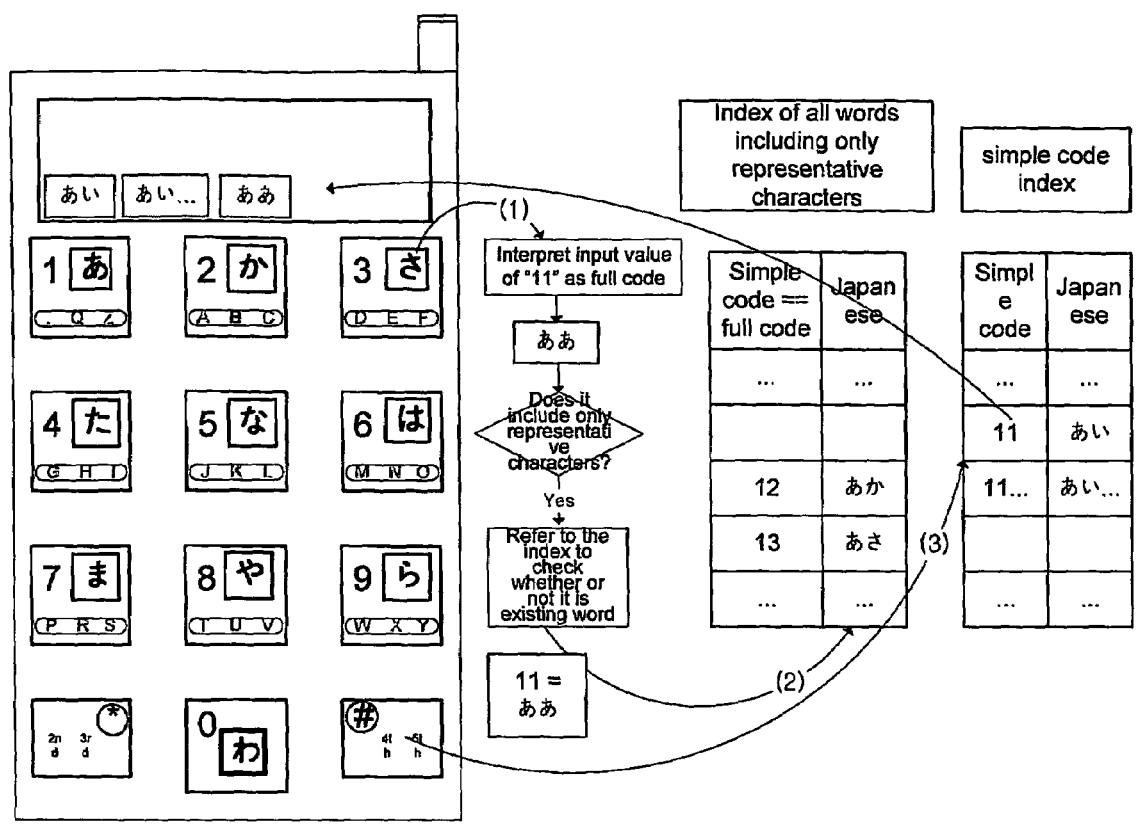
Figures 10, 11, 12, 13, 14, 15, 16:
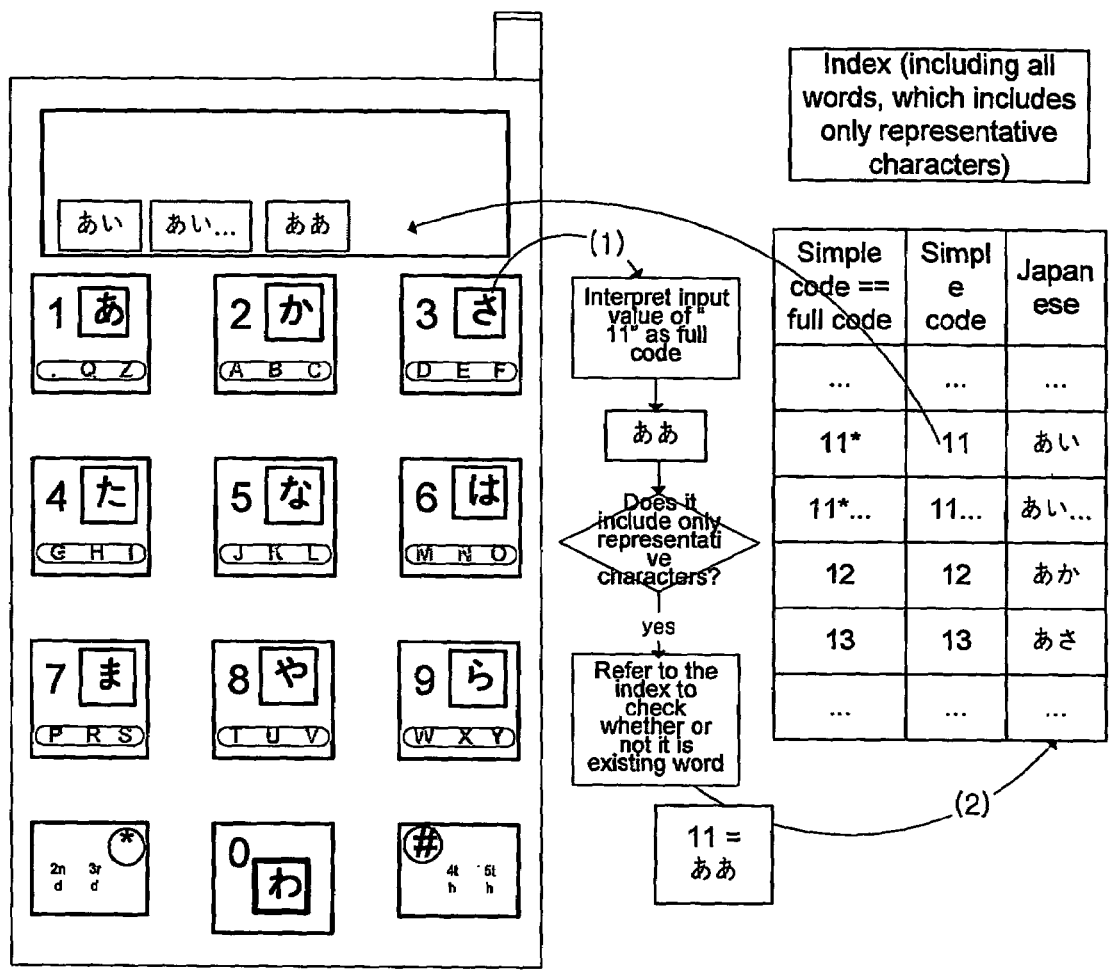
Figures 10, 11, 12, 13, 14, 15, 16, 17:
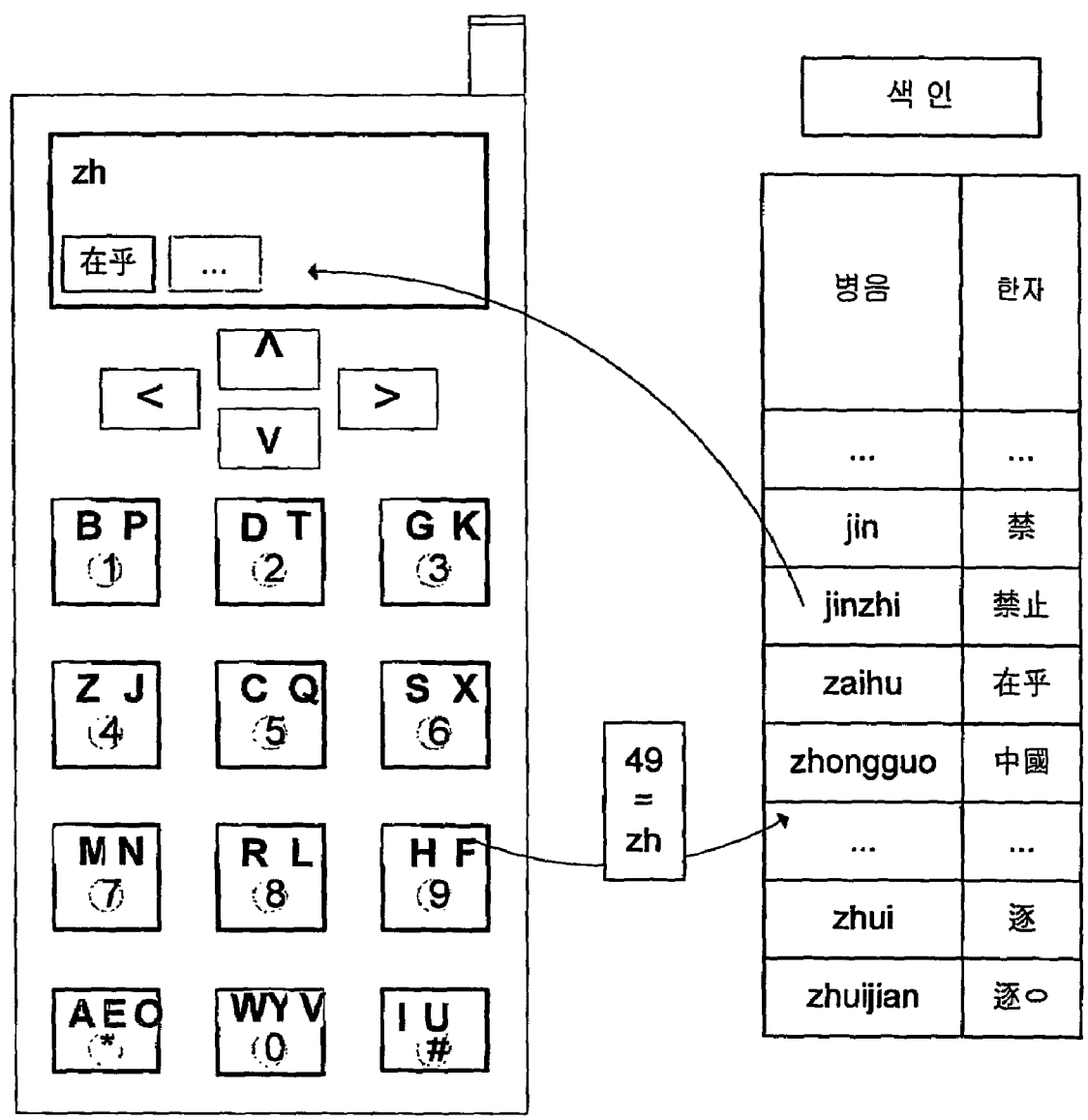
Figures 1, 11:
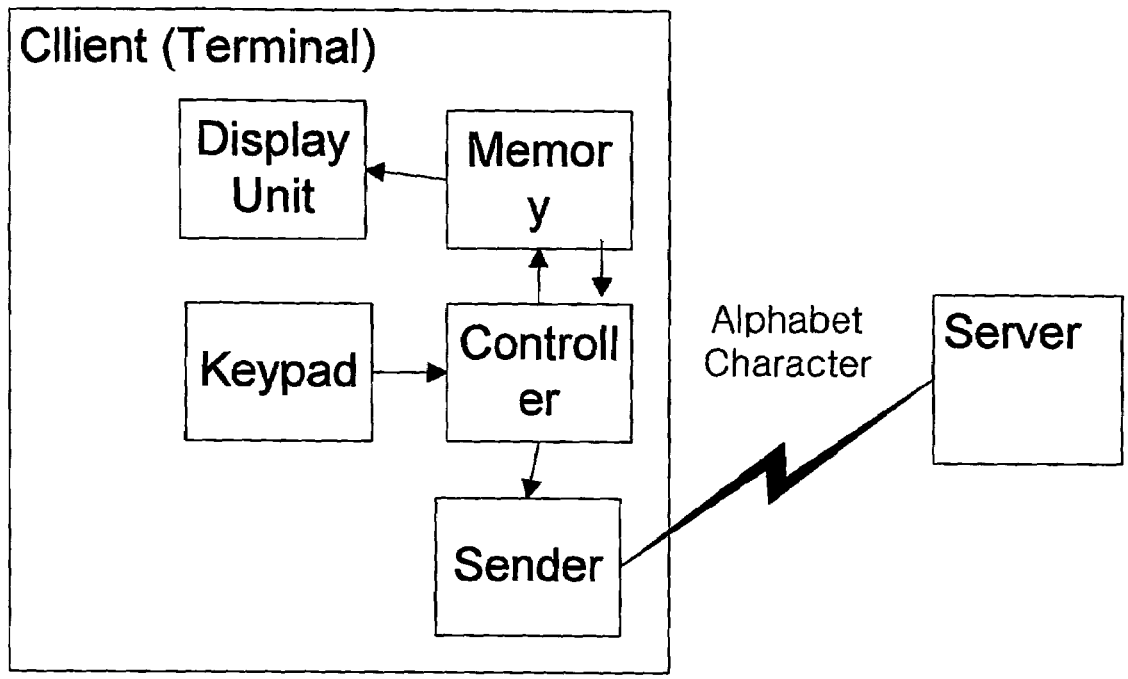
Figures 2, 11:
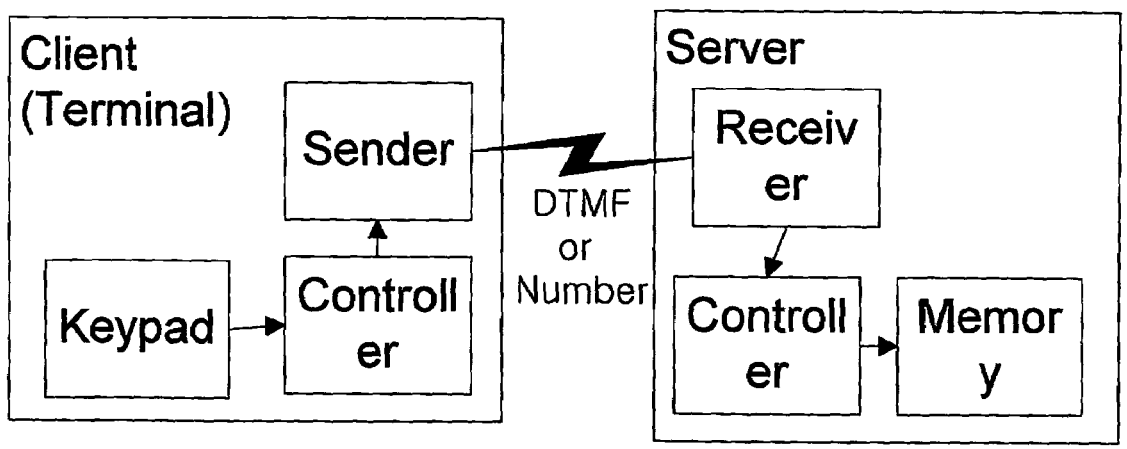
Figures 3, 11:
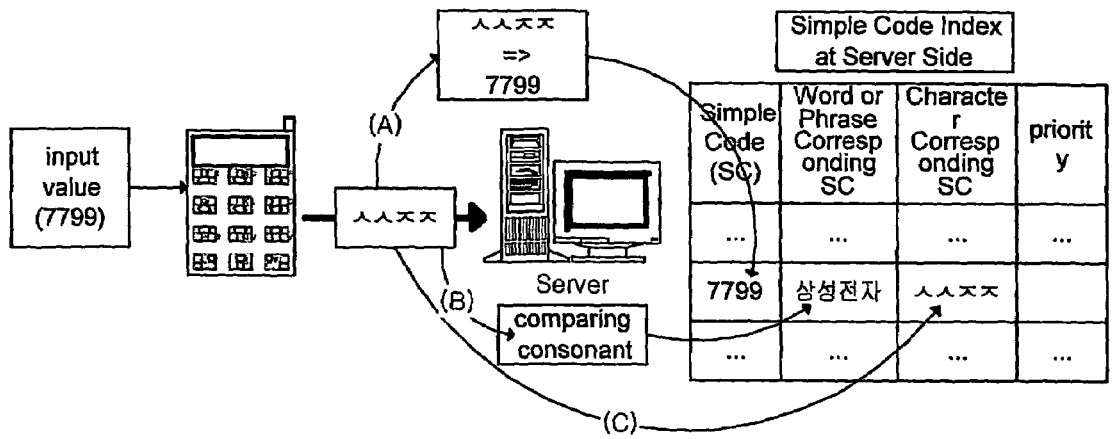
Figures 4, 11:
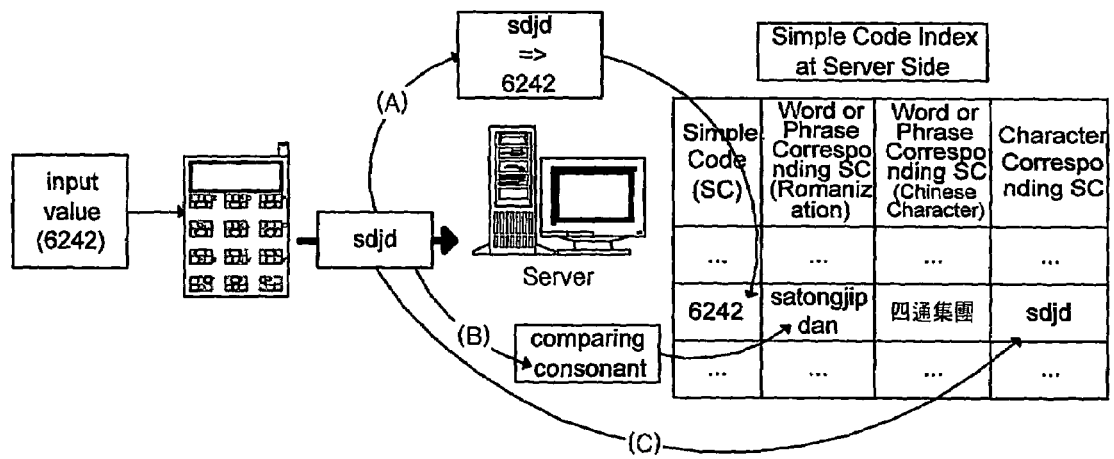
Figures 5, 11:
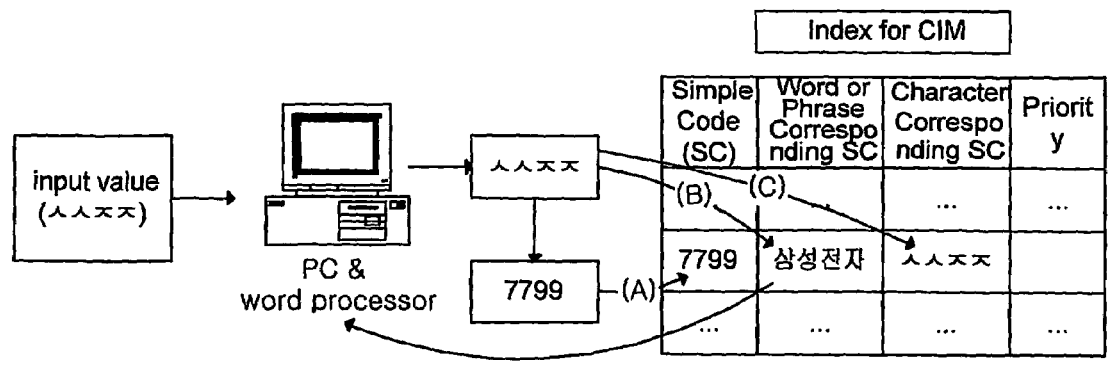
Figures 6, 11:
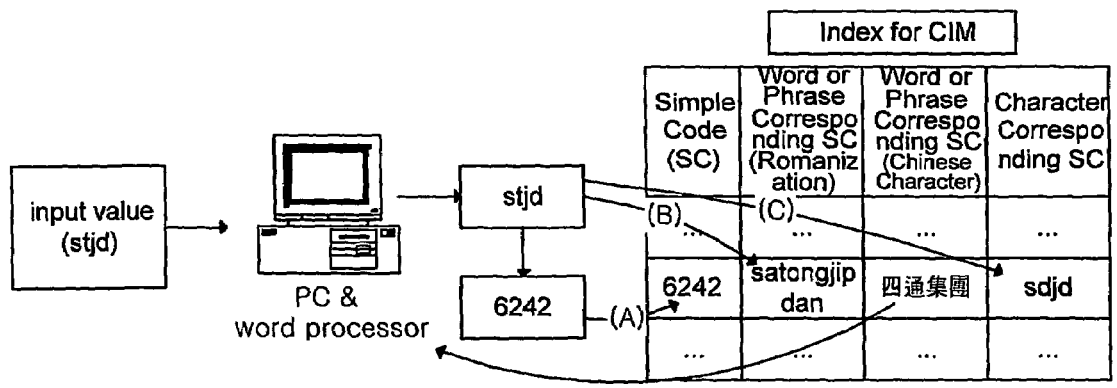
Figures 7, 11:
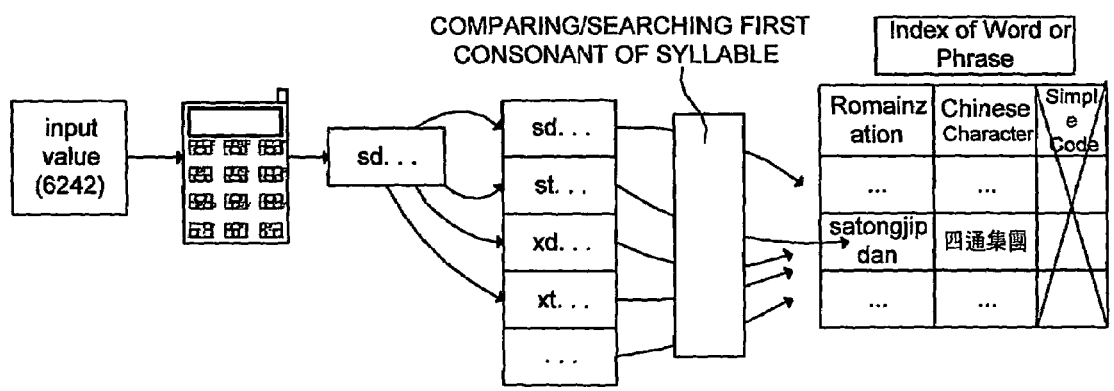
Figures 8, 11:
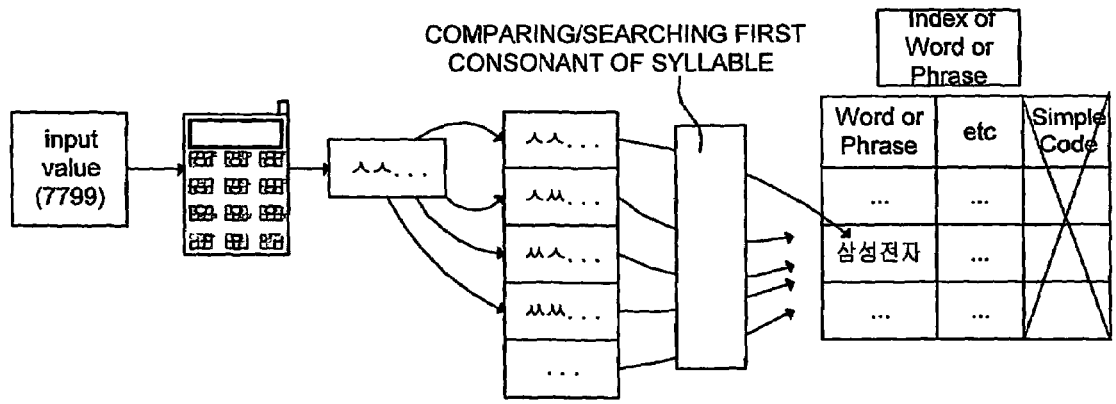
Figures 4, 13:
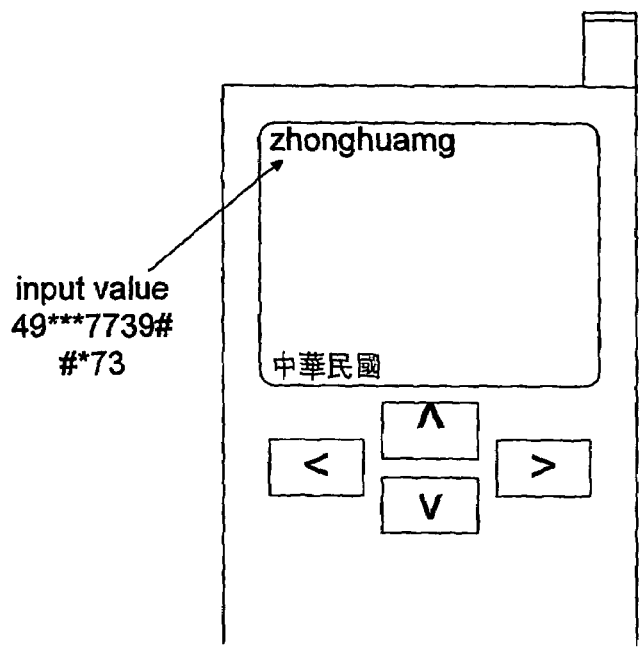
Figures 1, 14:
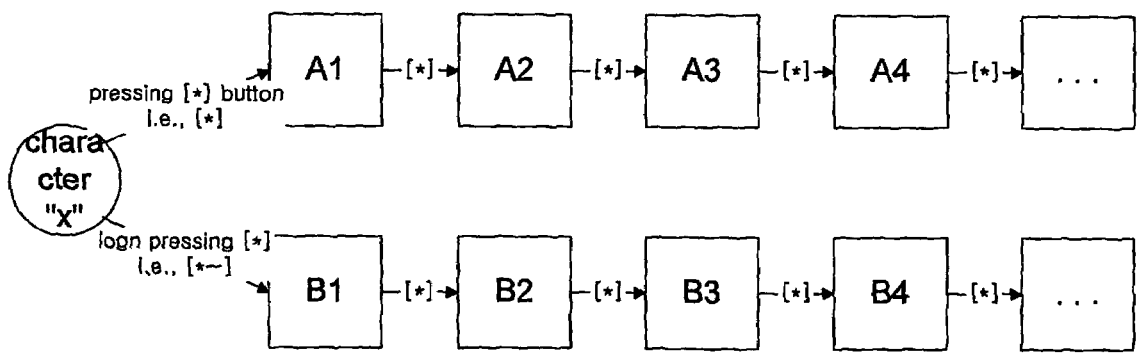
Figures 2, 14:
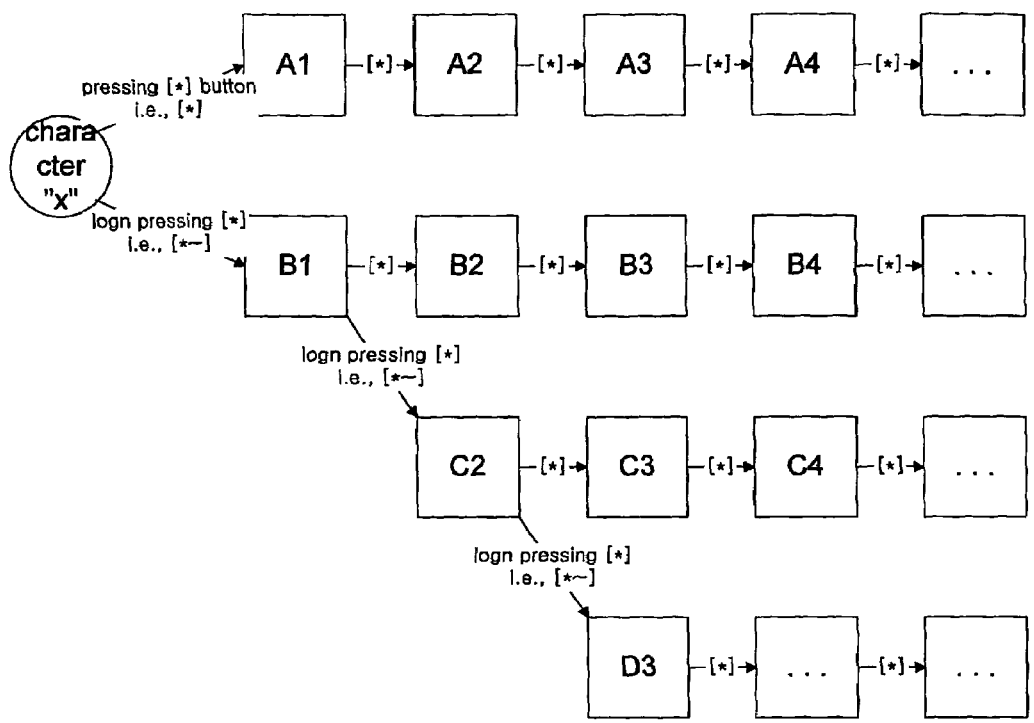
Figures 3, 14:
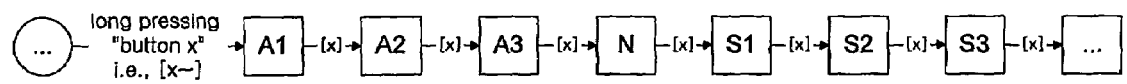
Figures 4, 14:
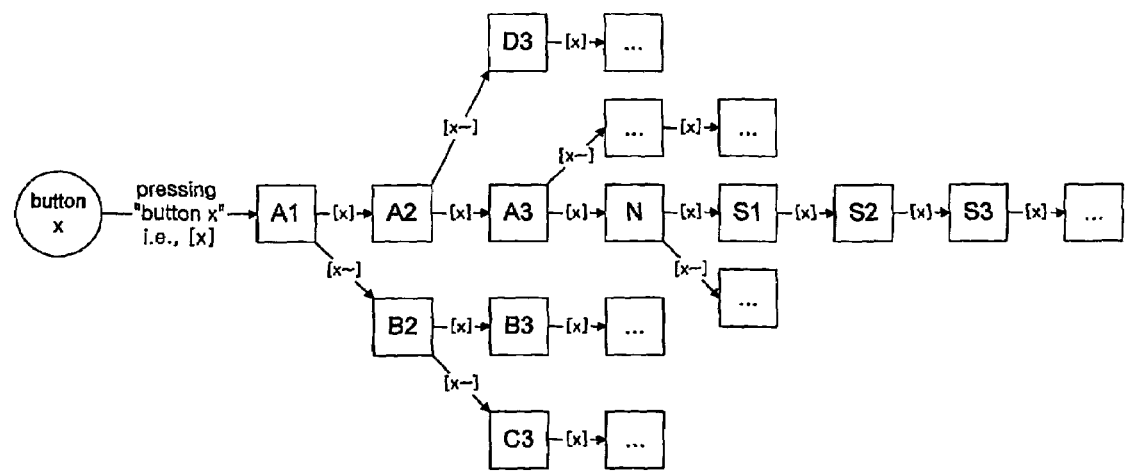

The Repeat Selection Method using long pressing has several merits in that characters can be entered without ambiguity, and in that alphabets, numerals, characters assigned to the same button can be entered effectively. For example, assuming that specific characters "A1, A2, A3, . . . " (including both clearly expressed assignment and suggestively expressed assignment) are assigned to a button [x], and a specific numeral "N1" is also assigned to the button [x], and special characters "S1, S2, S3, . . . " are also assigned to the button [x], the characters assigned to the button [x] can be entered by long pressing. For example, the character "A1" is designated as the representative characters and entered by long pressing of the button [x]. The input of "A1, A2, A3, N1, S1, S2, and S3" assigned to the button [x] is shown in FIG. 14-3 in the form of a graph. In FIG. 14-3, "A1S1" is entered by "xx~xxxx", or by "x~x~xxxx". Here, in languages that English is not native language, English characters "E1, E2, E3, . . . " can be added and assigned to the same button.

Furthermore, to input the objects (for example, "A1, A2, A3, N1, S1, S2, and S3") assigned to the button [x], it is possible that the assigned numerals and characters (special characters) are entered not by the repeat selection method using long pressing of representative character but by the existing repeat selection method. But, it is necessary to avoid ambiguity by "a predetermined time delay" or input of separator (for example, one-pressing of the button [>] described in "complementary matters in concurrent input method") after entry of one object, as there is ambiguity when objects assigned to the same button are entered in succession. For example, A1, A2, A3, N1, S1, S2, and S3 are assigned to the button [x], and when "S1A1" is entered by the repeat selection method, "S1A1" can be entered by "xxxxx>x". It is to avoid ambiguity when the repeat selection method is applied, but it is different from the existing repeat selection method in that special characters, numerals, characters are all assigned to the same button and entered by pressing the button.

Till now, when characters of mother tongue, "A1, A2, A3" are assigned to the button [x], the system recognizes "x=A", "xx=B", and "xxx=C", or if the button is pressed in excess of the defined maximum repeat pressing numeral (for example, the button [x] is pressed four times), the system recognizes "xxxx=A" and "xxxx=B" according to a circulation toggle method. The circulation toggle method is to allow entry of the target character by repeatedly pressing the button [x] when the user mispresses the button [x] in applying the repeat selection method. However, as presented by the applicant, when the user presses the delete button not to delete the entire syllable but to delete the "latest (or last) input value", the circulation toggle method is not needed. That is, when the user wants to enter "xx=B" but enters "xxx=C", the user can enters "B" by pressing the delete button once without additionally pressing "xx" to input "B".

FIG. 14-4 shows a process for inputting character by long pressing after short pressing of a specific button. In FIG. 14-4, the row of A1, A2, A3, . . . shows an input process by the existing repeat selection method. B2 is entered by long pressing of the specific button (for example, button [x]) after A1 is entered by short pressing of the same button. That is, "A1" is entered by "x", and "B2" is entered by "xx~". Here, if entry of a specific character is not defined by long pressing of the button [x], and assuming that only A1 and B2 are entered using the button [x], it can be interpreted without ambiguity. Even though the long pressing of the button [x] is defined to a specific character (for example, character "E1"), if "A1" and "E1" are not simultaneously used (i.e., do not appear consecutively), A1, B2 and E1 can be entered without ambiguity by using the language restriction (language restriction in which A1 and E2 are not used simultaneously).

In FIG. 14-4, if the long pressing of the button [x] is not defined as input of the specific character, A1, B2 and C3 can be recognized without ambiguity. Moreover, in case of A1, A2 and D3, there may be ambiguity in "A1=x" and "A2=xx=A1A1", but if A1 in language is not used in succession, A1, A2 and D3 can be entered without ambiguity using the language restriction (language restriction in which A1 is not used successively). For convenience, the method as shown in FIG. 14-4 is called "repeat selection method by long pressing after short pressing". For example, in FIG. 10-6, "i" is entered by "#" and "u" is entered by "#~", and a certain vowel (for example, "u"—character "u" having affix "..") can be entered by "##~" without ambiguity ("l" and "u" are not used in succession in Chinese pinyin). Of course, as "i" is not used in succession, it is possible that other object can be entered by "##". It can be applied to other languages in he same way. In FIG. 14-4, it can be applied to enter next characters of rows of A1, A2 and A3 (for example, S1, S2, S3, . . . ).

19.1.2. Control Processing Method using Long Pressing

Next, an example in which the method is applied to selection of control will be described. The example will be described assuming that control is set to be selected after representative character. In the above description, the example, in which "A" is entered by both the short stroke and the long stroke of the button [2], is to show that "A" can be entered similarly to the existing repeat selection method. However, a specific object can be inputted by one-pressing of a specific button, and another object can be inputted by long pressing of the same button. For example, a specific object (for example, character x—"x" means not the real character "x" but any character) can be inputted by one-pressing of a specific button (for example, a button [1]), and another object (for example, any character "y") can be inputted by long pressing of the same button. That is, "character x" is entered by "1", and "character y" is entered by "1~". Here, as "character x" and "character y" are notional, even though "A=2~" or "A=2" is defined by the "repeat selection method by long pressing of representative character", "A" by the normal pressing (namely, short stroke) corresponds to "character x", and "A" by the long pressing corresponds to "character y".

The above can be applied to selection of control in the same way. For example, a specific object (for example, "control a1") can be inputted by one-pressing of a specific button (for example, a button [*] as a control button), and another object (for example, "control b1") can be inputted by long pressing of the same button. "control a2", "control a3", . . . can be selected by repeat pressing of the control button. Here, it is important that "control b2", "control b3, "control b4", . . . can be selected not by long pressing but by repeat pressing after "control b1" is selected by long pressing of the control button. At this time, there is no ambiguity. For more detailed explanation, refer to the previously descried example, in which the representative character "A" is entered by long pressing and next characters are entered by short stroke.

For convenience, an object inputted by combination of the specific button (for example, the button [1]) and "control b1" is called "B1", and it is as follows:

"A1=x+{control a1}=1*", "A2=x+{control a2}=1**",
"A3 =x+{control a3}=1*"

"B1=x+{control b1}=1*~", "B2=x+{control b2}=1*~", "B3=x+{control b3}=1*~**",

Of course, it is possible that control b1, control b2, and control b3 can be selected by one long stroke, two long strokes, and three long strokes respectively. However, it is natural that frequent use of the long pressing is not good. As in the example of B1, B2, B3, . . . , for convenience, the input by the normal pressing after the one long pressing of the control button is called "repeat pressing after long pressing", and such control processing method is called "control processing method by repeat pressing after long pressing". The group of A1, A2, . . . means the "the existing control processing method" proposed by the present applicant, and the group of B1, B2, . . . means the "control processing method by repeat pressing after long pressing". FIG. 14-1 shows the above in the form of a graph. The above is an example showing that the one long pressing is applied to only the first control selection as in the repeat selection method by long pressing of representative character. In addition, as shown in FIG. 14-2, it is possible to provide various expansions (for example, C group, and D group) through the long pressing.

Here, of course, another object (e.g., character "y" in the above example) can be inputted by long pressing of not the control button but other button (e.g., the button [1] in the example). Furthermore, as the characters (In FIG. 1-1, three characters) assigned to each button of the keypad can be recognized without ambiguity by the repeat selection method by long pressing (for example, "A=2~", "B=2~2", "C=2~22"), other characters of other group can be inputted by repeat pressing after the repeat pressing or long pressing of the control button after one of the three characters are selected by manipulation of a numeral button. That is, in FIG. 1-1, an character (including character, numeral, mother tongue, English alphabet, etc.) of a specific group (for example, group 1) can be entered by repeat pressing of the control button after "A" is entered, and then, another character of other specific group (for example, group 2) can be entered by the "repeat pressing after long pressing". Likewise, an character of the group 3 can be entered by combination of "B" input and the repeat pressing of the control button, and an character of the group 4 can be entered by the repeat pressing after long pressing. In FIG. 1-1, it is also possible that characters of any group are entered by the repeat pressing of the control button, or it is also possible that characters of any group are entered by the repeat pressing after long pressing relative to three characters indicated on the button on the keypad and defined regulation (for example, "2~222").

As shown in the examples of Korean case (FIGS. 4-5~4-8) and of Japanese case (FIGS. 2-1, 2-2), the control processing method by repeat pressing after long pressing is very useful or input of numerals and English characters (in languages which do not use English as mother tongue), which are used intermittently (infrequently). Hereinafter, applications by language will be described simply, and it can be applied to other languages.

19.2. Korean In FIGS. 4-5~4-8, the method can be applied to a case, in which affixed characters (for example, aspirated consonants, tense consonants, and the consonants assigned with vowel) are entered by repeat pressing of a button to which basic consonants are assigned, in a similar way (for example, ""ㄱ"=1", "ㄲ=11", "ㅋ=111" or ""ㄱ"=1", "ㅋ=11", "ㄲ=111"). That is, if characters assigned to the same button are used in succession, characters after the second character are entered by long pressing. For example, when FIG. 4-5, if the continuous pressing of the button [1] is defined as ""ㅋ",," if ""ㄱ"" is used in succession, it can be recognized not as ""ㄱ"+"ㄱ"" but as ""ㅋ"," and at this time, if the second "ㄱ"is entered by long pressing, it may be recognized as ""ㄱ"+"ㄱ"". That is, ""ㄱ"" of the second syllable in ""국가"" is entered by long pressing. Also, ""ㄱ"" of the second syllable in ""국가"" is entered by also long pressing, i.e., "ㅋ=1~1". In this case, the method can be replaced with the control processing method for inputting affixed characters (one of the two methods or both of the methods can be applied).

Another character excepting the representative character, for example, aspirated consonant or tense consonant, can be entered by long pressing. If the aspirated consonant is entered by long pressing, the tense consonant can be entered by combination of basic consonants. Of course, as described in the prior document, in case of a ""오투기"," there is ambiguity as it may be recognized as ""오ㄷ두기"("ㄷ"" is the final consonant of ""오")."").

Likewise, the long pressing can be applied to input consonants (for example, ""ㅎ"" assigned to a button [o] in FIGS. 4-5 and 4-6) assigned with vowels. That is, ""ㅎ"" is entered by "0~". Based on FIG. 4-5 as presented in the prior document, I think that "input of "ㅎ"=8" or ""ㅎ"=0" or "ㅎ"=0 (it is possible in specific cases presented in the prior document) is more effective than the input using long pressing. The input method of the consonants (for example, "ㅎ"assigned with vowel and the input method using long pressing can be applied selectively.

Next, an example using the "control processing method by repeat pressing after long pressing" will be described. A representative Korean input system by the same inventor of the present invention is introduced on http://www.simple-code.net together with a simulator (in the homepage, input of old Korean characters, and concurrent input technology are also introduced), and, it is also introduced that input of numerals and English alphabets is possible without mode transition.

In the general order of use frequency, input is performed by "mother tongue alphabet-various special characters (i.e., various kinds of symbols)—numerals-English alphabets". As shown in FIG. 4-5, there is no control button for inputting numerals and English. Here, it is possible that numerals are entered by combination of the numeral button and long pressing of the button [*](that is, "*~=1~"). That is, numeral "1" is entered by "1*~". The button [*] is a vowel button at first, and at the same time, can be used as the control button. If the button [*] is pressed once, it indicates a vowel "ㅣ",but if the button [*] is pressed long once, it indicates a certain object ("numeral control" in the example).

English alphabets can be inputted by various methods. For example, "A" can be entered by "2#~", "B" can be entered by "2#~#", and "C" can be entered by "2#~##". "2#~#" is recognized not as "A" and vowel ""ㅣ"" (i.e., "A "ㅣ"") but as "B". The reason is that there is no syllable starting from vowel ""ㅣ"" in Korean (i.e., Korean restriction). If the long pressing and repeat pressing of the button [#] is used for another purpose, English alphabet is considered as succession character of numeral, and so, various definition such as "A=2*~*" or "A=2*~# (applying Cross Control Processing Method)", "B=2*~**", or "B=2*~##" can be made.

Another example of the Control Processing Method by long pressing will be described. In FIGS. 4-5~4-8, if vowel ""ㅜ"," or ""ㅠ"" is entered by repeat pressing of a button to which vowel "-" is assigned (i.e., "-=*", "ㅜ=", "ㅠ=*"), it is required to press the button [*] maximum three times (the "maximum possible repeat number" is three) in succession to input a character. In this case, an aspirated consonant control can be selected by pressing of "the maximum possible repeat number+1" (namely, four-pressing of the button [*]). That is, ""ㅋ"" is entered by "1****". In this case, to reduce the number of pressing times, the aspirated consonant control is defined as "*~", and so, "ㅋ=ㄱ+{aspirated consonant control}=1*~" can be defined. The above can be applied also to tense consonants and the consonants assigned with vowel, which are considered as affixed characters, in the same way.

Furthermore, in the control processing method, it can be applied to all cases in which aspirated consonant control is selected by the repeat selection method. In addition, it is also possible that affixed characters can be inputted by long pressing and/or by the repeat pressing selectively. In this case, numerals can be inputted using other buttons (for example, the button [#]).

19.3. Japanese

As shown in FIGS. 2-1 and 2-2, to input Japanese, lots of succession characters are inputted, and the system is useful for inputting the succession characters using the repeat selection method. That is, ""あ"=1" or ""あ"=1~", "い=1~1", "う=1~11", "え=1~111", and "お=1~1111" are defined. As described above, if characters assigned to the same button are used in succession, even though only the second character of the characters assigned to the button is entered by long pressing (namely, "1~") and the remaining characters are simply entered by one-pressing, there is no ambiguity. However, in FIGS. 2-1 and 2-2, Japanese words can be inputted with small input strokes without ambiguity by applying the succession (character) control processing method, and a succession (character) control processing method can be applied together with the repeat selection method by long pressing of representative character.

FIGS. 2-1 and 2-2 shows the example in which affixed characters (i.e., transfomed characters or succession characters) are inputted not by using the repeat selection method by long pressing of representative character but by using succession (character) control processing method by long pressing. When the succession character is inputted by the control processing method in FIG. 2-2, and when affixed characters (for example, " "닭", "닭ㅋ", " "닭", "닭ㅋ") of the representative character (for example, "다") is inputted as shown in FIG. 2-3, the number of the input strokes is too large, and the input is unnatural. In this case, the affixed character (for example, " "닭", "닭ㅋ") of the representative character can be defined by long pressing of the corresponding button (a button [6] in FIG. 2-2). The remaining affixed characters can be defined by " "닭", "닭ㅋ"="닭", "닭ㅋ"+a predetermined control button (for example, the button [*])=6~*".

Here, if the affixed character is not inputted using the long pressing of the button to which the characters are assigned, both the repeat selection method by long pressing of representative character and the succession character input method by control processing method can be applied. The affixed character (for example, " "닭", "닭ㅋ", " "닭", "닭ㅋ") can be inputted by combination of the long pressing of any control button (for example, the button [*]) and the representative character "다". That is, " "닭", "닭ㅋ"(any affixed character)=다+*~=6*~" and, " "닭", "닭ㅋ"(another affixed character)=다+*~*=6*~*" can be defined. Even though there are lots of affixed characters of " "닭", "닭ㅋ", of course, it is possible that the affixed characters can be inputted without ambiguity by using the repeat pressing after long pressing, like "6*~**", "6*~*", and so on. The reason is that "" and "*~*" indicate different objects (here, different controls) as "*" and "*~" indicate different objects.

Here, it is important that any control can be selected by the long pressing, and different objects (for example, different controls) can be indicated without ambiguity by the repeat pressing of the button (for example, the control button) used or the long pressing after the button is pressed long once.

Likewise, the what mentioned in Korean can be applied to input numerals and English alphabets. For example, "numeral 2=2#~", "A=2#~#", "B=2#~##", . . . can be defined.

19.4. Chinese

FIGS. 10-1 to 10-6 show the input of the romanization system (pinyin) of Chinese by the keypad without ambiguity (or little ambiguity). However, when "bb" is entered by "11" for short-cut input of words composed of "b_b_" (the underlined parts are pinyin syllables containing vowels), if the Chinese restriction in which "b" is not used in succession is applied, "11" will be recognized as "p". In this case, as described above, after "b" is entered by "1", the input value "1" is intentionally decided as "b" by a predetermined time delay or a specific manipulation (for example, press the button [>]), and then, "b" is entered by "1". It is the ambiguity problem generated when the characters assigned to the same button are entered in succession. Also, the problem can be solved by applying the control processing method by long pressing of representative character (the representative character "b" of the button [1] is entered by "1~"). For example, when character "b" is used in succession to input "bb", the second character can be entered by long pressing of the same button, namely, "bb" can be entered by "1~1" or "11~".

Next, input of numerals and characters will be described. Refer to FIG. 10-6. Input of English will not be described as it can be inputted without conversion after the input of English alphabets in Chinese. In FIG. 10-6, "numeral 1=1*"" can be defined. In FIG. 10-6, one-pressing of the button [*] is recognized as "a", and "*~" (long pressing) indicates different object ("numeral control" in the example). In FIG. 10-6, it is preferable that the control processing method using long pressing and repeat pressing of the button [#] is applied to input various characters. For example, dot(.), comma(,), colon(:), and semi-colon(;) are associated to a button [2], and "dot(.)=2#~", "comma(,)=2#~#", "colon(:)=2#~##", and "semi-colon(;)=2#~###" can be defined. "2#~#" is recognized not as "dot(.)+i" but as "comma (,)" because of the Chinese restriction in which words of the romanization system (pinyin) is not started from "i" (refer to the Korean case). Likewise, "2#~##" can be also recognized not as "dot(.)+i+i" or "comma(,)+i" but as "colon(:)". If the user wants to input "dot (.)+i", after "2#~" is entered, the user decides "dot(.) after the predetermined time delay or by the specific manipulation (for example, press the button [>]), and then enters "i" by pressing "#".

In FIG. 10-6, the button [*] is not used when characters of a specific group are inputted. The reason is that there may be ambiguity when the "repeat pressing after long pressing" is applied as there are rarely pinyin words starting from "a", "e" or "o" in Chinese. Additionally, the reason is that numerals can be inputted by pressing the button [*] long once as only one numeral is associated (i.e., assigned) to one button. In FIGS. 10-1 to 10-5, it is always possible that numerals and characters can be inputted by the control processing method using repeat pressing after long pressing of the buttons [*] and [#] as there are no pinyin words starting from "i" and "u" assigned to the buttons [*] and [#].

It would be appreciated that the above method can be applied not only to the keypad of FIGS. 10-1 to 10-6 but also to other keypads in a similar way.

19.5. Languages using Roman Characters

European languages using roman characters include lots of affixed characters having affix to basic characters. In input of the European languages using roman characters, the affixed characters and special characters can be inputted by applying various kind of long pressing described above.

EFFECT OF THE INVENTION

This invention shows that a target word or phrase can be inputted effectively using an index and applying a full input method(FIM). Moreover, this inventions shows an example in which a (language restricted) concurrent input method(CIM) is applied effectively.

In addition, this invention proposes an input system for inputting various characters by combination of a long stroke of a specific button and a repeat stroke of the specific button, or by combination of a long stroke of a specific button and a repeat stroke of a control button.

What is claimed is:

1. A method for inputting characters from a keypad having a plurality of buttons to which at least one or more characters are assigned, said method comprising:
   (a) providing a keypad having a plurality of buttons;
   (b) assigning characters with unique codes from button selection combinations;
   (c) providing an index associating a full code with characters, wherein said full code comprises the unique codes of said characters;
   (d) recognizing input values from the selection of said buttons according to a full input method (FIM);
   (e) comparing said input values with a full code stored in said index; and
   (f) when said input values match a full code, recognizing the characters associated with said full code as the target characters, wherein said characters comprise one or more consonants, vowels, words or phrases.

2. The method according to claim 1, further comprising processing said input values as a simple code after confirming that a full code corresponding to said input values does not exist in said index.

3. The method according to claim 1 or 2, wherein the full input method (FIM) used is the repeat selection method (RSM), and wherein said full code corresponds to input values from the keypad according to the RSM.

4. A method for inputting characters from a keypad having a plurality of buttons to which at least one or more characters are assigned, said method comprising recognizing a character by a combination of a short stroke of a first button and a long stroke of the first button on which one or more alphabet characters are arranged, wherein said characters comprise one or more consonants, vowels, words or phrases.

5. A method for inputting characters from a keypad having a plurality of buttons to which at least one or more characters or controls are assigned, said method comprising recognizing a character by combination of input of an alphabet character and a long stroke of a control button, wherein said control button does not have alphabet characters arranged thereon, and wherein said characters comprise one or more consonants, vowels, words or phrases.

* * * * *